(12) United States Patent
Gogos et al.

(10) Patent No.: US 8,163,114 B2
(45) Date of Patent: Apr. 24, 2012

(54) NETSHAPE MANUFACTURING PROCESSES AND COMPOSITIONS

(75) Inventors: Costas Gogos, Wyckoff, NJ (US); Ming-Wan Young, Basking Ridge, NJ (US); Rajesh Dave, Short Hills, NJ (US); Robert Pfeffer, Teaneck, NJ (US); David Todd, West Windsor, NJ (US); Bainian Qian, Newark, NJ (US); Theodore Davidson, Princeton, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1027 days.

(21) Appl. No.: 10/819,898

(22) Filed: Apr. 7, 2004

(65) Prior Publication Data

US 2005/0224148 A1    Oct. 13, 2005

(51) Int. Cl.
*D03D 23/00* (2006.01)
(52) U.S. Cl. .................................... 149/109.6
(58) Field of Classification Search .............. 149/19.92, 149/109.6
See application file for complete search history.

(56) References Cited

U.S. PATENT DOCUMENTS

| | | | | |
|---|---|---|---|---|
| 2,477,549 A | * | 7/1949 | Van Loenen | 149/6 |
| 4,163,681 A | * | 8/1979 | Rothenstein et al. | 149/11 |
| 4,979,999 A | * | 12/1990 | Briere | 149/6 |
| 5,962,082 A | | 10/1999 | Hendrickson et al. | |
| 6,037,019 A | | 3/2000 | Kooyer et al. | |

FOREIGN PATENT DOCUMENTS

| | | |
|---|---|---|
| CA | 1105759 | 7/1981 |
| GB | 1573166 | 8/1980 |

OTHER PUBLICATIONS

Chee Wai Yip et al., Ordered Powder Mixing, Nature, vol. 262, Jul. 15, 1976, pp. 262-263.
J.A. Hersey, Ordered Mixing: A New Concept in Powder Mixing Practice, vol. 11, Issue 1, Jan.-Feb. 1975, pp. 41-44.
D.M. Bigg, Rheological Behavior of Highly Filled Polymer Melts, Polym. Eng. Sci., vol. 23, No. 4, 1983, pp. 206-210.
Richard Zallen, Electrostatics and Xerography, Physics by Tipler, 3rd Ed., 1992, pp. 682-684.
B.D. Cullity, Introduction to Magnetic Materials, Addison-Wesley Publ. Co., 1972, pp. 410-422.
D. Geldart, Types of Fluidization, Powder Technology, 7, 1973, pp. 285-292.

(Continued)

Primary Examiner — Aileen B Felton
(74) Attorney, Agent, or Firm — Timothy X. Gibson, Esq.; Gibson & Dernier LLP

(57) ABSTRACT

Techniques and processes that combine particulate coating processes with particulate handling steps resulting in the formation of free-flowing particulates for introduction into energetic product vessels to affect an in-situ, net-shape manufactured product. The processes involve selecting suitably sized materials, processing such materials such that they are surface-coated and/or locally "structured" particulates, and pouring, preferably "dry" pouring, these processed materials into an energetic product vessel and infusing the filled vessel with a polymerizable and surface-compatible monomer or oligomer which flows into the unoccupied volume, followed by polymerization of the monomer, which then becomes the binder giving mechanical integrity to the final, net-shape energetic composition.

18 Claims, 54 Drawing Sheets

OTHER PUBLICATIONS

International Search Report and Written Opinion of PCT/US04/36386 of Apr. 10, 2008.

International Preliminary Report on Patentability for PCT application PCT/US2004/036386, Mar. 3, 2009 (PCT/IB/373/PCT/ISA/237).

Office action for co-pending U.S. Appl. No. 10/878,656, dated: Apr. 1, 2008.

Office action for co-pending U.S. Appl. No. 10/878,656, dated: Sep. 19, 2008.

Office action for co-pending U.S. Appl. No. 10/878,656, dated: Jul. 7, 2009.

* cited by examiner (a) INITIAL CORNSTARCH (b) 9% COATED PARTICLE

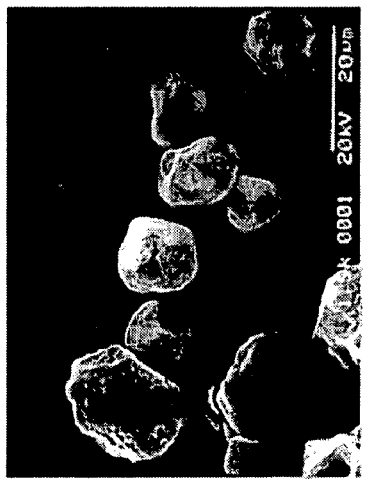
FIG. 9E  t = 0 s
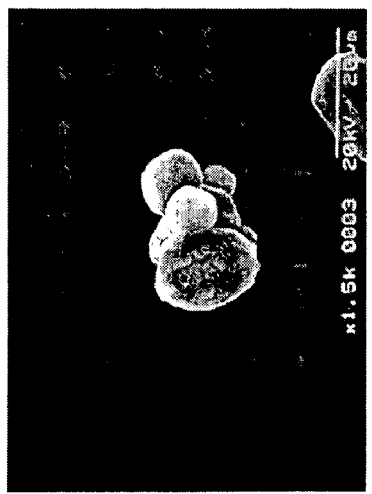
FIG. 9F  t = 300 s
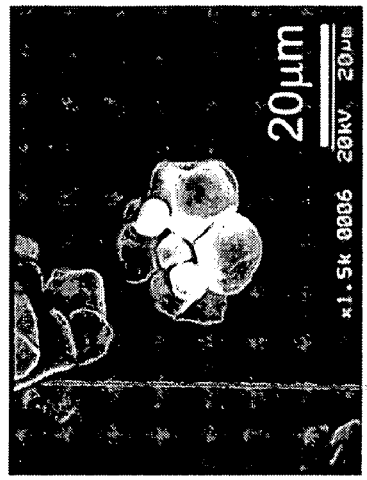
FIG. 9G  t = 600 s
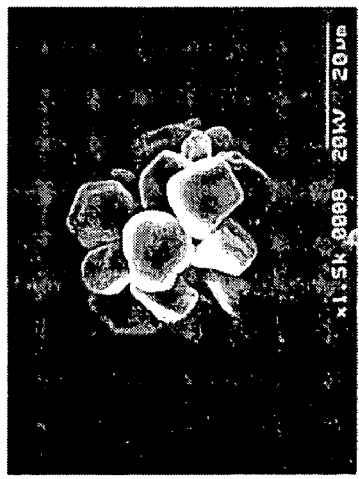
FIG. 9H  t = 900 s
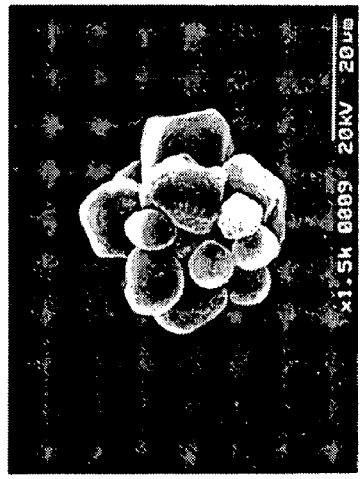
FIG. 9I  t = 1200 s

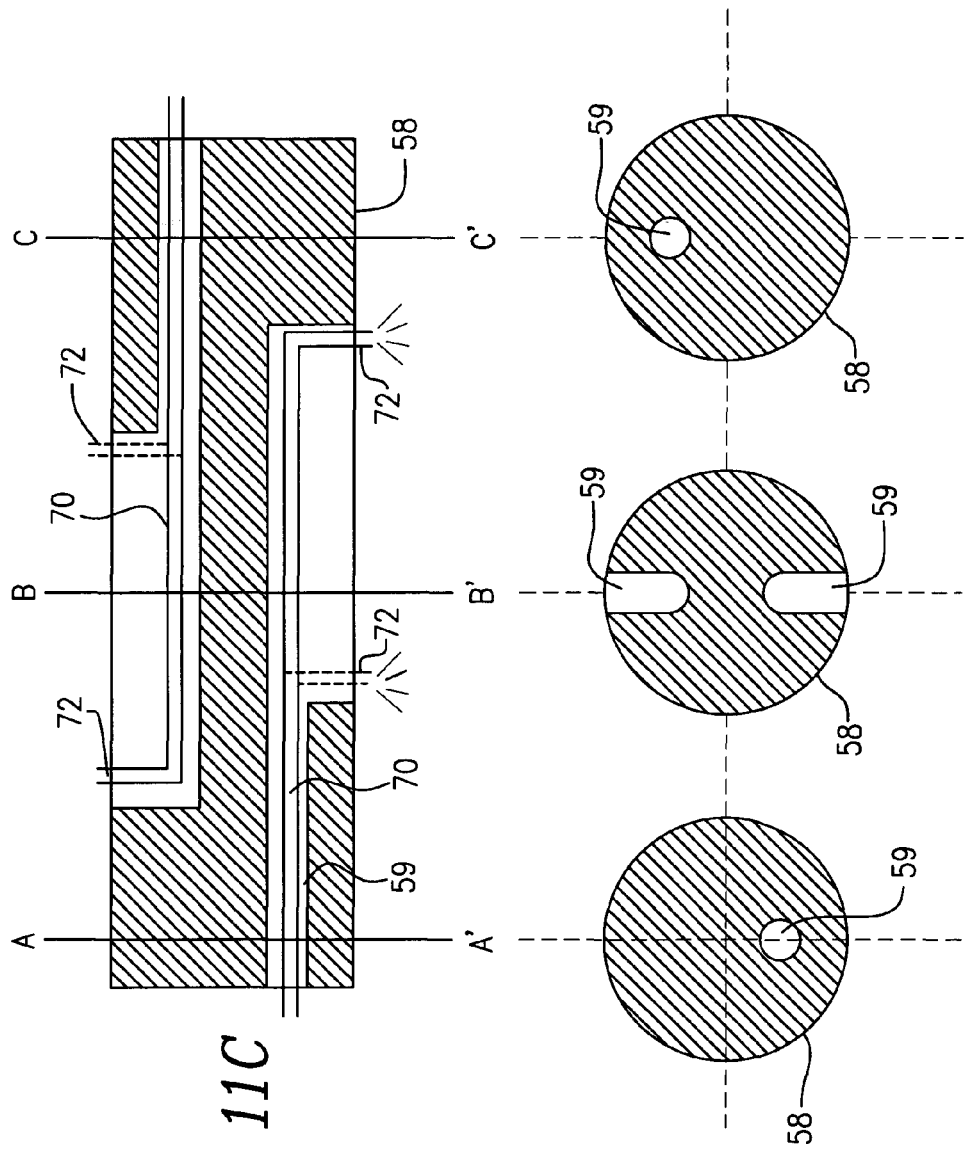

| TUBE ID | SAMPLE ID | TUBE WEIGHT (g) | UNTAPPED GROSS WEIGHT (g) | TAPPED GROSS WEIGHT | LENGTH (IN) | UNTAPPED BULK DENSITY | TAPPED BULK DENSITY |
|---|---|---|---|---|---|---|---|
| 1 | KCl-1-I | 23.04 | 50.87 | 54.42 | 13.90 | 1.11 | 1.25 |
| 2 | KCl-1-I | 22.46 | | 53.42 | 13.88 | | 1.23 |
| 3 | 2-KCl-III | 23.07 | 45.58 | 50.93 | 13.89 | 0.90 | 1.11 |
| 4 | 2-KCl-III | 22.30 | | 49.48 | 13.86 | | 1.08 |
| 5 | KCl-2-III | 22.30 | 47.60 | 50.69 | 13.87 | 1.01 | 1.13 |
| 6 | KCl-2-III | 23.00 | | 53.25 | 13.90 | | 1.20 |
| 7 | MIX-2-V | 21.94 | 47.16 | 50.21 | 13.63 | 1.02 | 1.15 |
| 8 | 4-MIX-VIII | 23.58 | 49.65 | 52.51 | 14.10 | 1.02 | 1.13 |
| 9 | MIX-4-X | 21.91 | 46.63 | 49.48 | 13.70 | 1.00 | 1.11 |
| 10 | MIX-4-X | 21.29 | | 48.25 | 12.84 | | 1.16 |
| 11 | MIX-4-X | 21.16 | | 47.76 | 12.85 | | 1.14 |

FIG. 23A

| TUBE ID | SAMPLE ID | TAPPED BULK DENSITY | VOL. (cc) | KCl (g) | DECH+ (g) | BINDER (ml) | MIXTURE TRUE DENSITY | VOID RATIO |
|---|---|---|---|---|---|---|---|---|
| 1 | KCl-1-I | 1.25 | 25.2 | 100 | 0 | 1 | 1.99 | 0.374 |
| 2 | KCl-1-I | 1.23 | 25.1 | 100 | 0 | 1 | 1.99 | 0.381 |
| 3 | 2-KCl-III | 1.11 | 25.1 | 100 | 0 | 2 | 1.98 | 0.442 |
| 4 | 2-KCl-III | 1.08 | 25.1 | 100 | 0 | 2 | 1.98 | 0.454 |
| 5 | KCl-2-III | 1.13 | 25.1 | 100 | 0 | 2 | 1.98 | 0.430 |
| 6 | KCl-2-III | 1.20 | 25.2 | 100 | 0 | 2 | 1.98 | 0.394 |
| 7 | MIX-2-V | 1.15 | 24.7 | 80 | 20 | 2 | 1.94 | 0.410 |
| 8 | 4-MIX-VIII | 1.13 | 25.5 | 80 | 20 | 4 | 1.93 | 0.413 |
| 9 | MIX-4-X | 1.11 | 24.8 | 80 | 20 | 4 | 1.93 | 0.424 |
| 10 | MIX-4-X | 1.16 | 23.2 | 80 | 20 | 4 | 1.93 | 0.399 |
| 11 | MIX-4-X | 1.14 | 23.3 | 80 | 20 | 4 | 1.93 | 0.408 |

*FIG. 23B*

| TUBE ID | SAMPLE ID | TAPPED BULK DENSITY | VOID RATIO ε | APPLIED PRESSURE (psi) PLUS VACUUM | TOTAL INFUSION TIME (min) |
|---|---|---|---|---|---|
| 1 | KCl-1-I | 1.25 | 0.374 | 100 | ~8 |
| 2 | KCl-1-I | 1.23 | 0.381 | 100 | ~4 |
| 3 | 2-KCl-III | 1.11 | 0.442 | 190 | ~3 |
| 4 | 2-KCl-III | 1.08 | 0.454 | 0 | |
| 5 | KCl-2-III | 1.13 | 0.430 | 190 | ~2 |
| 6 | KCl-2-III | 1.20 | 0.394 | 190 | ~2 |
| 7 | MIX-2-V | 1.15 | 0.410 | 190 | ~1 |
| 8 | 4-MIX-VIII | 1.13 | 0.413 | 190 | ~1 |
| 9 | MIX-4-X | 1.11 | 0.424 | 190 | |
| 10 | MIX-4-X | 1.16 | 0.399 | 190 | <1 |
| 11 | MIX-4-X | 1.14 | 0.408 | 190 | <1 |

FIG. 23C

CONTENT UNIFORMITY EXAMINATION FOR INFUSED BURSTER TUBE 11 FILLED WITH MIX-4-X

NETSHAPE MANUFACTURING PROCESSES AND COMPOSITIONS

FIELD OF THE INVENTION

The present invention relates to the manufacture of energetics and in particular to methods for preparing novel compositions and net-shape manufactured energetic products having enhanced compositional homogeneity, higher energetic loading density and safer handling properties.

BACKGROUND

Melt pour energetic compositions are currently made by blending various energetic ingredients with a low viscosity binder in a mixer. In order to meet the constant demand to improve the energy density, the conventional energetics manufacturing process has been pushed to the limit due to its inability to overcome its fundamental constraint, e.g., the "need to flow in order to mix". As a result, energetic products at high solid loadings are often inhomogeneous, and, since the mixing quality performance is intractable, always require destructive testing methods for quality assurance. Furthermore, the ongoing efforts toward the increasing use of smaller energetic particles in order to enhance munitions insensitivity are also hindered by the limitation of conventional mixing equipment to handle highly viscous mixing media resulting from the enormous increase of particle surface area and the resulting dramatic viscosity increases of the "charge".

The current art of manufacturing propellants and explosives usually involves mixing of the ingredients for long periods to achieve a uniform distribution of the solid ingredients in a viscous matrix that is still pourable but eventually slowly polymerizes or gels into a solid mass. Not only may the carrier fluid be viscous unto itself, but the slurry paste becomes very viscous because of the generally high loading of solids. In fact, the increase in viscosity caused by the solids loading frequently sets the maximum solids content that can be processed. Also, mixing of otherwise desirable small size particles causes an undesirable viscosity increase. The high viscosity of the mixture requires substantial torque to blend. The power required to mix, combined with long mixing times, result in inefficient mixing and high power consumption, leading to potentially undesirable and dangerous heat buildup. For example, mixing for the solid propellants such as those used in the space shuttle program typically contain the following ingredients: 12.6% by volume aluminum powder as fuel (10 to 20 microns); 63.5% ammonium perchlorate as oxidant, generally with a bimodal size distribution (about 20 microns and about 300 microns); 23.9% polymerizable mixture of prepolymer and plasticizer. Mixing the above formulation may be done in a planetary change-can mixer. A typical mix cycle might involve as long as 95 minutes or more from charging to cleanup. Power required is up to 100 HP for a 300 gallon batch. Attempting to mix faster can result in an unacceptable temperature rise in the batch.

Accordingly, there is a need for a process that avoids the energy consequences of attempting to uniformly mix a viscous slurry and the time consuming and potentially hazardous requirement to clean the mixer between batches. The proposed method allows for higher solids loading, achieves a high level of homogeneity and produces materials that are safer to handle.

The terms "ordered mixing" and "ordered mixtures" formed by such mixing processes were coined to describe the mixing of cohesive, interactive particulate systems, in differentiation to the traditional randomization mixing process of comparatively coarse, free-flowing, non-interacting particulate systems. Ordered Powder Mixing, *Nature*, Volume 262, Jul. 15, 1976, Pages 262-263, Chee Wai Yip, John A. Hersey; Ordered mixing: A new concept in powder mixing practice, *Powder Technology*, Volume 11, Issue 1, January-February 1975, Pages 41-44 J. A. Hersey. The basic principle of ordered mixing is that fine particles will adhere, especially to larger particles. The adhesional forces involved may be electrostatic, van der Waals, or surface tensional. Coarser components assist in the mixing process by breaking down agglomerates of the fine powder, thus allowing the adhesion of single cohesive particles to the surfaces of the coarser constituents.

Ideally, ordered mixtures in the form of clusters may be formed due to complete adhesion of an identical number of equal sized fine particles to each coarse, homosized carrier, resulting in perfect mixtures with zero standard deviation. It is not adhesion per se which allows the improved degree of homogeneity to be achieved, but only ordered adhesion. To produce ordered powder mixtures, it is the basic requirement that ordered, not random, adhesion must be achieved during mixing. To date, no prior art mechanism has been established that yields ordered adhesion.

Most work in ordered mixing is carried out in the pharmaceutical industry for production of solid dosage forms, where the small drug particles adhere on coarser excipient carrier particles to achieve content uniformity. In practice, ideal ordered mixtures with zero standard deviation have not been achievable, since the amount or number of particles interacting with carrier units is not constant but varies in such a way that can probably best be described as random. In the pharmaceutical industry, any addition of binder/glue in the ordered mixing process to enhance the adhesion between small drug particles and coarser carrier particles will reduce the dissolution rate and thus the bioavailability of the final dosage form. As a result, the relatively weak interactive forces between the guest (drug) and host (carrier excipient) particles tend to segregate by frictional attrition during subsequent solids handling and processing steps. Ordered mixtures formed by adhesion of particles will segregate into the two constituents if the forces applied to the mixture are sufficient to break the adhering bonds between particles. Constituent segregation takes place due to the frictional attrition, which causes fine particle dislodgement from the ordered mixture of clusters, between adjacent particles and the containing wall. Segregation can be as much a problem in an ordered mixture with weakly formed interaction as in a random mixture. An ordered system has a greater stability than a random system due to the particle interaction; but once this interaction is disturbed, the segregation pattern of an ordered mixture may be more unpredictable than a random mixture.

Although content uniformity is very important especially for very low content high potency drugs, no stoichiometry is required as is the case in energetics manufacture. It is believed that there is currently no process available for simultaneously coating fine as well as coarser particles and clustering particles to form an ordered mixture using a sequential particle addition process according to one embodiment of the present invention.

SUMMARY OF THE INVENTION

The present invention is directed to techniques and processes that combine particulate coating processes with particulate handling steps resulting in the formation of free-flowing particulates for introduction into energetic product vessels to effect an in-situ, net-shape manufactured product. The processes involve selecting suitably sized materials, processing such materials such that they are surface-coated and/or locally "structured" particulates, and pouring, preferably "dry" pouring, these processed materials into an energetic product vessel and infusing the filled vessel with a polymerizable and surface-compatible monomer or oligomer which flows into the unoccupied volume, followed by polymerization of the monomer or prepolymer, which then becomes the binder giving mechanical integrity to the final, net-shape energetic composition. The processes of the present invention achieve local and global product composition uniformity and improved product energetic densities. The inventive processes replace cumbersome, century-old processes which are currently used to produce energetic products, which force highly-filled, rheologically complex fluid systems under high stress, high temperature laminar mixing flows, resulting in energetic products which are often inhomogeneous and of appreciably lower than maximum energy density.

Net-shape manufacturing according to the present invention is a clean and cost saving manufacturing process which can be readily adopted for munitions manufacturing by packing of coated energetic particles in desirable configuration to achieve optimal packing density in the munitions enclosure. The final products resulting from the disclosed novel processes possess exceptional microscopic homogeneous composition uniformity, down to the individual particle/cluster level with designed stoichiometry, and higher energetic loading density with an estimated order of magnitude reduction in process cost. The novel approaches disclosed herein eliminate the need for laminar mixing. The present inventive manufacturing techniques are applicable to conventional and insensitive explosive munitions such as PBX-type explosives, pyrotechnic munitions (e.g., decoy flares, delay mixes, illuminating compositions, etc.), ammonium perchlorate (AP)-based rocket propellants, and bomb fills currently used in military applications. The invention provides methods that render manufacturing processes using advanced high-energy energetic materials and Insensitive Munitions (IM) safer in a wide variety of applications, increasing safety during handling and weapon system lethality. The present invention eliminates particle segregation induced by large size differences between big and small particles in powder filling and compaction processes; enhances fluidity of powders due to the formation of clusters compared to the physical mixture of big and small particles; results in easier infusion of binders; and eliminates or drastically reduces entrainment issues and dust resulting from fine powders.

Clustering techniques for processing particles contemplated by the present invention include but are not limited to triboelectric clustering, magnetic clustering fluidized bed, and Sequential Particle Addition (SPA), each of which techniques can be employed to achieve stoichiometric clustering. Such clustering techniques may be employed to provide various combinations of clusters, including but not limited to all large clusters, large and small coated particles, large coated particles with small granulated or agglomerated particles, and large and small clusters.

Clustering according to the present invention permits a novel approach to dry pouring of material followed by prepolymer infusion. Various coating methods, such as but not limited to spray coating in a tumbling mixer, ultraviolet particle coating, rotating fluidized bed coating and magnetically fluidized bed coating are disclosed for achieving the novel coating and clustering approaches described herein.

The infusion process according to the present invention introduces a polymerizable or curable binder system to completely infuse a vessel such as a munition that is packed with the coated energetic particles.

The teachings of the present invention can also be applied to the pharmaceutical industry, with or without the infusion and polymerization steps to produce composition uniformity and stoichiometric clustering in formulations.

OBJECT OF THE INVENTION

It is therefore an object of the present invention to provide net shape manufacturing processes and methods that eliminate the high temperatures and stresses encountered in conventional laminar mixing processes in attempting to uniformly mix viscous slurry.

It is a further object of the present invention to permit higher solids loading where desirable.

It is still a further object of the present invention to provide dramatically higher energetic loading density with a reduction in process cost.

It is another object of the present invention to provide a process for producing products possessing exceptional microscopic homogeneous composition uniformity.

It is yet a further object of the present invention to provide novel processes and methods for manufacturing conventional and insensitive munitions such as but not limited to explosives, PBX-type explosives, pyrotechnic munitions (e.g., decoy flares, delay mixes, illuminating compositions, etc.), ammonium perchlorate (AP)-based rocket propellants, and bomb fills currently used in the armed services.

It is a further object of the present invention to provide novel manufacturing processes enabling the manufacturer to safely use advanced high-energy energetic materials and insensitive formulations in a wide variety of applications, increasing safety during use and weapon system's lethality.

It is a further object of the present invention to provide novel, versatile, cost effective and safe coating processes to coat energetic components with curable polymeric materials in order to enhance their insensitivity, pourability and affinity to selected binder systems.

It is further object of the present invention to provide novel, versatile techniques for handling and pouring dry granular materials as well as specifying different combinations of clustered, granulated or coated particles in a way that allows for achieving specific packing conditions, while avoiding or minimizing segregation.

It is a further object of the present invention to provide novel clustering techniques for energetic materials for use in net shape manufacture according to the present invention.

It is a further object of the present invention to provide novel granulation techniques for fine energetic materials to create micro-granules for use in net shape manufacture according to the present invention.

It is yet a further object of the present invention to provide stoichiometric clusters of energetic materials for use in net shape manufacture according to the present invention.

It is yet a further object of the present invention to provide methods permitting production of graded munitions, of which the energetic charged density is arranged in a predetermined fashion.

BRIEF DESCRIPTION OF THE DRAWINGS

FIGS. 9E-9I are scanning electron micrographs of cornstarch particles at various stages of the granulation process.

FIG. 11C is a cross-sectional view of a preferred embodiment of a shaft of a tumbling magnetically assisted fluidized bed according to one embodiment of the present invention.

FIGS. 11D-11F are cross-sectional views of preferred embodiments of the shaft according to FIG. 11C taking at various cross-sections A-A', B-B', and C-C', respectively.

FIGS. 23A-23C are tables containing data relating to experiments conducted in accordance with the teachings of the present invention.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment.

Figure 1:
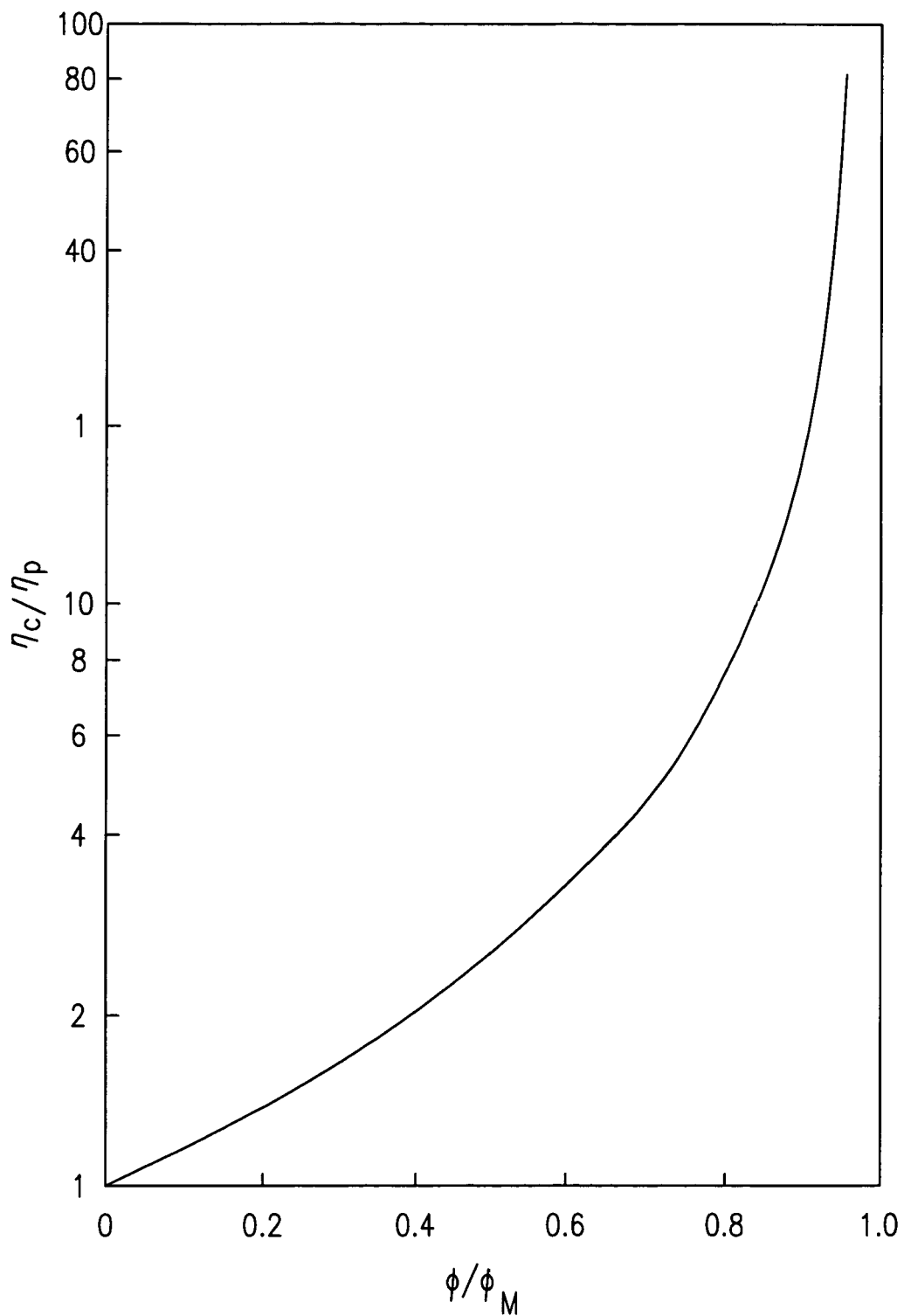
FIG. 1 is a graphical representation of the viscosity of a particulate filled polymer plotted against the ratio of the particulate volume fraction of a given suspension divided by the maximum volume fraction when the particulates are "perfectly packed."

Conventional energetics processing consisting of mixing and blending of energetics with various polymerizable binders in conventional polymer processing machinery is ultimately limited in solids content and uniformity by the characteristic dynamics of the process. Laminar mixing of a high concentration of energetic particles in low viscosity binder matrices is often characterized by incomplete and non-homogeneous mixtures and always characterized by intractable mixture characterization. This is due to the exponential rise in viscosity at high loadings, making laminar mixing very difficult and, since concentrated systems have a strong interparticle structure, resulting in inhomogeneous mixtures. Now referring to FIG. 1, the viscosity of a particulate-filled polymer is plotted against the ratio of the particulate volume fraction of a given suspension divided by the maximum volume fraction when the particulates are "perfectly packed". D. M. Bigg, "Rheological Behavior of Highly Filled Polymer Melts", *Polym. Eng. Sci.*, 23, 206-210 (1983), incorporated herein by reference.

According to the present invention, a series of coating and particulate handling processes are employed to achieve net shape manufacturing of energetic products with compositional uniformity at the particle level. Suitably sized materials are selected, clustered according to at least one of the methods disclosed herein, poured into a suitable container and infused with a suitable liquid. In a preferred embodiment, the present invention comprises packing coated energetic particles in a desirable configuration to achieve optimal packing density in a munitions enclosure, and infusing of polymerizable and crosslinkable binders in the packed product enclosure to complete the net-shape manufacturing process.

Examples of energetic product-specific steps for two types of energetic formulations are:

a. For formulations requiring only a single energetic substance in particulate form, exemplary unit steps are:
  i. Coating the particulates of the needed size distribution with thin coats of monomer(s) or oligomer(s) (different coat thicknesses may be used for different size ranges).
  ii. Polymerizing to form a solid coating. Polymer coating also affects "passivation" and moisture resistance.
  iii. Tumble-mixing different sizes of particulates to achieve higher bulk densities.
  iv. As needed, utilizing the foregoing steps to form large and small clusters and granules to achieve desired bulk densities.
  v. Pouring the particulates into the product vessel achieving the desired packing.
  vi. Pouring the required binder monomer, which must have lower surface tension than the particulate polymer coat to achieve complete filling of the inter-particle unoccupied volume. Vacuum or centrifugal forces may be employed to assist the infusion, if needed.
  vii. Polymerizing in-situ to bind the energetic particulates.

This series of unit steps assure local and global composition uniformity and desired packing densities for single energetic component formulations.

b. For energetic formations requiring two energetic components in particulate form of similar or different sizes, the specific process unit steps required are:
  i. Coating particulates A with the appropriate thickness coat of polymer a.
  ii. Polymerizing or evaporating solvent to form a polymer coat which is solid at subsequent handling temperatures.
  iii. Coating particulates B with the appropriate thickness polymer a or b.
  iv. Polymerizing or evaporating solvent to form a polymer coat which is solid at handling temperatures.

Before continuing with the subsequent unit steps it must be noted that, in this example, coating of both particulate components not only achieves passivation and moisture resistance for both but, additionally and most importantly, when using the proper "chemistry" polymer coat formulations, it allows for the local composition uniformity of such two-component systems, that is, it enables local "structuring" of the two different types of particulates in the form of A-B pairs, "nuclear" single large A-multiple small B clusters, or, for that matter, any needed and achievable local structuring, as follows:

v. If polymers or polymer formulations a and b are chosen and designed to be well separated in the triboelectric series, one becoming more negative and the other more positive when tumbled in a vessel of the appropriate wall material, enough smaller (ca tens of microns in size) particulates are attracted to the surface of the larger (ca hundreds of microns in size) particulates to approach surface charge neutralization. The chemistry of the two polymer coats are preferably adjusted to achieve "stoichiometric" local composition required by the energetic product requirements.
  vi. Together with van der Waals forces, the clusters form rather stable structures.
  vii. If the local structures are not mechanically stable, an appropriate cluster "stabilization" unit step is carried out.
  viii. If required, A-B pairs or clusters of different overall sizes are tumbled together to increase bulk density.
  ix. Pouring the clustered material into the product vessel. The total process of net-shape manufacturing is completed with the following steps.
  x. Binder monomer infusion.
  xi. Binder polymerization.

Similar to the utilization of the electrostatic forces to form stoichiometric local "structuring," the present invention also contemplates creating a polymer coat formulation A which contains magnetic particles and polymer formulation B containing super paramagnetic particles (SPM). They will attract each other when brought together.

The processes of the present invention also permit production in a one-step manufacturing process of graded munitions, of which the energetic charged density is to be arranged in a pre-determined fashion. During the packing stage, the packing density of energetic particles can be manipulated through the selection of particle size and size distribution, particle geometry, coating thickness and size and size distribution of granules. Depending on the geometry of the munitions item, the variation of energy density can be adjusted, by design, to be axial or radial, high to low or low to high in a monotonically or non-monotonically fashion. Furthermore, different energetic particles (ex: RDX, HMX, fuels, oxidizers) can be incorporated into the same munitions with various compositions.

Unlike conventional melt pour process, the processes of the present inventions are not limited by the pot life of the binder. Selected batches of energetic particles can be poured in the munitions product vessel sequentially to be allowed to form a pre-determined arrangement, followed by the infusion of a polymerizable and crosslinkable binder.

A novel clustering technique of "sequential particle addition" is also contemplated by the present invention. These clustering techniques are discussed in detail hereinbelow.

Clustering

Figure 2:
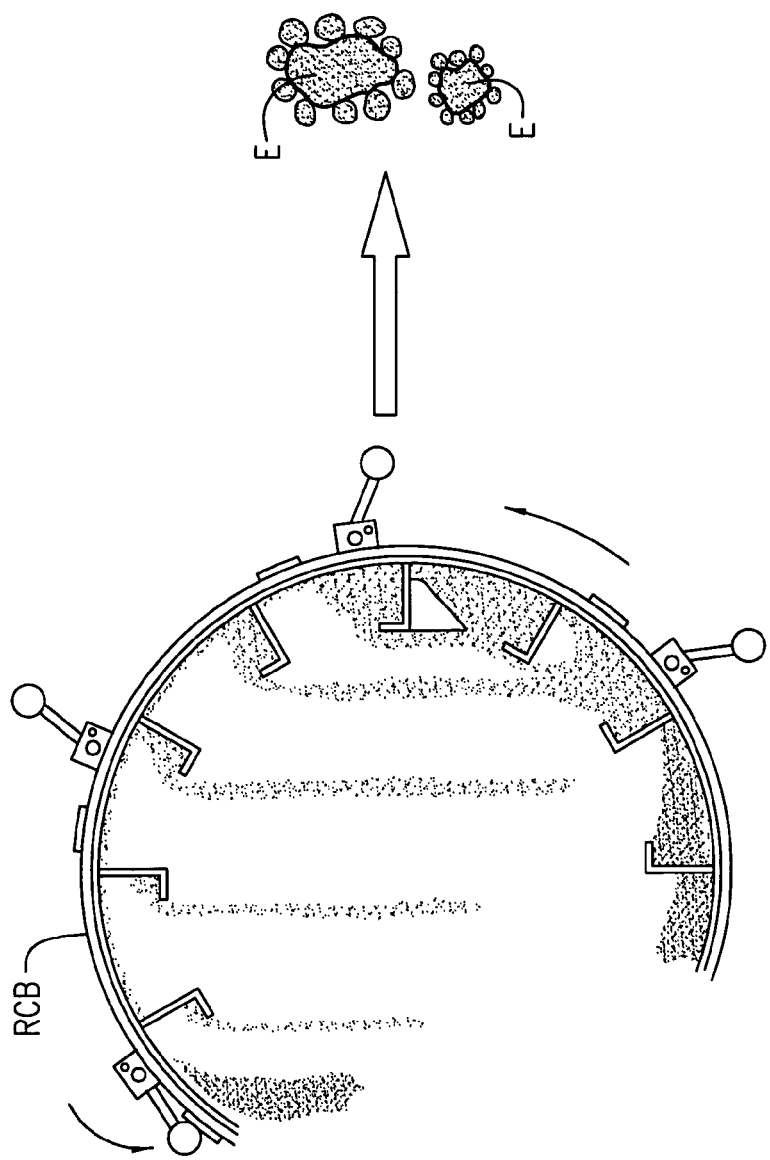
FIG. 2 is a flow diagram of a clustering approach in accordance with one embodiment of the present invention.

Clustering according to the present invention may be achieved according to various techniques such as but not limited to triboelectric clustering, magnetostatic clustering, fluidized beds, chemical reaction or fusion clustering, dry, wet or wet-coating based clustering employing coating devices such as but not limited to RFB coaters, and "sequential particle addition", each of which may be employed to achieve stoichiometric clustering. Other techniques may be employed according to techniques known to those having skill in the art. Now referring to FIG. 2, one embodiment of a clustering approach in accordance with the present invention is shown. A first component A coated with a polymer a and a second component B coated with polymer b are charged into a coater, in this case a rotary cluster blender (RCB), to achieve clusters such as but not limited to energetic clusters E. Stabilization or anchoring of clusters is achieved, if necessary, employing the same equipment used in the clustering step. For example, in the event a rotary cluster blender is employed for clustering, stabilization may be achieved by heating above the glass transition temperature of the coated polymer to form fusion points. If a liquid-solids spray coater is employed, stabilization may be achieved by spraying a binder polymer C (not shown). Optionally, an appropriate polymer may be introduced to induce a chemical reaction between pre-polymers.

Figure 3:
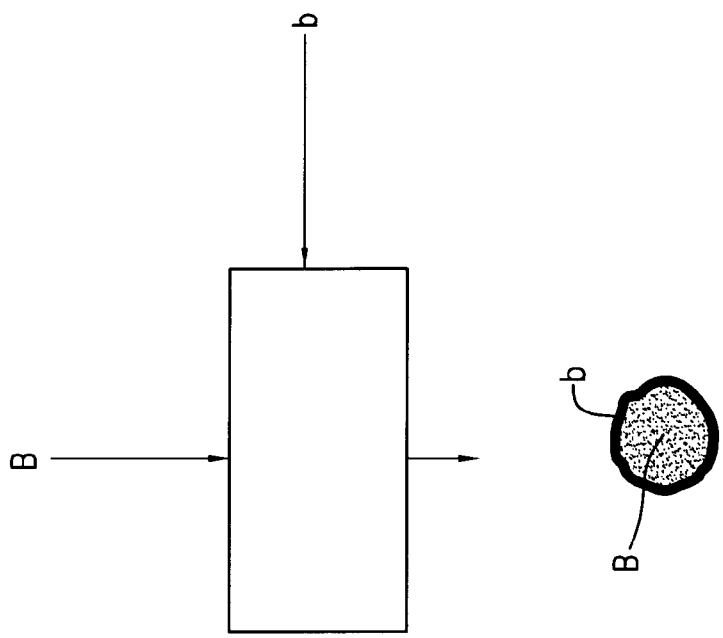
FIG. 3 is a graphical representation of one embodiment of a clustering approach of the present invention.
Figure 3:
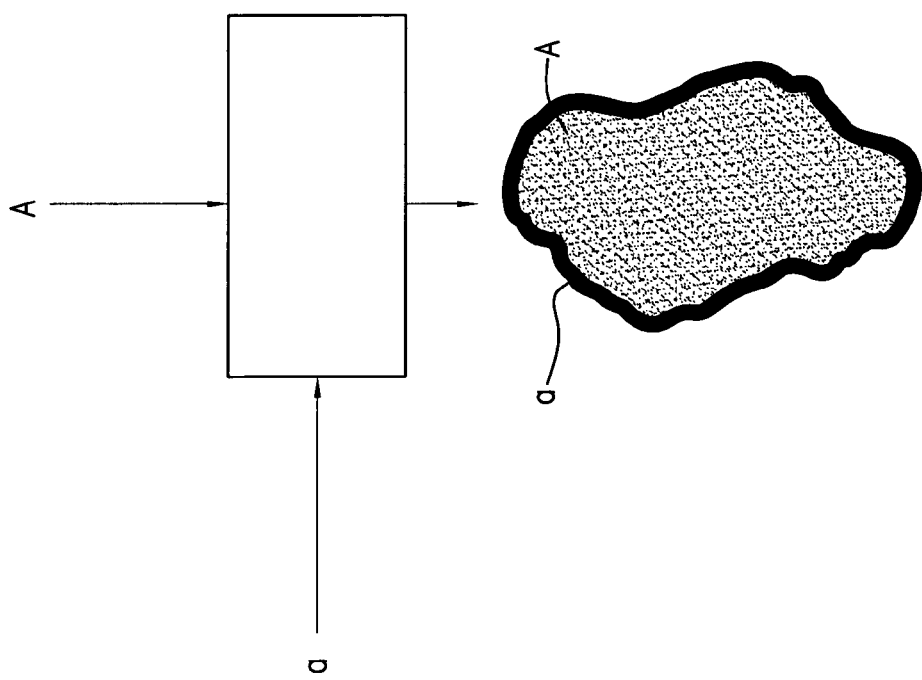

Now referring to FIG. 3, in preparing energetic clusters E according to the present invention a first, large particle A, such as but not limited to an oxidizer such as but not limited to ammonium perchlorate is coated with a polymer a and a second, small particle B, such as but not limited to RDX or aluminum is coated with a polymer b.

In a preferred embodiment clustering comprises local "structuring" consisting of a large "host" and smaller coated or uncoated "guest" particles or granulates. Small amounts of polymer can be coated onto solid particles by various means. In this embodiment, instead of simply mixing coated "A" particles with coated "B" particles, an ordered mixture is created wherein the material that is of lesser quantity is of small particle size (the "B" particles) and the "A" particles are of larger size. The "B" particles are then coated onto a single A particle. By creating this ordered structure, each composite particle has the proper amount of all ingredients subject to the inherent particulate size distributions. This composite is "dry" poured in a mold, followed by an infusion step and a curing step to make the net-shape final product.

In accordance with this embodiment, it is generally desirable for the particle size of the ingredients to be approximately proportional to some function of their amounts in total. For example, an ingredient that is only 5% of total is of much smaller size than the ingredient that is 80% of the total, and the smaller particles are coated onto the larger ones to make an ordered mixture—what is referred to herein as "clustered" particles.

Dry coating devices, such as but not limited to RFBC, magnetically assisted fluidization, Hybridizer, Mechanofusion, Theta-Composer, or the like may be employed to coat B particles onto A particles. Wet coating devices such as but not limited to wet-RFBC or wet-RFBG can also be employed when necessary. In either event, the process will create a freely flowing powder.

Nano-fluidization and supercritical fluid based coating techniques can be employed for intermediate steps where certain co-polymers or polymers must be coated onto constituents "A", "B", etc. in order to create a proper sub-structure.

The present invention contemplates various approaches to clustering such as but not limited to employing 1) a mixture of separately coated large and small particles for achieving desired packing density and good insensitive munitions properties but more difficult dry-pouring leading to segregation and difficulty of infusion; 2) coated clusters for achieving good pouring and infusion properties and good insensitive munitions properties, with a downside of possible diminished packing density, 3) a mixture of large coated and small granulated particles that is a compromise of 1) and 2) in that problems of handling, pouring, segregation and infusion are reduced, the insensitive munitions properties are good and the loss of packing is quite small, and 4) big and small clusters. These approaches are discussed in more detail hereinbelow.

In general, in category 1) hereinabove, large and small coated particles will typically have an average size difference ranging from a factor of about 5 to about 10, with large particles ranging in size from about 100 microns to about 400 microns. The coating thickness for the larger particles typically ranges from about 0.5 to about 5 microns, and for the smaller particles, from about 0.1 to about 2 microns.

In category 2) above, all large clusters, particles are in the range of from about 100 microns to about 1 mm, and smaller particles are about one or two orders of magnitude smaller. The coatings typically varies in thickness from less than one micron to about 5 microns, and preferably in the range of about 0.2 to about 1 micron.

In category 3) above, particle sizes are similar to that for category 1) but the granulated size is in terms of enlargement of small particles by a factor in the range of from about 2 to 5. That is, if the small particles are 10 microns, then granule size will be in the range of from about 20 to about 50 microns. Coating thicknesses are similar to those for category 1).

In category 4) above, big and small clusters, the range of possibilities is vast. Preferably sizes of clusters are selected so as to maximize packing density. The number of cluster sizes is preferably two but may vary depending on the requirements of the mixture. For example, a first, largest cluster might range from about 200 microns to about 1 mm, an intermediate sized cluster would be about five times smaller than the largest cluster size, and the smallest cluster would be in the range of about 10 to about 20 times smaller than the largest cluster. In addition, any "fine" particles coated on each large particle would be in the range of about 5 to about 20 times smaller than the smallest of the clusters. Coating thicknesses are similar to those for category 1).

Polymer/monomer systems are discussed in more detail hereinbelow.

Preferably, clusters are selected in ratios that are stoichiometric so that the interaction between host and guest particles are optimized to the extent necessary for the desired reaction in a given product.

Triboelectric Clustering

The present invention relates in one aspect to creation of a mixture of particles A and B to form a particulate assembly. In one embodiment, the present invention discloses a collection of numerous small particles of B clinging to larger particles of A.

One method of holding small particles together is by means of electrostatic attraction. It is well known that oppositely charged particles attract one another. This attraction can be promoted by coating particles with selected polymers which electrostatically "charge" either positively or negatively. These can be selected from the triboelectric series which ranks materials on their tendency to develop positive or negative charge.

TABLE 1

| Triboelectric Series | |
|---|---|
| Positive | Glass |
|  | Human hair |
|  | Nylon |
|  | Wool |
|  | Fur |
|  | Aluminum |
|  | Polyester |
|  | Paper |
|  | Cotton |
|  | Steel |
|  | Copper |
|  | Nickel |
|  | Rubber |
|  | Acrylic |
|  | Polyurethane |
|  | PVC |
| Negative | Teflon |

The phenomena of static electrification are widely encountered. For example, in dry weather, walking across a nylon carpet in rubber soled shoes may create a buildup of charge which is readily sensed when contact is made with a grounded metal object such as a doorknob.

The same triboelectric phenomenon is the basis for xerography in which small particles of pigmented plastic toner are attracted to larger "carrier" beads for transfer to a photoreceptor where they "transfer" and "develop" the electrostatic pattern into an image. See, "Electrophotography and Development Physics" by L. B. Schein, Springer Verlag, Berlin and New York, Second Edition, 1992, incorporated herein by reference. In the process of xerography, small particles are manipulated by means of electrostatic forces. Typically, toner particles (5 to 20 μm in diameter) made of a polymer are transported to the image by carrier particles (50 to 200 μm in diameter.) These carrier-toner pairs are held together by electrostatic forces alone. The carrier particles are typically a magnetic material such as a ferrite with a coating to control its electrostatic charging characteristics. The toner is a spray-dried or ground particle, typically of an acrylic copolymer heavily loaded with carbon black (CB). The attraction between carrier and toner is engineered by choice of the carrier coating, the kind and dispersion of CB, and "charge control agents" which can be incorporated in the polymers. For example, a chlorinated or fluorinated oligomer or small molecule will cause the particle to develop a negative charge. Amides favor a positive charge. These relative charging effects can be ordered in a triboelectric series. Toner and carrier are attracted to the electrostatic image on a xerographic photoreceptor. Together they "develop" the latent image. The heavy carrier particles are then separated by application of a magnetic field, leaving the toner clinging to the image areas where it can be transferred to paper and fused.

Figure 4:
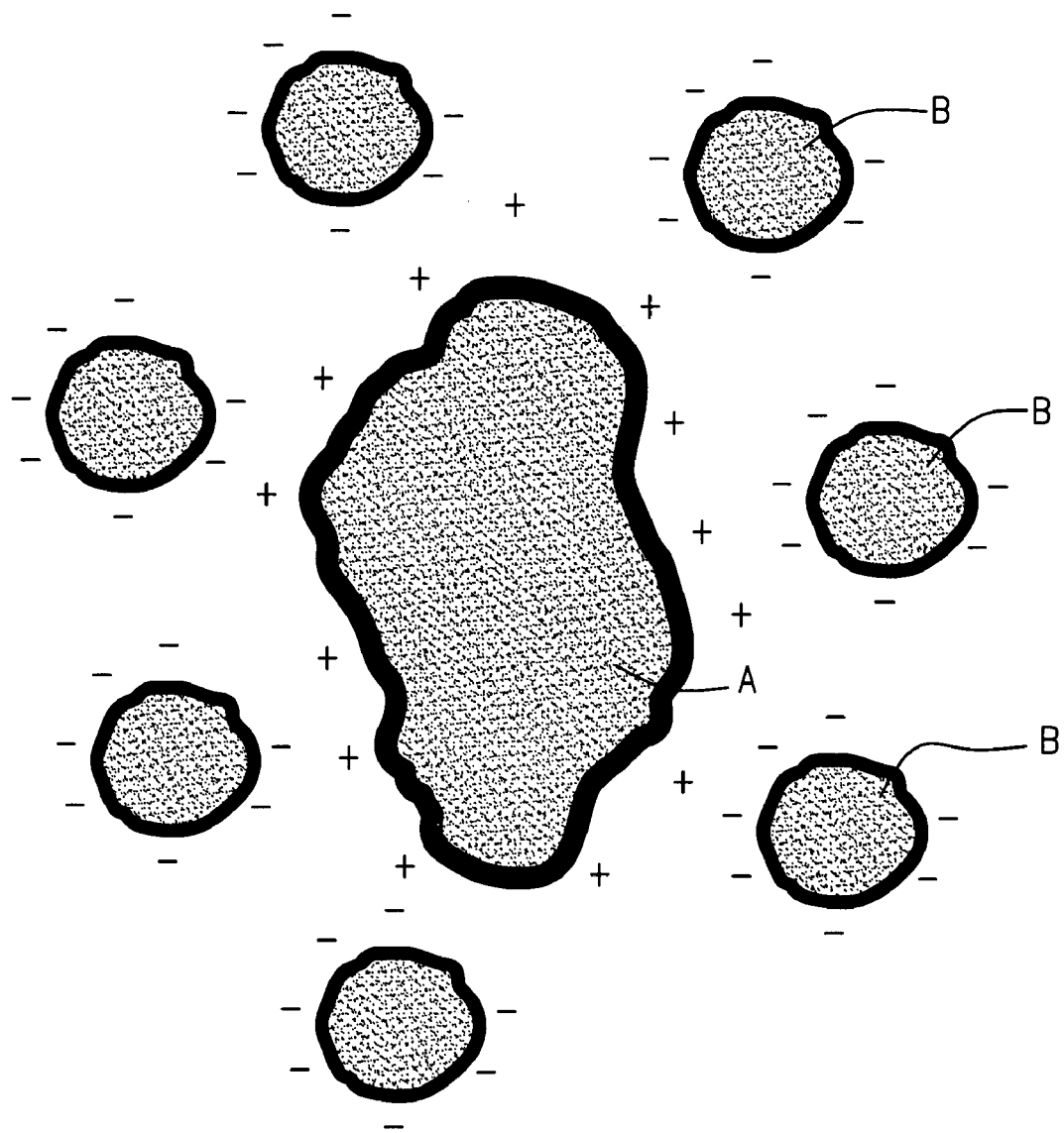
FIG. 4 is a graphical representation of one embodiment of clustering according to the present invention.

The phenomenon of triboelectricity may be utilized quite generally to cause association of one particle (type A) with another (type B). Now referring to FIG. 4, a schematic of clustering according to a triboelectric technique is shown.

Figure 5:
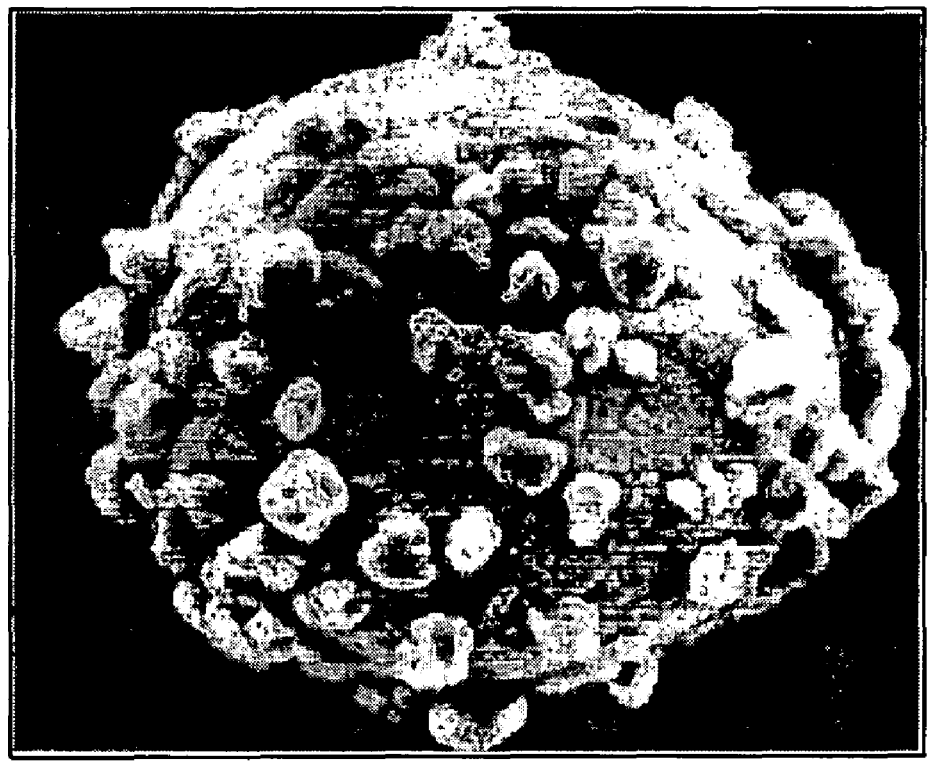
FIG. 5 is a scanning electron micrograph of a coated particle produced according to a prior art coating technique.

The requirement is that they charge with opposite polarity with respect to one another. Various materials have been ranked with regard to their triboelectric charging propensity in the foregoing triboelectric series. If spontaneous triboelectric charging does not occur between A and B, this can be affected and adjusted by coating one or both particles with materials such as various polymers of the triboelectric series, such as but not limited to by coating the particles with polymers which have opposite polarities in the triboelectric series. Employing these principles in one embodiment the present invention comprises coating large particles (e.g. 100-200 μm) with a polymer A and smaller particles (10-30 μm) with a different polymer B which develops an opposite charge. For example, an oxidizer particle such as but not limited to ammonium perchlorate is coated with polyacrylate and the metal "fuel" is coated with a polyamide. When stirred together dry with aluminum particles, the coated aluminum particles tend to cluster around the oxidizer particles. An example is shown in the book "Physics" by Tipler, $3^{rd}$ Edition at p. 684, incorporated herein by reference and reproduced as FIG. 5 herein. Due to the attraction of opposite charges, B particles tend to agglomerate on the surface of A particles. The usual case is that B particles are smaller in particle size than A particles. However, depending on the desired formulation, the proportions of A and B can be varied. The nature and percent coverage of the polymer coatings and the relative sizes of A and B results can be varied to adjust the clustering effect. In some cases it may be necessary to coat only one of particle A or B.

In the case of energetic materials (propellants, explosives, etc.) A can comprise material such as but not limited to ammonium perchlorate crystals of 200 micrometers average diameter and B can comprise aluminum or magnesium powder with average diameter of 10 to 20 micrometers. Under appropriate circumstances (ignition or detonation) B is oxidized by A with the liberation of significant energy.

In other systems, the particles A and B can comprise other materials such as but not limited to freeze-dried enzymes and their substrates, a drug and its carrier, and other kinds of reactants known to those of skill in the art, and these can be brought into close proximity by clustering for subsequent chemical reaction. Moreover, particle flow characteristics of the A-B pairs can be modulated by the addition of various agents to improve flow. In a most preferred embodiment the relative amounts—the stoichiometry—of A and B are controlled.

Example 1

In one embodiment particle A is a particle of ammonium perchlorate averaging 200 μm in diameter and the B particles are aluminum powder averaging 10 μm (micrometers) in diameter. Electrostatic attraction in the maximum case places B around A to create a composite particle of 220 μm diameter. The volume of A would be $4.46 \times 10^7$ μm$^3$ and the volume of the surrounding B would be a maximum of $1.11 \times 10^7$ μm$^3$. However, realistic covering of A would be only 60 volume percent because of voids and non-ideal packing of B. Given that the density of ammonium perchlorate (AP) is 1.95 and that of aluminum is 2.70 grams/cubic centimeter, these volume proportions of 4.46 to 1.11 would give a composite particle of 74:26 by mass. With 60% coverage, the ratio is 87:13. By controlling the particle sizes, especially the average diameter of A, the proportions of B to A can be adjusted.

Ideally, aluminum powder charges positive with respect to AP. When such is not the case, in a preferred embodiment the AP is coated with an acrylic, urethane, or vinyl polymer to create the relative charge needed. Tumbling the A and B particles together in an aluminum cylinder or a glass jar charges them by the phenomenon of "contact electrification." The composite flowable powder is then poured dry into a casing or mold for further processing.

Example 2

Particle A is acetaminophen and B is powdered poly(vinyl acetate). The oppositely charged polymer particles surround and agglomerate on the drug. The formulation is employed to modulate the pharmacological release of the active drug.

The advantages of triboelectric clustering according to the present invention are that no viscous liquid binder is required, mixing and filling are simplified, A and B are in close proximity, the combined powders A and B are flowable and there is a degree of control of the proportions of B to A ("stoichiometry").

Magnetic Clustering

As is well known, a collection of iron particles can be magnetized and will adhere to one another. This is an unstructured array of one type of particle. Typically, the powder becomes an agglomerate and does not flow. This is undesirable for the present invention which seeks a flowable bicomponent powder. Magnetic particles with permanent magnetic moments (ferrites, iron powder, etc.) attract one another indiscriminantly. To overcome this, what is needed is a large particle with a permanent moment and small particles which only develop a magnetic moment in the presence of a field. Paramagnetic materials such as copper do this very weakly. If however, the particle size of iron or ferrites is reduced below 5 nm. (50 Å) they exhibit a phenomenon called superparamagnetism (SPM). See, "Introduction to Magnetic Materials" by B. D. Cullity, Addison—Wesley Publ. Co., 1972, pages 410-422; United Kingdom Patent No. 1,573,166 to Davidson; Canada Patent No. 1,105,759 to Davidson, all of which are incorporated in full herein by reference. In SPM, all the unpaired spins on the atoms align collectively and generate a super-paramagnetic state. Therefore, if particles of B are initially paramagnetic or diamagnetic, they can still be attracted to a magnetic particle of A if the B particles are coated with a dispersion of superparamagnetic (SPM) nanoparticles. Alone, these coated B particles would have no attraction for one another. Only in the presence of an attractive "permanent" magnet do they develop an induced magnetization attracting B to A.

Figure 6:
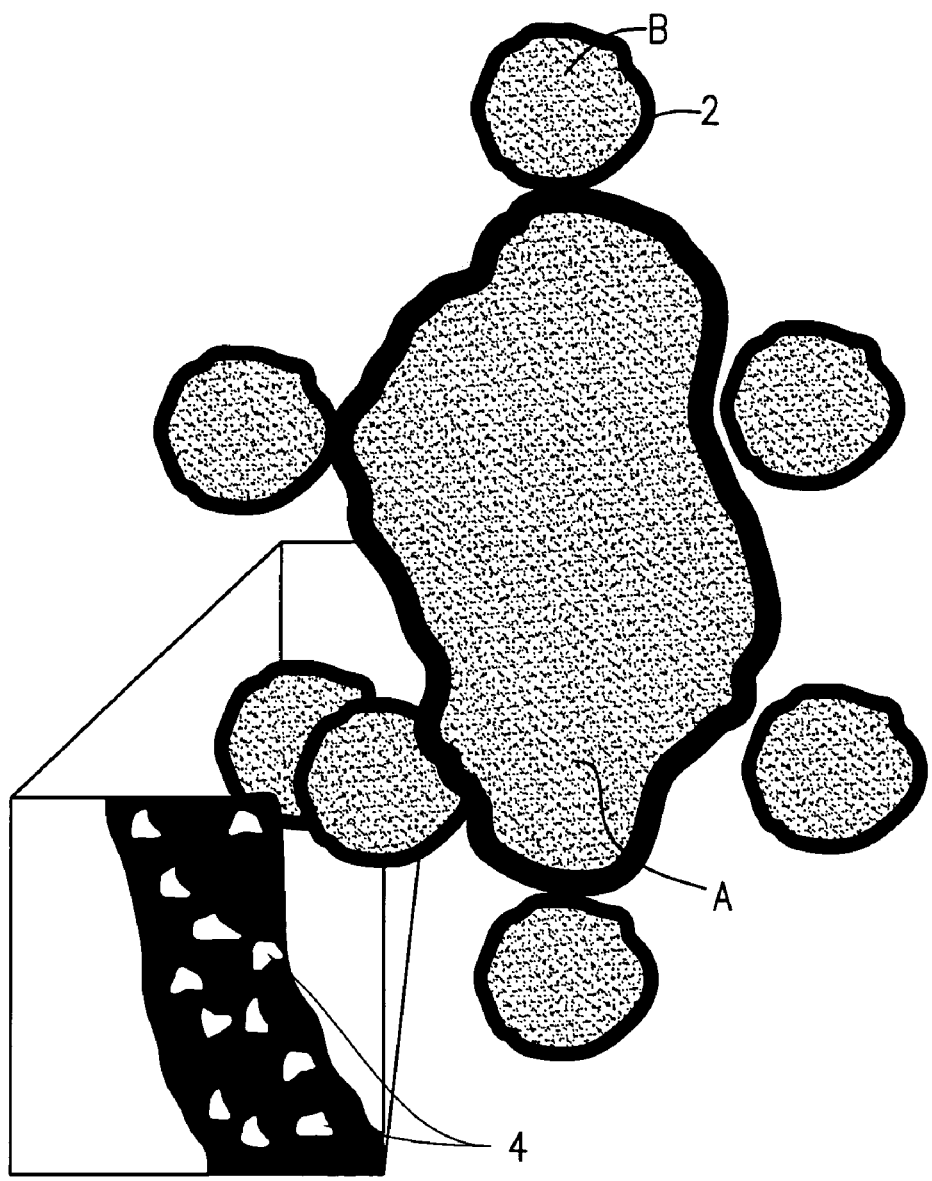
FIG. 6 is a graphical representation of clustering in accordance with one embodiment present invention.

Now referring to FIG. 6, a schematic of clustering in accordance with the present invention according to magnetic attraction is shown. SPM ferrites can be prepared by chemical reaction or by attrition. In one embodiment ferrites 2 are suspended in a polymer solution such as polystyrene in toluene and coated onto larger B particles to confer SPM properties onto B. These coated B particles have a negligible tendency to self-associate.

In a preferred embodiment a permanent magnetic material 4 such as but not limited to $Fe_3O_4$ is suspended in a polymer and coated onto particles A. The SPM material is then coated onto particles B. When mixed together, there is a tendency for SPM B particles to cluster around the magnetic A particles. Similar stoichiometric considerations apply as in the case of electrostatically bound B and A.

Example 1

"A" is a 100 μm diameter particle of barium ferrite. "B" is an organic polymer containing or coated with numerous nanoparticles of SPM ferrous ferrite, $Fe_3O_4$.

The barium ferrite is premagnetized, and thus retains a remnant magnetism. This is the attractor for particles of B which cluster around the A particle, held by magnetostatic forces.

If A is not an intrinsically magnetic material, it can be coated with a layer of attached material containing a ferrimagnet such as barium ferrite.

Magnetic clustering in accordance with the foregoing method can be used to combine A and B into a dry flowable composite suitable for the manufacture of many materials including energetics and explosives.

Chemical Reaction or Fusion

Figure 7:
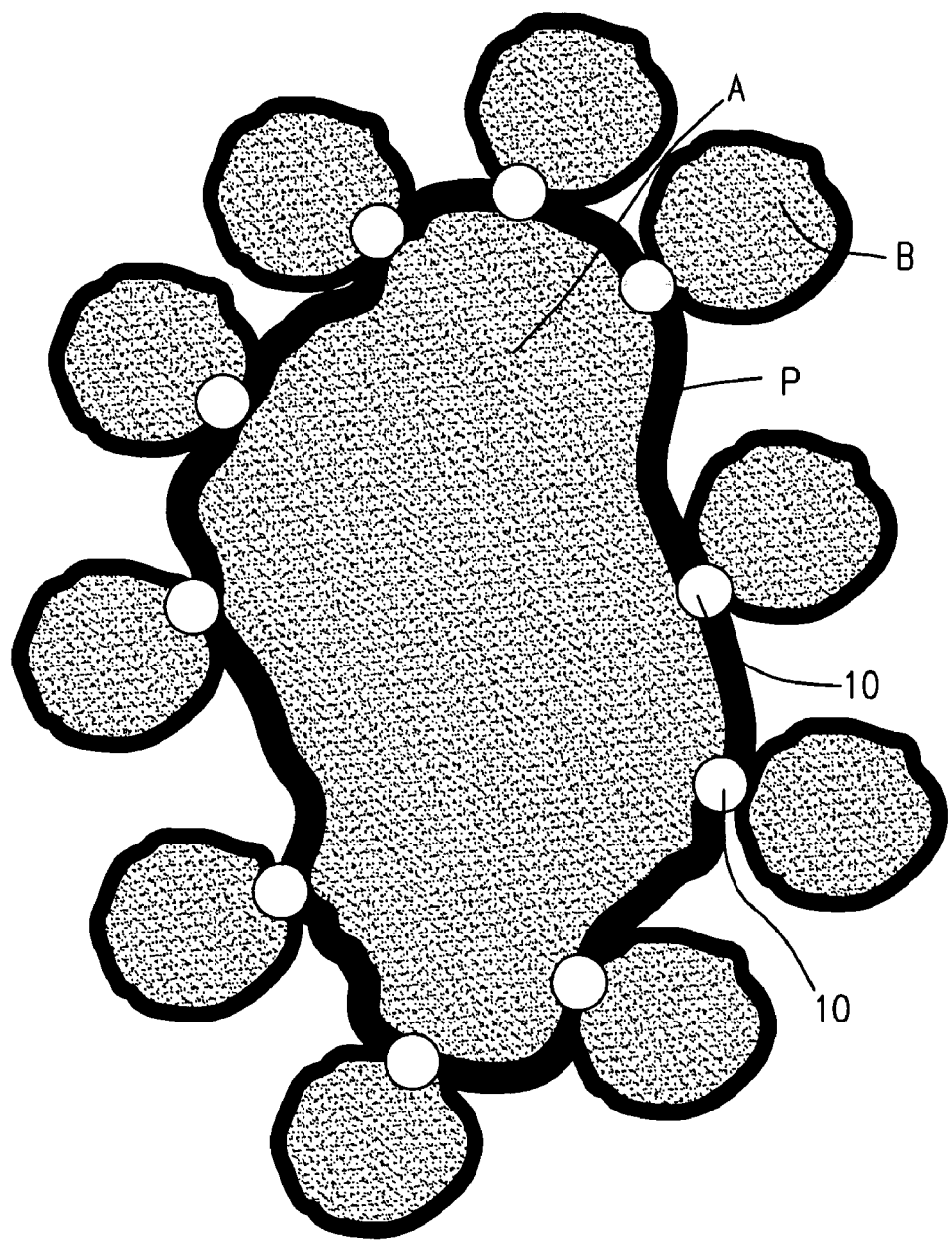
FIG. 7 is an alternative embodiment of a clustering approach in accordance with the present invention.

Now referring to FIG. 7, clustering may be achieved by heating a charge of different sized particles A and B and polymer D above the glass transition temperature of the coated polymer to form fusion points 10 between particles. Alternatively, permanent anchoring among the large and small particles A and B can be achieved via chemical reaction between the selected chemical moieties imparted in the polymeric coating materials. The chemical moiety can be, but is not limited to, carboxyl, hydroxyl or ionic living terminals, amine, silane, epoxy or isocyanate functionalities. The reaction can be induced thermally with or without the use of catalyst, or by irradiation such as E-beam or UV.

Sequential Particle Addition (SPA)

Sequential Particle Addition (SPA) is a novel method of forming clustered particles involving the simultaneous coating of small "guest" particles with large "host" particles with thin polymerizable liquids and the concurrent formation of clusters, formed by a core of individual host particle and a shell of many small guest particles.

Coating small guest particles, especially those in the range of 20 microns or less, has always been a tedious and difficult task. Dry blending of big and small particles before particle-filling presents high probability for particle segregation. Infusion of large and small particle composite in a long tube has also encountered some technical difficulties connected to long times.

In one embodiment the present invention includes a method of simultaneous coating (both large and small particles) and clustering (of large host and small guest particles) that solves all above-mentioned issues and simplifies the process of net-shape manufacturing according to the present invention. In this process, the method of cluster formation between large and small particles is simplified to a single step of coating the large particles with sequential addition of the small particles, which are coated with same liquid coat of the large particles. Thus, there is no need for pre-coating small guest particles. Additionally, no dry blending is needed since the clustered host and guest particles are held together strongly by a single polymerizable liquid which coats the surfaces of both particles. The end result of practicing this process, in the net-shape manufacturing of energetic products, is a very simple process for creating stoichiometric clusters and spatially uniform energetic product, consisting of small and large single or multicomponent particles.

In one embodiment, large host particles are first preblended and coated with polymerizable prepolymer liquids. The coated host particles are then tumble-blended with small guest particles, added sequentially after the coating of the large particles. The tumbling action in the coating equipment further homogenizes the polymerizable liquid coat on the host particles and coats the small guest particles at the same time. The polymerizable liquid acts as the "glue" between the large and the small particles and also as a liquid coat on both. The polymerizable liquid is subsequently cross-linked so that the clusters formed by the SPA method are mechanically strong enough to maintain their integrity during the subsequent particle handling and processing steps of processes employing the clusters. In this novel process, particle coating and clustering are carried out concurrently, eliminating the need for separate coating of large and small particles, simplifying processing steps, and reducing the large difficulties of handling small guest particles. The clusters of host and guest particles formed are held together strongly, eliminating the need for mechanical stabilization of the clusters, which may be necessary for clusters formed via electrostatic and/or magnetic interparticle attraction forces. Finally and importantly, stoichiometry between host and guest particles is easily achieved by varying material parameters, such as the amount of the polymerizable liquids, their composition and the particle sizes.

The amount of polymerizable liquid blended on the large host particles and the amount of small particles can be varied, and result in different number of attached small particles participating in the clusters formed by the SPA process.

Additionally, the host particles are preferably in the range of 50μ to several millimeters and tumble-blended with different levels of liquid binder. The guest particles are preferably about one or two orders of magnitude smaller than the host particles.

The polymerizable liquid system is preferably selected from a polymer solution, suspension, or preferably reactive monomeric/oligomeric combination, all of which react later, after the cluster formation, forming a solid continuous polymer film on the particle cluster surface. The polymerizable liquid serves the dual purpose of both coating the host and guest particles and causing adhering of small guest particles on the big host particles.

The particle clusters of host and guest particles may comprise various materials, such as but not limited to oxidizers and fuels in solid rocket propellant systems, big and small RDX particles in plastic bond explosive (PBX) formulations, active pharmaceutical ingredients (API) and recipient particles in pharmaceutical formulations and the like.

A wide range of stoichiometric ratios between host and guest particles is obtainable by controlling the amount of guest particles being added as well as the amount of the polymerizable liquid preblended with the large particles. In a most preferred embodiment composite particle clusters with multiple layers of guest particles with different properties are obtained by sequentially coating different guest particle systems. Under appropriate processing conditions, individual clusters of host and guest particles have been produced according to the present invention without any significant cluster agglomeration.

In a preferred embodiment the SPA process, as employed in the net-shape manufacturing of spatially uniform and stoichiometrically appropriate energetic pyrotechnic, explosive and propellant products, involves the steps of forming free flowing solid energetic particulates by coating said particulates with a product-specific polymer formulation; blending different-sized coated particulates to achieve desired packing density; pouring said blend into one or more product vessels achieving desired packing density; infusing a polymerizable fluid into the space not occupied by the blended different-sized particulates; and solidifying the polymerizable fluid to form a binder of a solid energetic product.

Coating

Coating of powders by polymer films is of great interest in many diverse fields, and may be accomplished by a number of different processes. Processing of fine particles, typically smaller than 40 microns, pose formidable challenges due to the presence of strong cohesive forces that are significantly larger than the weight of each particle. When such particles have to be coated or granulated, it is necessary to suspend or fluidize them. Specifically, the coating or granulation processes essentially consist of two generally independent tasks that must work in conjunction: fluidization of fine powders so that the particles are suspended and circulate within the apparatus so that they are all exposed to the spray; and spraying of monomers or polymer solutions in such a way that the aerosol is fine and can allow for coating of the suspended particles without excessive agglomeration. Problems typically arise when the liquid is sprayed onto the fluidized powder bed, and the powder tends to stick and agglomerate, resulting in a loss of fluidization and creation of large agglomerates. Nonetheless, there are many techniques and procedures that can be found commercially or in literature where use of specific agitations or other "tricks" help alleviate such problems. However, when particles are fine, particularly less than 50 microns, most of the fluidized bed techniques fail, as now these particles fall into class "C" of Geldart's classification (see, Geldart's Fluidization Map, *Powder Technology*, 7, 285 (1973), incorporated herein by reference) and are considered too cohesive for successful fluidization. Moreover, even if they are fluidized (for example, 50-60 micron size), then the problem of sticking and agglomeration is more pronounced.

Hence fluidization becomes the most important part of such processes. However, according to Geldart's theory, these fine particles are class "C" particles and cannot be fluidized through use of a conventional fluidized bed.

Continuous Rotating Fluidized Bed (RFB) Coating and Granulating Processes

Figure 8:
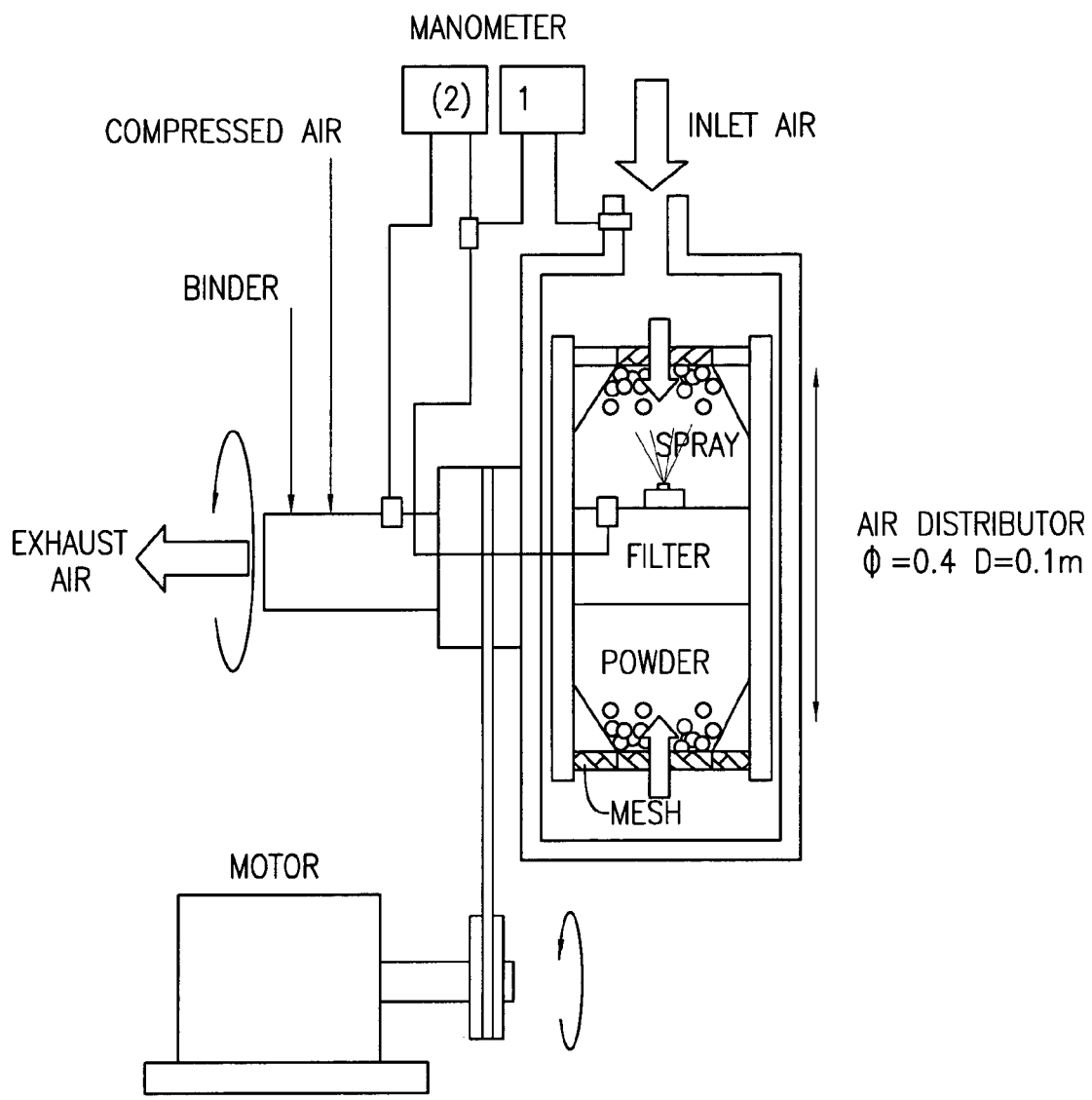
FIG. 8 is a cross-sectional side view of a coating and granulating apparatus that may be employed in connection with the present invention.

As best seen in FIG. 8, a rotating (or centrifugal) fluidized bed, such as but not limited to commercially available equipment like the Omnitex, commercially available from Nara Machinery of Japan, provides a unique advantage, because the high speed of rotation creates a large centrifugal force field, and it has been found by the present inventors that under such field, the fine cohesive group C particles can act as fluidizable group A particles. In other words, in a rotating fluidized bed, the centrifugal field effectively shifts the boundary between class "A" and class "C" powders. Thus, employing a RFB for processing can make fine RDX powders readily fluidizable. Experiments show that fine particles can be coated in a controlled manner using this approach.

The RFB can also be used to granulate cohesive fine powders. Through "microgranulation", the flowability of cohesive fine powders with narrow size distribution is improved while inhibiting the granule size increase as much as possible due to high agitation in the RFB. Moreover, the same technique allows for creating ordered particulate structures, useful for the process of net shape manufacturing of the present invention.

Figure 9A:
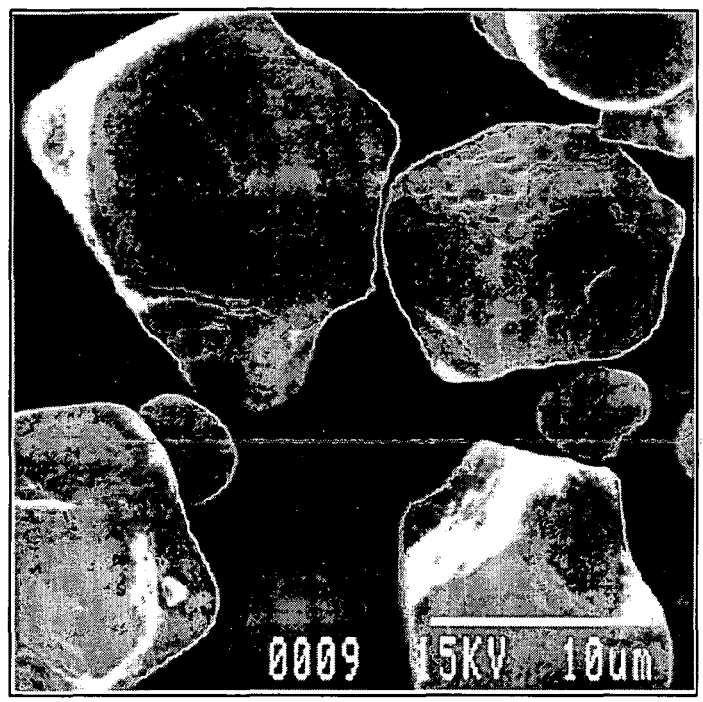
FIGS. 9A and 9B are scanning electron micrographs of pre and post coating processes.
Figure 9B:
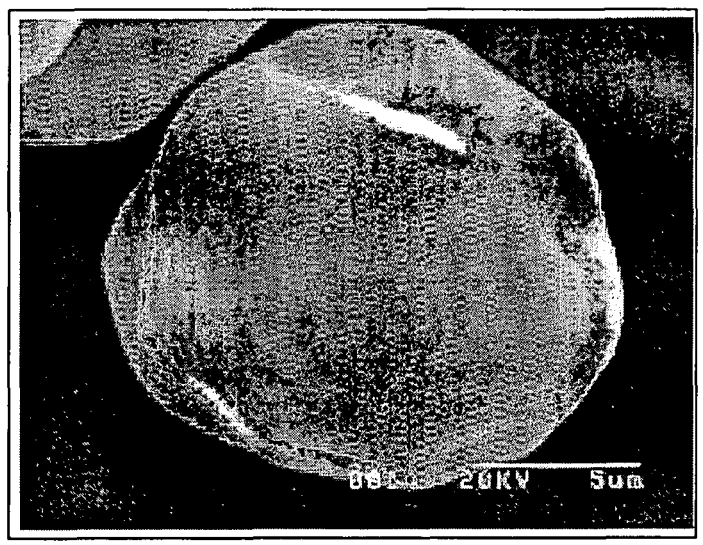

Experiment—Coating of Cornstarch 0.3 kg of cornstarch, having a median diameter of about 15 microns, was charged in a rotating fluidized bed and sprayed with a 10% aqueous solution of hydroxypropylcellulose (HPC-L). The liquid feed rate of the HPC-L was 0.75 g/min, the spray air pressure was 0.55 MPa, the air temperature 333K, the airflow rate 0.805 m/s ($u/u_{mf}$=2.5) and the rotational speed of the rotating fluidized bed was 7.88 rps (50 G, i.e., 50 times the gravitational force). Now referring to FIGS. 9A and 9B scanning electron micrographs (SEMs) of cornstarch before coating and after coating are shown. FIG. 9B shows a particle having a 9% solution of HPC-L coating. Coating appeared uniform, and very little agglomeration was observed.

Figure 9C:
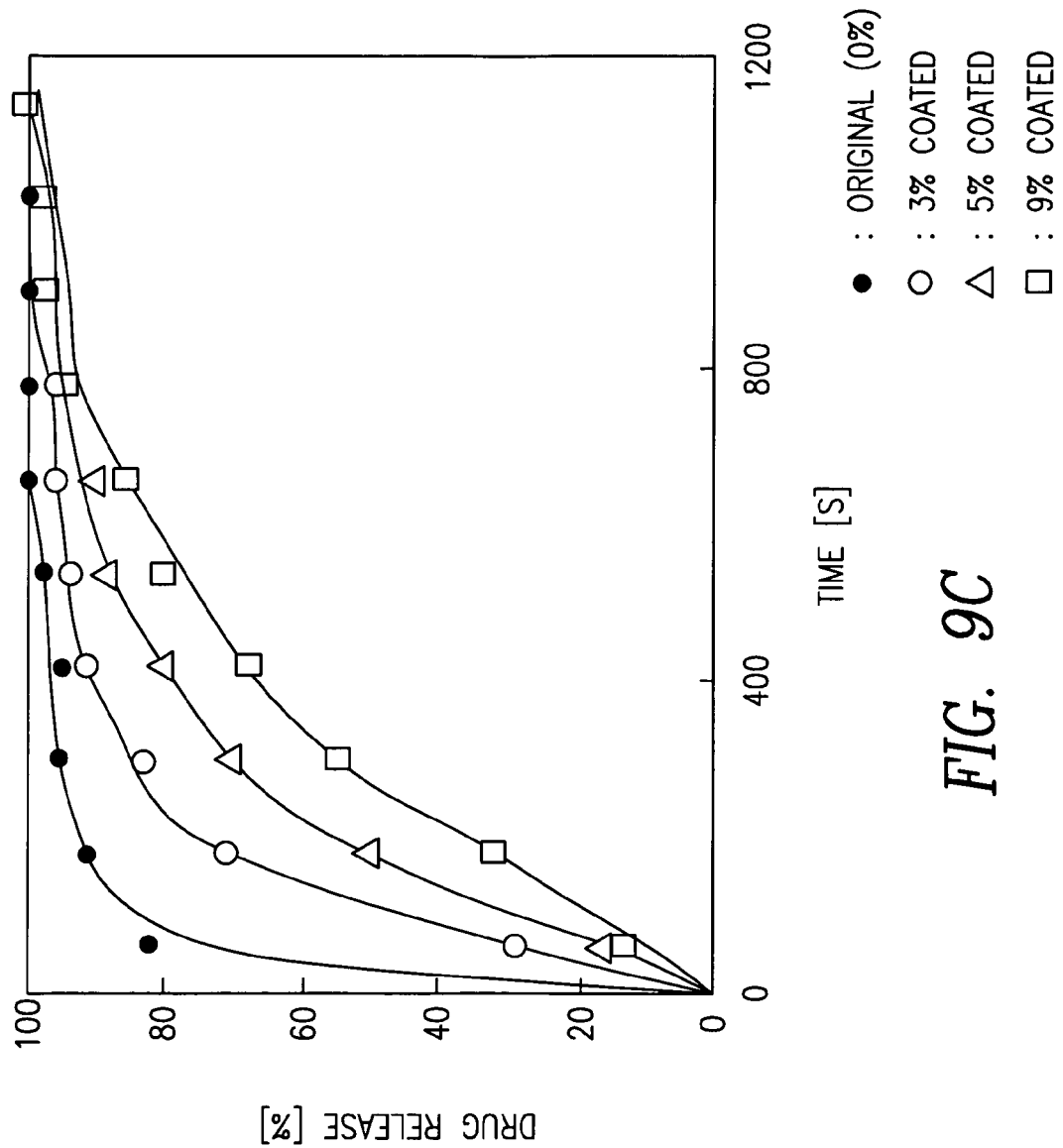
FIG. 9C is a graphical representation of a dissolution profile.

A drug-release study was performed comparing uncoated cornstarch and the 9% HPC-L coated cornstarch. Aqueous pigment food blue No. 1 was used as a model drug, which was precoated (0.05 wt. %) onto the cornstarch powder. The coated product was placed in a standard dissolution vessel. Now referring to FIG. 9C, for the uncoated cornstarch, 80% release of the "drug" occurred in less than one minute. For the 9% coated cornstarch, 80% release took over ten minutes.

Figure 9D:
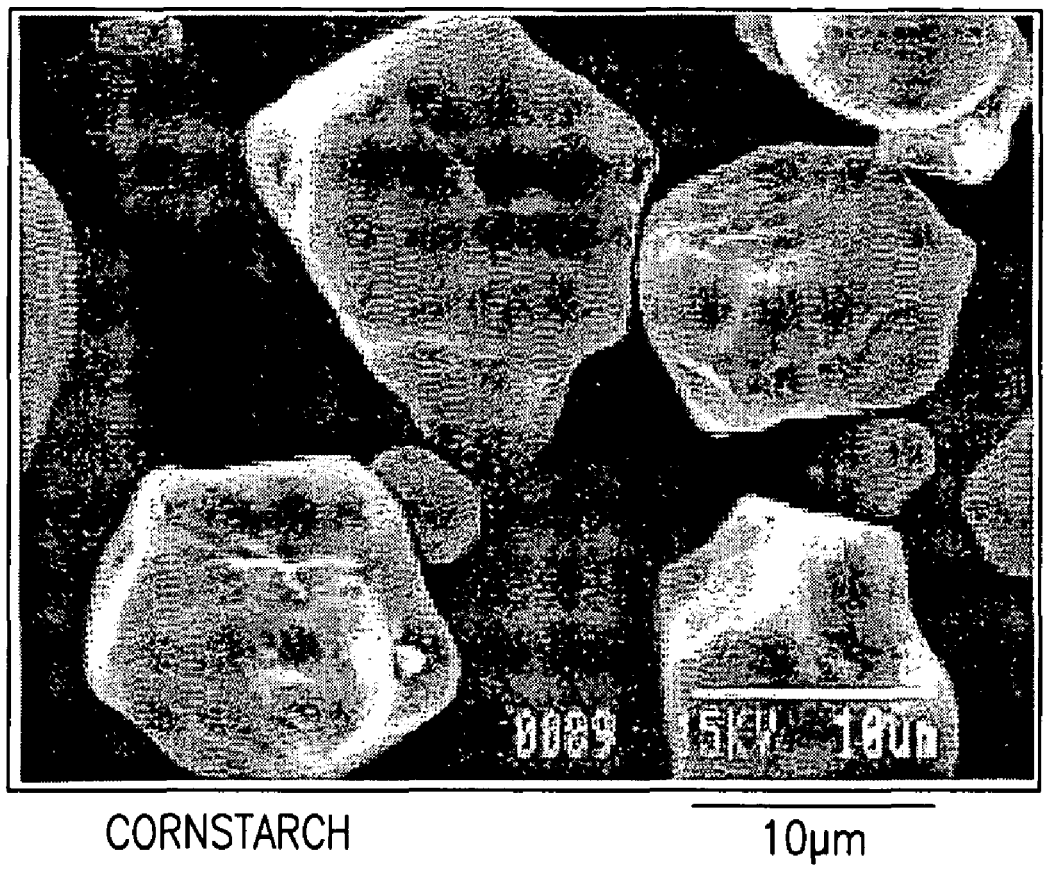
FIG. 9D is a scanning electron micrograph of a cornstarch particle prior to coating in a rotating fluidized bed apparatus.

Experiment—Granulation of Cornstarch 0.15 kg of cornstarch, having a median diameter of about 11 microns (see FIG. 9D) was charged in a rotating fluidized bed and sprayed with a 3% aqueous solution of HPC-L. FIGS. 9E-9I, SEMs of the cornstarch particles at various stages of the granulation process, clearly show an increase of particle agglomeration/granulation with time. FIG. 9I, the SEM taken at t=1200 s, shows granulates having a diameter of about 30 microns and no unagglomerated particles.

Experiments—and Granulating in a RFB for RDX Simulants

Experiments were conducted using an Omnitex RFB to test the feasibility of coating and granulating RDX-5 simulants using an RFB. The simulant materials used were Dechlorane Plus 515 powder having an average particle size of 10 microns and hydroxypropyl cellulose (HPC-L), a common water-soluble polymer used in binding applications. The description of materials and parameters are set forth in Table 2.

TABLE 2

| Description | Coating (T5) | Granulation (T7) |
|---|---|---|
| Powder: | Dechlorane Plus 515 | Dechlorane Plus 515 |
| Mass of Powder: | 240 g | 240 g |
| Total Time for Experiment | 120 min | 25 min (min drying) |
| Binder | HPC 5% Water | HPC 5% Water |
| Binder's Flow Rate (Set): | 0.3 g/min | 2 g/min |

TABLE 2-continued

| Description | Coating (T5) | Granulation (T7) |
| --- | --- | --- |
| Binder's Flow Rate Average: | 0.274 g/min | 1.85 g/min |
| Total Binder Applied | 32.91 g | 36.11 g |
| Distributor's Diameter | 35 cm | 35 cm |
| Centrifugal Acceleration: | 80 G | 20 G |
| Average Air Flow Rate: | 0.10 m$^3$/min | 0.10 m$^3$/min |
| Air Temperature: | 140° F. | 140° F. |

Coating of Dechlorane Plus

Figures 10A, 10B:
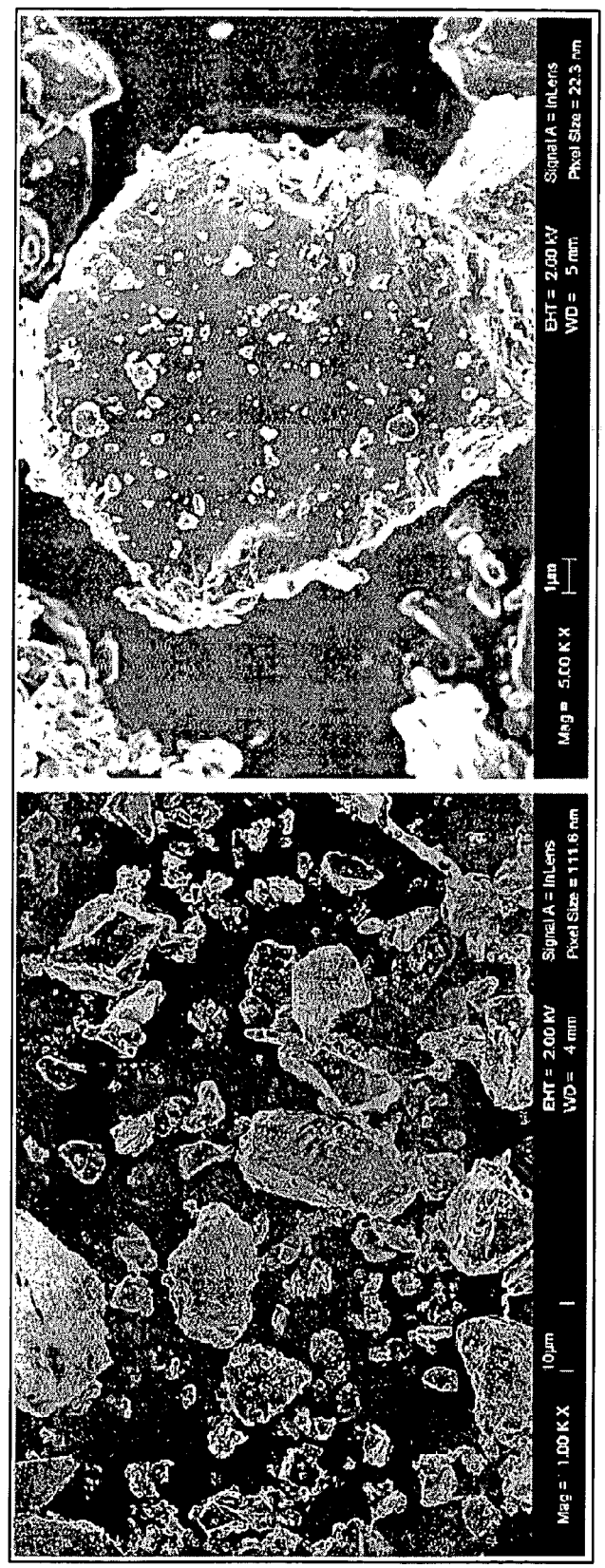
FIGS. 10A and 10B are scanning electron micrographs of uncoated Dechlorane Plus 515 particles.
Figures 10C, 10D:
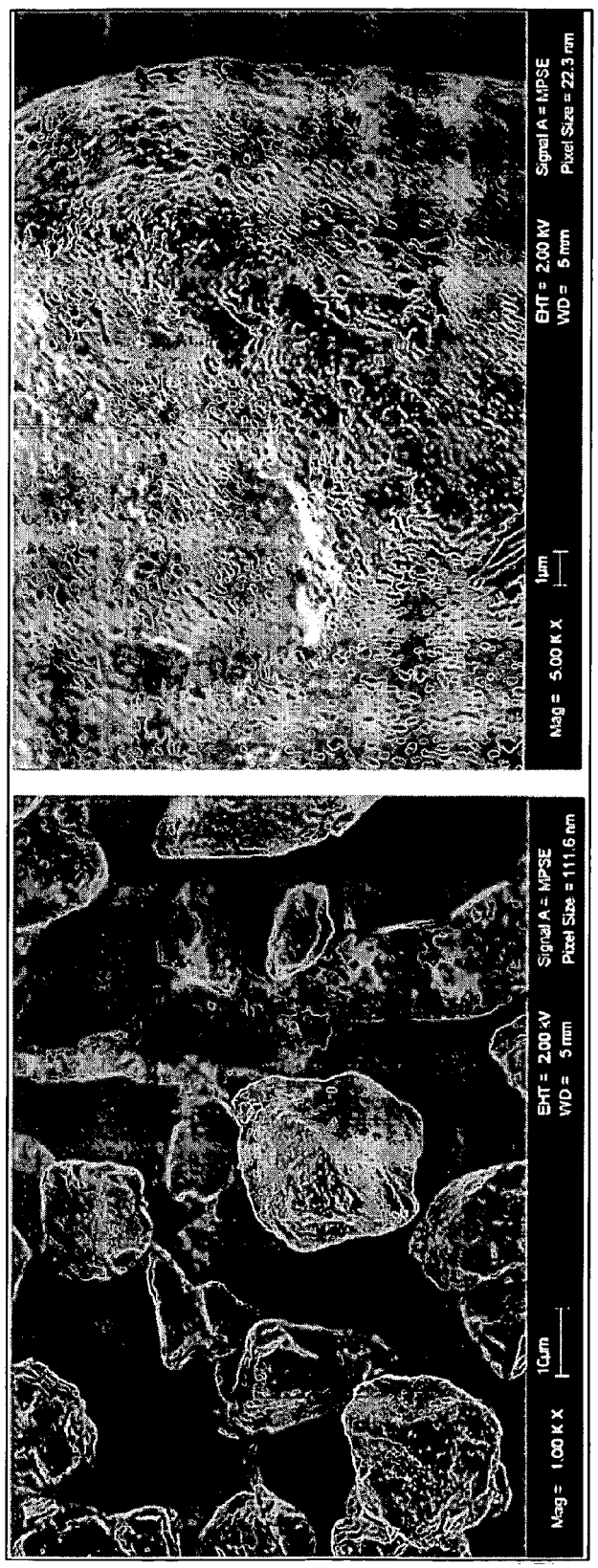
FIGS. 10C and 10D are scanning electron micrographs of coated Dechlorane Plus 515 particles.

Now referring to FIGS. 10A-10D, SEMs of uncoated Dechlorane Plus 515 particles (FIGS. 10A and 10B) are compared to SEMs of coated Dechlorane Plus 515 particles (FIGS. 10C and 10D) prepared according to the parameters set forth in Table 2. FIGS. 10C and 10D show little agglomeration and uniform coating of the particles. The uncoated particles have a different surface morphology than the coated particles.

Thus, RFB can be used for wet coating of small cohesive particles, including RDX-5 powders, without significant agglomeration as compared to conventional fluidized beds where high shear due to high gas velocities prevents the product from forming excessive agglomerates. The RFB can also be used to create controlled or sustained-release products for pharmaceuticals, fertilizers, supplements and nutritional additives. The RFB is particularly well suited for use in the net-shape manufacture of munitions in accordance with the present invention.

Granulation of Dechlorane Plus

Figures 10E, 10F:
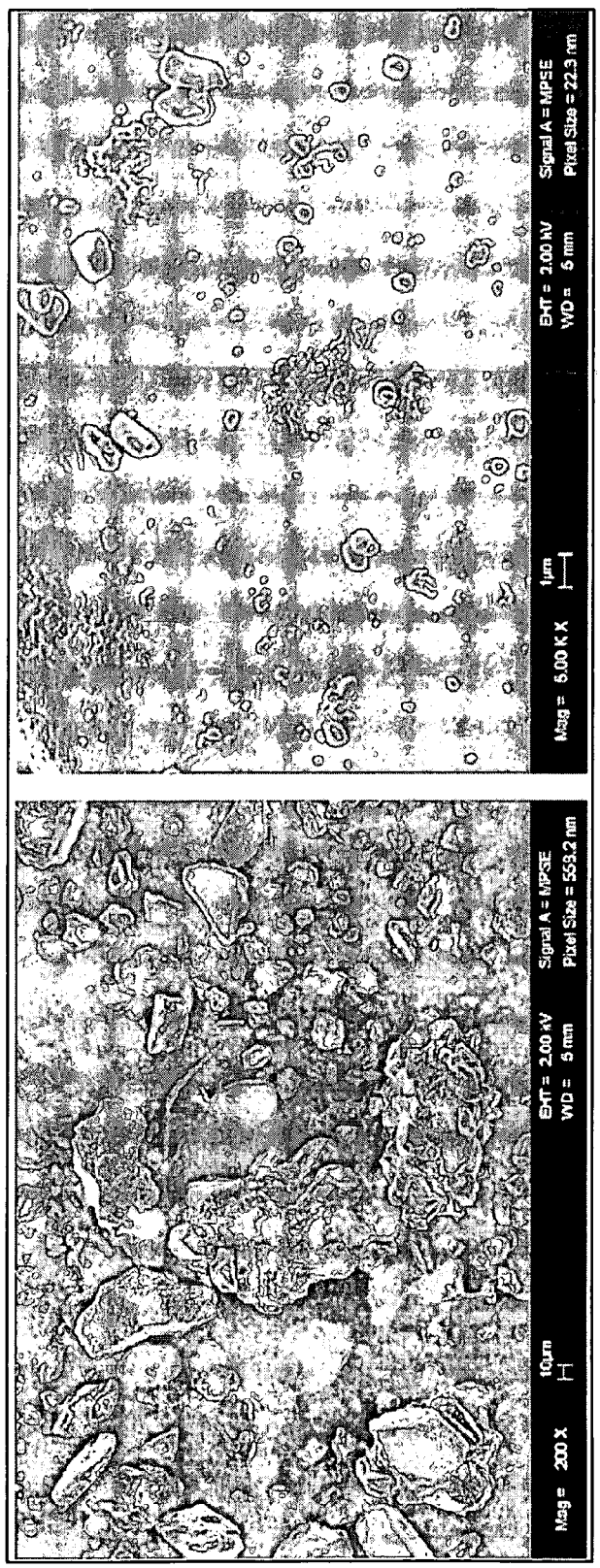
FIGS. 10E and 10F are scanning electron micrographs of Dechlorane Plus 515 particles after granulation.

In granulation of RDX material in a RFB, the spray rate that is employed is preferably higher than that used for RDX coating. Now referring to FIGS. 10E and 10F, SEMs of Dechlorane Plus 515 particles after granulation show granules are formed of Dechlorane Plus fines, along with some individually coated particles.

Therefore, wet granulation in a RFB can be employed to enhance the flowability of cohesive fine powder to produce a narrower size distribution while inhibiting granule size increase.

Coating/Granulation of Fine Particles through Magnetically Assisted Fluidization Magnetically assisted fluidization techniques may be applied for coating or granulating particles, such as according to the methods and processes disclosed in U.S. Pat. No. 5,962,082 to Hendrickson et al., incorporated fully herein by reference.

Figure 11:
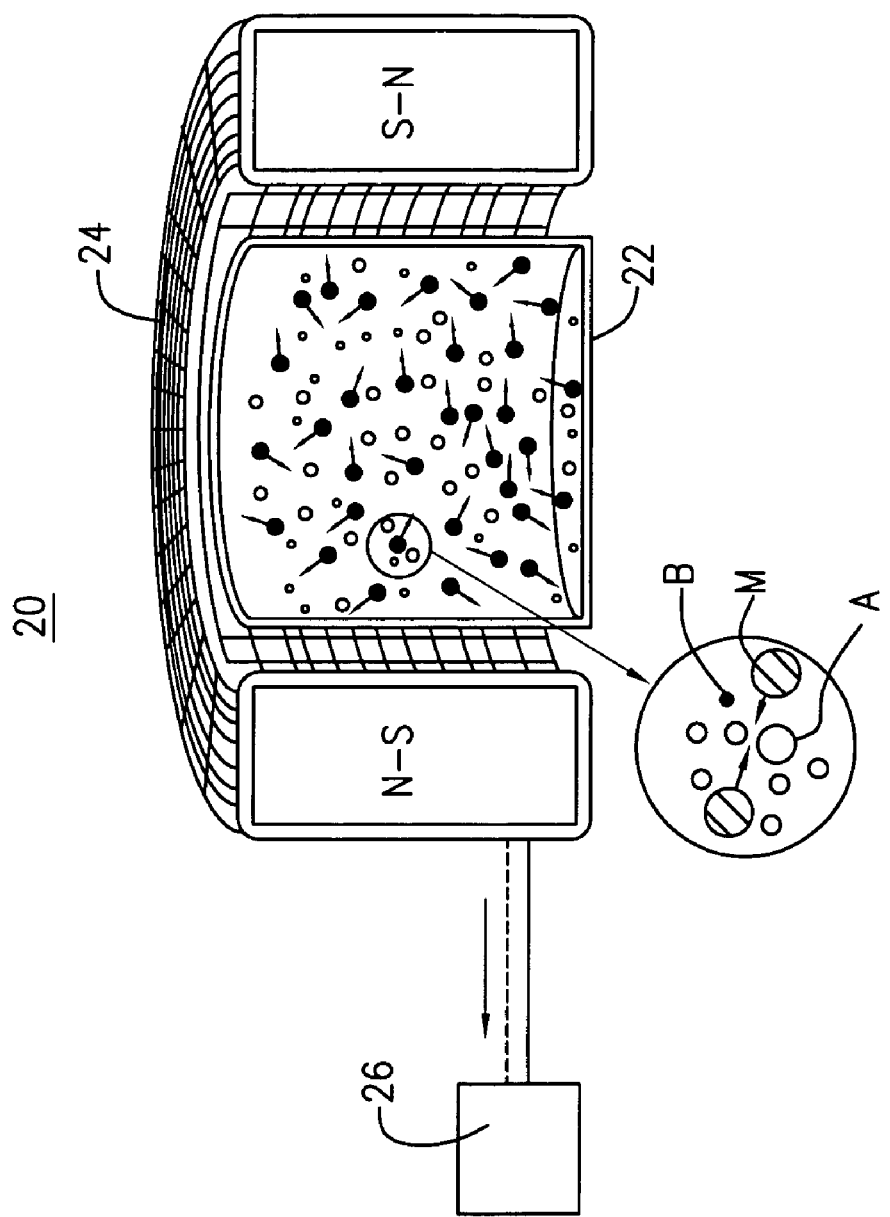
FIG. 11 is schematic representation of a magnetically assisted fluidization system in accordance with one embodiment of the present invention.

In one embodiment magnetically assisted fluidization can be utilized for smaller, 10-20 micron sized particles. Now referring to FIG. 11, a general schematic of a magnetically assisted fluidization system 20 is disclosed. A mixing chamber 22 is disposed within an electromagnetic field coil 24 connected to a power source such as an AC power supply 26. Large host particles A are charged and tumbled in the chamber 22 with smaller guest particles B and magnetic particles M. A number of experiments indicate that the use of magnetic agitation combined with either aeration or tumbling may be used to achieve a well-fluidized bed of fine powders, and due to the action of spinning magnets, agglomeration of the sticky/coated particles may be avoided or greatly controlled.

Two systems are disclosed in which in each system, the powder to be coated is placed in a vessel along with permanent magnets that are 50 to 100 times larger in diameter than the powder to be coated, indicating that the surface area of the magnets is well over an order of magnitude smaller than the powder to be coated. The vessel is subjected to an oscillating magnetic field causing the magnetic particles to spin violently and undergo collisions with the walls and the other particles. As a result, the whole system is intensely fluidized, and is able to handle fine, cohesive particles for subsequent processing such as coating or granulation.

The proposed devices can be employed for granulation of fine powders and coating of larger particles by polymer and smaller particles.

Aerated Magnetically Assisted Fluidized Bed (AMA-FB)

Figure 11A:
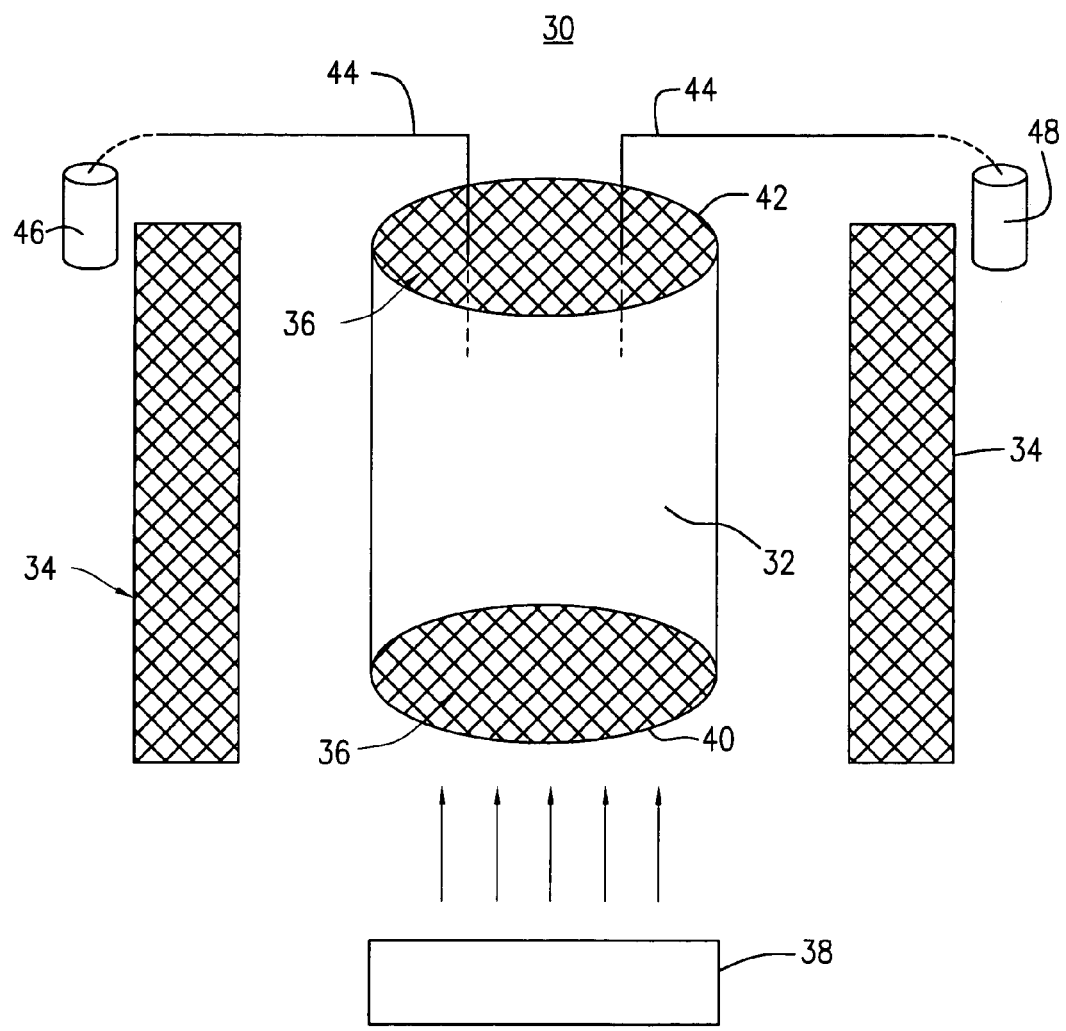
FIG. 11A is a schematic of a magnetically assisted fluidization device according to one embodiment of the present invention.

FIG. 11A refers to a first embodiment of a magnetically assisted fluidization device 30. A cylindrical chamber 32 is disposed within an electromagnetic field coil 34, which is supplied with an alternating current (A/C) from a power supply (not shown). The chamber 32 further comprises at least one filter 36 such as but not limited to a fine non-metallic mesh or sintered ceramic distributor at the bottom through which air is supplied. The chamber 32 is filled with a powder to be coated, mixed with magnets M (preferably about 2 mm in size), and barium ferrite, coated with polystyrene or polyurethane. The weight ratio of magnets to powder is adjustable depending on the performance of the system, but typically ranges from 1:1 to 3:1. Air, or other acceptable gas such as argon, nitrogen or carbon dioxide, supply system 38 keeps the powder well mixed and prevents it from forming a cake at the bottom of the vessel. Where a solvent-based polymer spray is employed (not a necessity for this process), the air also helps in drying of the coated product.

The coil 34 is preferably a stator coil, and can be custom-made or extracted from any A/C motor. The size of the coil 34 is dictated the geometry of the chamber 32 and the required magnetic field strength. In one embodiment a 3-phase A/C coil with a variac is employed.

The chamber 32 is typically conductive plastic or glass. A commercially obtainable vial may also be used. The size of the chamber 32 is dictated by the loading amount of powders. Preferably the bottom 40 of the chamber comprises a sintered ceramics plate, as a distributor for air. The pore size of the distributor is restricted by the size of loading powders. The lid 42 of the container can be made of simple mesh, and the exhaust (not shown) should go to a hood. Capillary tubes 44 are incorporated into the lid 42 for monomer injection from tanks 46 and 48.

A spray system for monomer injection (not shown) comprises appropriate commercially available nozzles and syringe pumps. Preferably a dedicated spray system is employed for each monomer in a multi-monomer system. The monomers may be added in an alternating mode to build polymer layers to a desired thickness, such as sequential injection of di-isocyanate and polyol to form polyurethane. An alternative for syringe system injection is an airflow atomizer. Lab compressed air can be served as an air supply system 38 with a flow meter. Any suitable gas such as but not limited to $N_2$, $CO_2$ or argon may be employed. In a preferred embodiment this fluidization device is suitable for polymer solution coating if heated air is used for drying.

Tumbling Magnetically Assisted Fluidized Bed (TMA-FB)

Figure 11B:
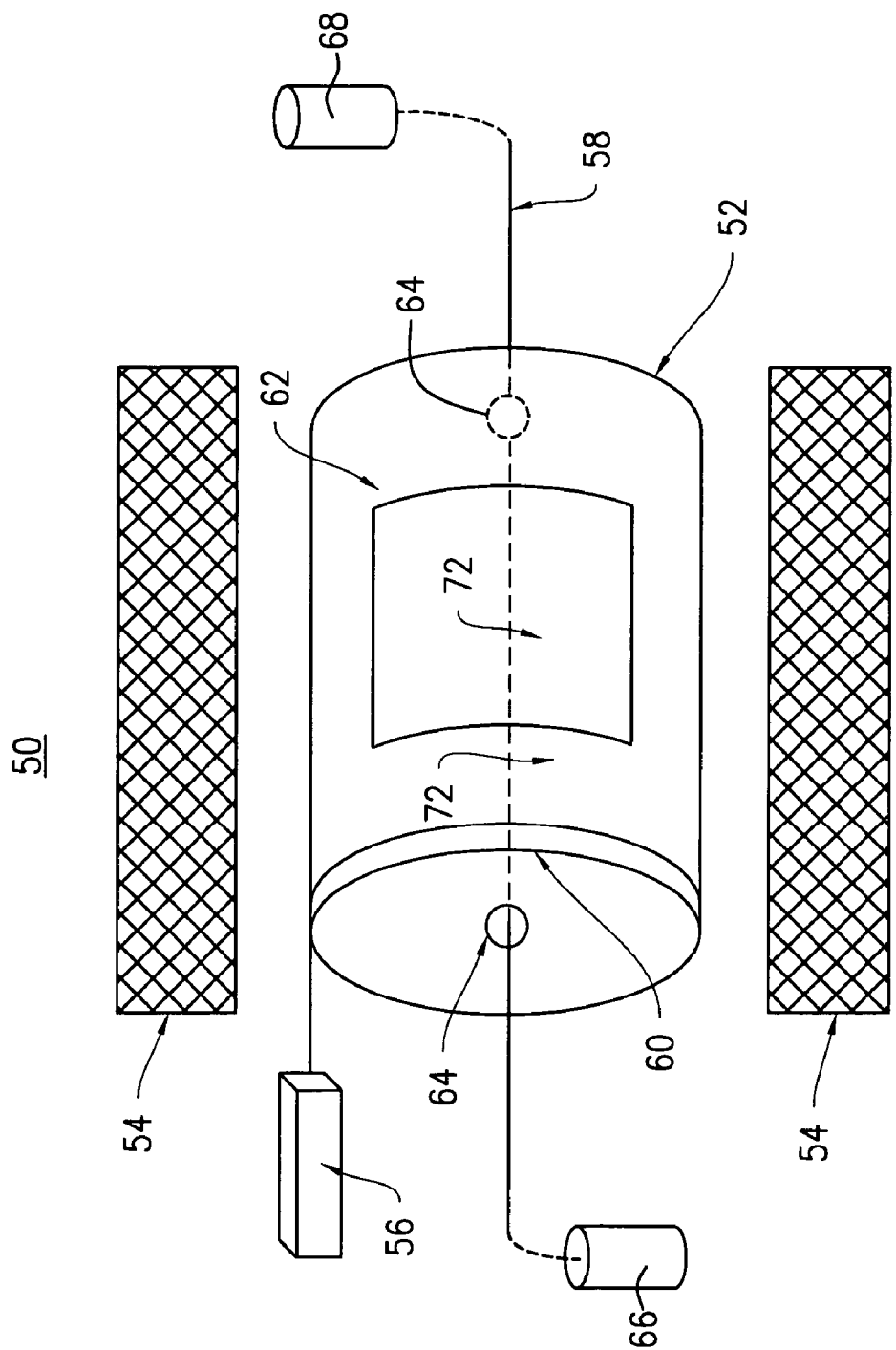
FIG. 11B is a schematic of a tumbling magnetically assisted fluidized bed in accordance with one embodiment of the present invention.

Now referring to FIG. 11B, in A TMA-FB system 50, a drum 52 is placed within an electromagnetic field coil 54, which is supplied with an alternating current (A/C) from motor 56, in such a way that it can be rotated in a manner like a tumbling ball mill.

The coil 54 is preferably a stator coil, and can be custom-made or extracted from any A/C motor. The size of the coil is dictated by the geometry of the drum and the required magnetic field strength.

The drum 52 is preferably made of a plastic material. The geometry is preferably cylindrical and the ratio of length to diameter is preferably approximately 1:2. The size of the drum 52 is determined by the amount of material to be added. One end of the drum 52 is operably connected to a motor output shaft 58 to move the drum 52. In one embodiment one end of the drum 52 is wrapped with abrasive tape 60 to connect with the motor 56 to drive the drum 52. In an alternate embodiment, the drum 52 rests on two rollers (not shown), one of which is a driver, the other of which is an idler as in a typical ball mill. An opening 62 is formed, preferably in the middle of the drum 52 for feeding and discharging materials. Bearings 64, preferably plastic, are connected on the center of the side of drum 52 to connect the moving drum 52 and the shaft 58.

The rotational speed of the motor 56 is preferably variable such as from tens of rpm to hundreds of rpm. Optimal rotational speed can be varied.

Now referring to FIG. 11C a preferred embodiment is shown of a configuration of a shaft 58 that is used for spray of monomers or liquids. Now referring to FIGS. 11D-11F, the shaft 58 preferably comprises at least one hollow 59 and is used to support the drum 52 and inject monomers from vessels 66 and 68 (FIG. 11B) into the chamber. Syringes (not shown) are used to inject monomers into the drum 52. In a preferred embodiment at least one capillary tube 70 is employed to achieve improved atomization of injected monomers. The capillary tube 70 is disposed in the hollow 59 of shaft 58. Preferably the inject position 72 is adjusted manually by moving the tube 70 inside the shaft.

In use, the vessel is partially filled with the powder to be coated, mixed with magnets (about 2 mm in size), barium ferrite, coated with polystyrene or polyurethane. The weight ratio of magnets to powder is adjusted depending on the performance of the system, but typically ranges from 1:1 to 3:1. The tumbling is needed to keep the powder well mixed and to prevent it from forming a cake at the bottom. In a preferred embodiment a fixed arm (not shown) is positioned near the wall of the drum to scrape the powder off of the wall of the drum. The ball mill type TMA-FB of MAIC is suitable for in-situ reaction of two monomers.

Both AMA-FB and TMA-FB are designed to coat, cluster or granulate energetic materials.

Ultraviolet Particle Coating

Conventional liquid spray particle coating process are commonly known to be prone to agglomeration due to the prolonged period of time needed to convert coated liquid to tack free solid, even when the un-coated particles can be well separated in the suspension stage. The common use of solvent/non-solvent in conventional particle coating processes also causes environmental, health and cost concerns. A new solvent-less process of coating particles comprises introducing UV curable liquid onto a suspended particle, followed by curing when exposed to UV irradiation. The particle suspension can be achieved by conventional dry particle coating devices such as fluidized coaters, drum coaters, or tumbling coaters with some modifications, which are equipped with liquid spray capabilities. The suspension media, depending on specific application, can be air, nitrogen, carbon dioxide or any other gases, where non oxygen containing media is preferred due to its potential to inhibit the UV polymerization reaction as well as improved safety. Vacuum can also be applied in closed system coaters such as drum or tumbling coaters. After a selected amount of UV-curable liquid is coated on the particle surfaces, the coated UV liquid is instantaneously converted to solid coatings when exposed to a UV source.

This novel particle coating process takes advantages of UV curable material's ability to form almost instantaneously tack-free surfaces.

Essentially, the novel UV particle coating technology comprises the steps of fluidization and UV curing.

Fluidization

A variety of coaters may be employed for fluidization including but not limited to batch operating coaters such as a Glatt Mini fluidized bed with liquid spray (top or bottom) nozzle, rotating fluidized bed, magnetic assist impact coater, AMA-FB, TMA-FB, drum coater with or without mixing baffles and deflectors; and continuous coaters such as free fall coaters with or without the use of deflectors and spin coaters. Preferably, any coater employed is modified for UV delivery by providing quartz windows where applicable.

Figure 12:
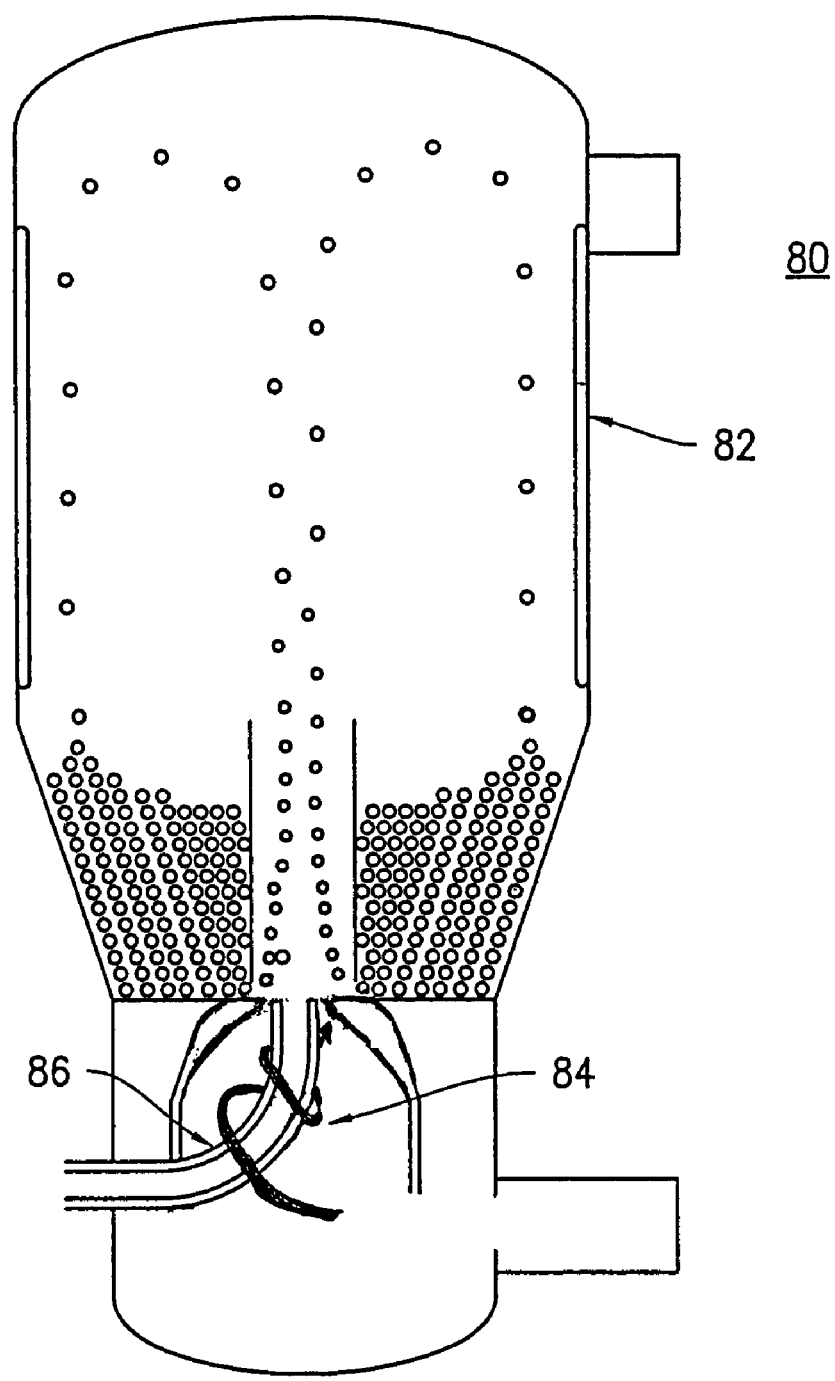
FIG. 12 is a further embodiment of a coater according to the present invention.

Now referring to FIG. 12, a fluidized bed coater 80 is equipped with a UV lamp 82, swirl accelerator 84 and a UV curable liquid port 86.

Figure 13:
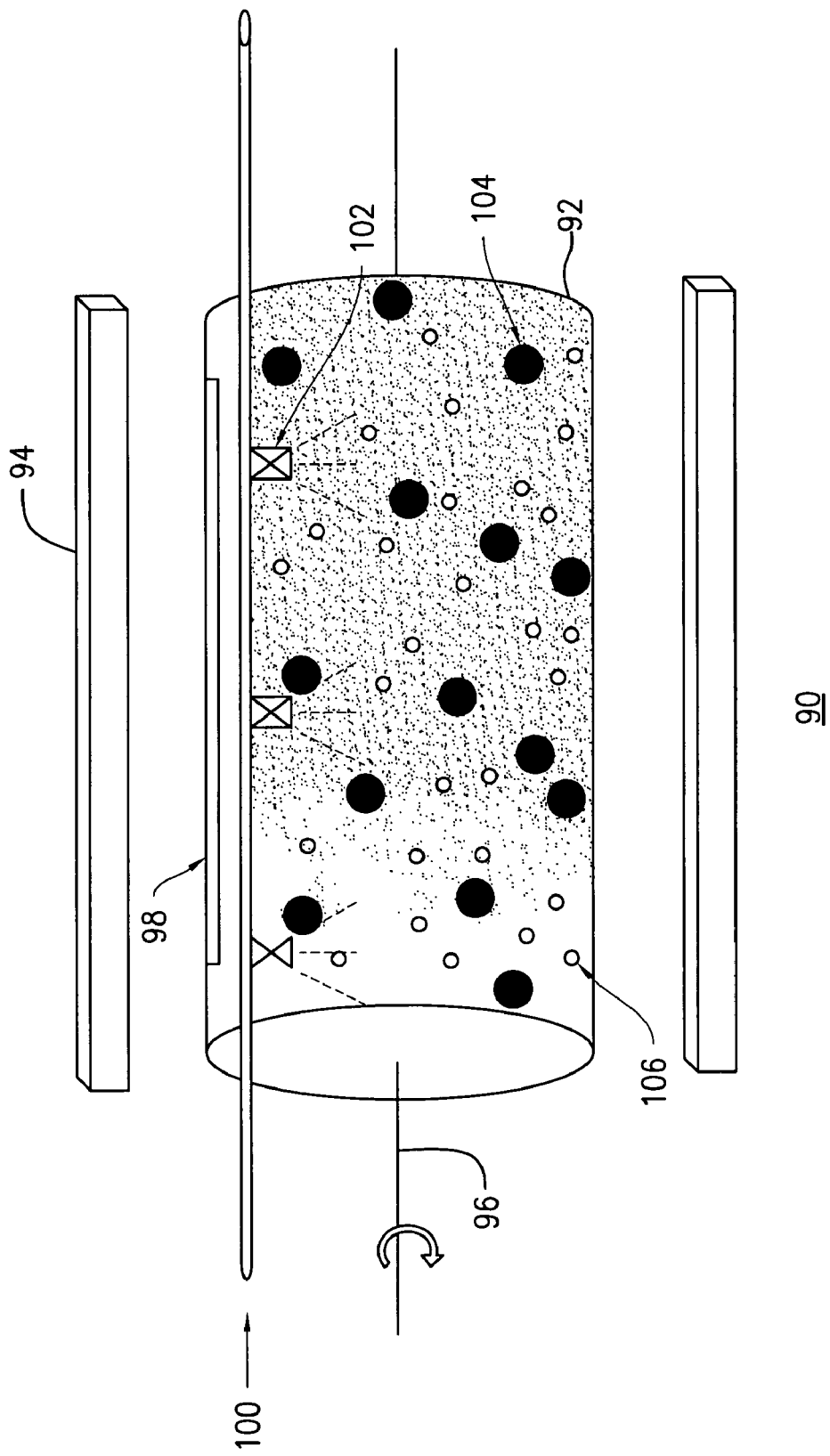
FIG. 13 is a preferred embodiment of a coater according to the present invention.

Now referring to FIG. 13, a magnetically assisted fluidized coating device 90 comprising drum 92, coil 94, and shaft 96 in accordance with the previous discussion is adapted to include a UV light source 98. UV curable liquid is injected in port 100 and injected into coater 90 through injectors/atomizers 102. Magnets 104 are tumbled with particles to be coated 106 such as but not limited to RDX.

UV Curing

The UV curing step may employ free radical systems or ionic systems. In free radical systems the curable materials polymerize and cure only when exposed to UV radiation. Suitable UV curable monomers include aliphatic urethane acrylate, aromatic urethane acrylate, polyester acrylate, epoxy acrylate, ether acrylate and amine modified ether acrylate. Reactive diluents include mono or multi-functional acrylates. Photo initiators include $\alpha$-hydroxylketone, $\alpha$-aminoketone, mono acyl phosphine and bis acyl phosphine. The UV range is in the range of 200~400 nm.

Preferably, the surface tack-free time in free radical systems ranges from a fraction of a second to minutes, most preferably less than about 10 seconds. Complete through cure time can range from a fraction of a second to minutes, most preferably less than 30 seconds. The coating thickness ranges from 1 to 100 microns, preferably less than 5 microns. Optimum curing temperature ranges from about 20° C. to about 80° C., preferably about 20° C. Appropriate acceptable gas media include air, argon, carbon dioxide and nitrogen, preferably CO2.

Coatings made in accordance with the present invention employing free radical systems exhibit good adhesion, cost-effectiveness, and a wide range of attainable properties.

In ionic systems, once initiated, polymerization and curing will advance even without exposure to UV radiation. Suitable cationic curable materials include monocycloaliphatic epoxides and biscycloaliphatic epoxides. Examples of suitable co-monomers are vinyl ethers. Suitable photo initiators include diaryliodonium salts and triarylsulfonium salts. The UV range is in the range of 200~400 nm.

Preferably, the surface tack free time in ionic systems ranges from a fraction of a second to minutes, most preferably less than about 10 second; in general, however, the time is somewhat slower than in free radical systems. The complete through cure time can range from a fraction of a second to minutes, most preferably less than about 30 seconds. The coating thickness ranges from 1 to 1000 microns, preferably less than 5 microns. Optimum curing temperature ranges from about 20° C. to about 80° C., preferably about 20° C. to about 50° C. Appropriate acceptable gas media include air, carbon dioxide and nitrogen, preferably CO2.

Coatings made in accordance with the present invention employing ionic systems exhibit low shrinkage, excellent mechanical properties, and good adhesion.

The UV particle coating methods of the present invention permit at least one thin layer of crosslinked polymeric materials to be evenly coated onto selected particles, while the particle agglomeration is kept at a minimum or entirely eliminated. The methods allow the tailoring the coating structure and thickness, which can be achieved by controlling numbers of spray/curing cycles of the same or different UV curable liquids.

Binder Materials

Coating and binder materials may be selected from the same group of materials. Suitable binders are those that have adequate rheological properties, and good chemical compatibility with the polymeric coating material on the coated particles. Such binders include but are not limited to monomeric or pre-polymeric urethanes, acrylates or epoxies. A preferred binder and coating material is a commercially available polyurethane-based binder/adhesive such as but not limited to Smooth Cast™ 327. To insure minimum microscopic "voids" in the munitions items, the binder also exhibits minimum or no volume reduction upon the polymerization/crosslinking reaction. A thorough infusion which allows the binder to completely penetrate and occupy all interstitial spaces is also essential for uniform burn rate and high energetic density. In a preferred embodiment binder selection is made such that the binder has sufficient pot life for the binder to be fully infused before any cross-linking reaction takes place, and sufficiently low viscosity to permit rapid infusion. Therefore, binder selection must be made with the following considerations in mind: properties of crosslinked polymeric coating materials; properties of crosslinked polymeric binder materials; optimal interfacial properties between coating and binder; and impact of energetic particle size and shape. The diverse properties of binders/adhesives permit the fine-tuning of the coating properties, for large and small particles, and cluster bonding (between large and small particles) to improve the performance of energetics such as insensitivity.

Particle Packing

The inert coated particles are poured into a vessel of a selected demonstration item to reach a predetermined packing density. The packing process is preferably performed under reduced air drag conditions. Moreover, in accordance with the present invention, particle assemblies can be prepared in various configurations. Various powder configurations yield different packing densities. These packing densities can be manipulated such as by adjusting coating thicknesses, as well as particle-composite (coated, clustered, or granulated) configuration. In this way, called, tailored particle-composite design, final packing densities can be achieved ranging from about 0.5 to about 0.75 depending on the requirement of the particular net shape article of manufacture.

In a most preferred embodiment, graded munitions, of which the energetic charged density is arranged in a predetermined fashion, are achievable employing the processes of the present invention. During the packing stage, the packing density of energetic particles are manipulated through the selection of particle size and size distribution, particle geometry, coating thickness and size and size distribution of granules. Depending on the geometry of the munitions item, the variation of energy density is adjusted, by design, to be axial or radial, high to low or low to high in a monotonically or non-monotonically fashion. Furthermore, different energetic particles (ex: RDX, HMX, fuels, oxidizers) can be incorporated into the same munitions with various compositions.

Unlike conventional melt pour process, the processes of the present inventions are not limited by the pot life of the binder. Selected batches of energetic particles can be poured in the munitions product vessel sequentially to be allowed to form a pre-determined arrangement, followed by the infusion of a polymerizable and crosslinkable binder.

Various scenarios for packing powders of two distinct sizes, ~200 microns (e.g. KCl) and ~20 microns (e.g. dechlorane) according to the present invention are considered as below, and through such combinations, one can easily manipulate final packing densities to achieve a desired value:

1. KCl coated with polymer a, and dechlorane coated with polymer a or b, such that the coating thickness for dechlorane is smaller than KCl.
2. Dechlorane particles along with polymer a, are coated onto the KCL particles to form clustered particles.
3. Dechlorane particles, through use of polymer a as a binder are agglomerated or granulated to a size value about 20 to 50% of the KCl particle size, and KCl particles are coated by polymer a or b.
4. Similar to case 3, but dechlorane granules can have a specific size distribution, or may have two or more specific sizes all within 20 to 50% of the KCl particle size, and KCl particles are coated by polymer a or b.

In cases above, the thickness of the polymer coating can be also manipulated to achieve the desired value of the solid packing; each case covering a certain range of attainable values.

Packing densities are discussed further in reference to infusion.

Particle Coating and Clustering

Various known powder mixing/blending equipment such as those described hereinabove, including some continuous equipment, can be employed to practice the SPA technique to form clustered structures.

Experiments were conducted in accordance with the present invention in which particles were coated and clustered using a drum coater. The drum coater employed four baffles and a variable speed drum. The basic steps in the experiments comprised preblending particles with reactive binder having a pot life of about 20 minutes; charging binder-coated particles into the drum coater (these first two steps are preferably combined when using drum coaters having binder injection capability); further homogenizing the binder coat by tumbling; and after being lifted by the baffles suspended particles in free-fall become tack-free via cross-linking of the reactive binder coat.

In the series of experiments, the materials employed were RDX simulant particles. In these experiments potassium chloride (KCl) having a size of about 200 μm (REHEIS: PHARMA-K) (40-200 mesh: 70~400 μm); and Dechlorane Plus ($C_{18}H_{12}Cl_{12}$) 515: ~10 μm (Occidental Chemical Corporation: Dechlorane Plus-515) were employed.

Experiment 1

Figure 14A:
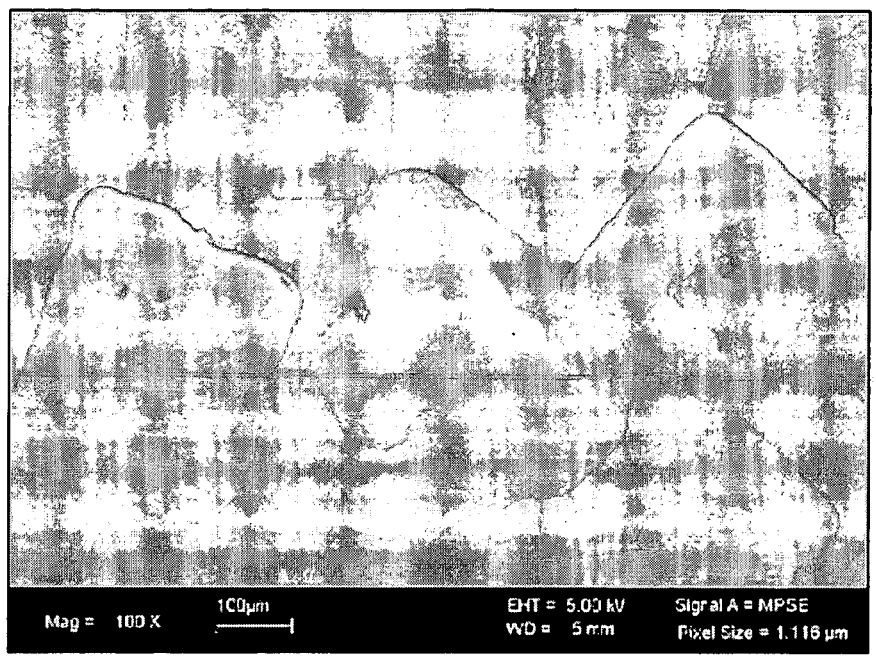
FIGS. 14A and 14B are scanning electron micrographs material prior to coating in accordance with one embodiment of the present invention.
Figure 14B:
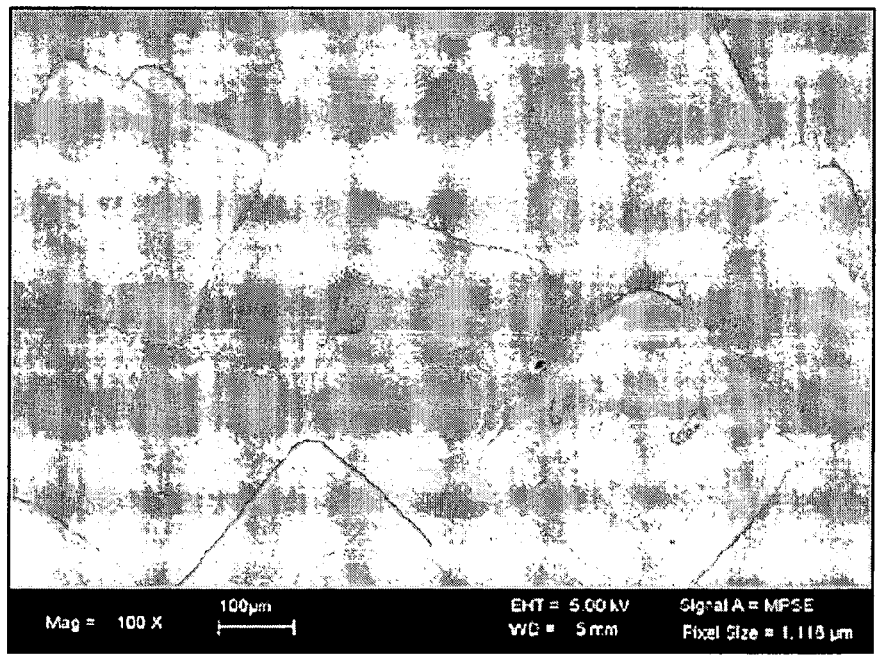
Figure 14C:
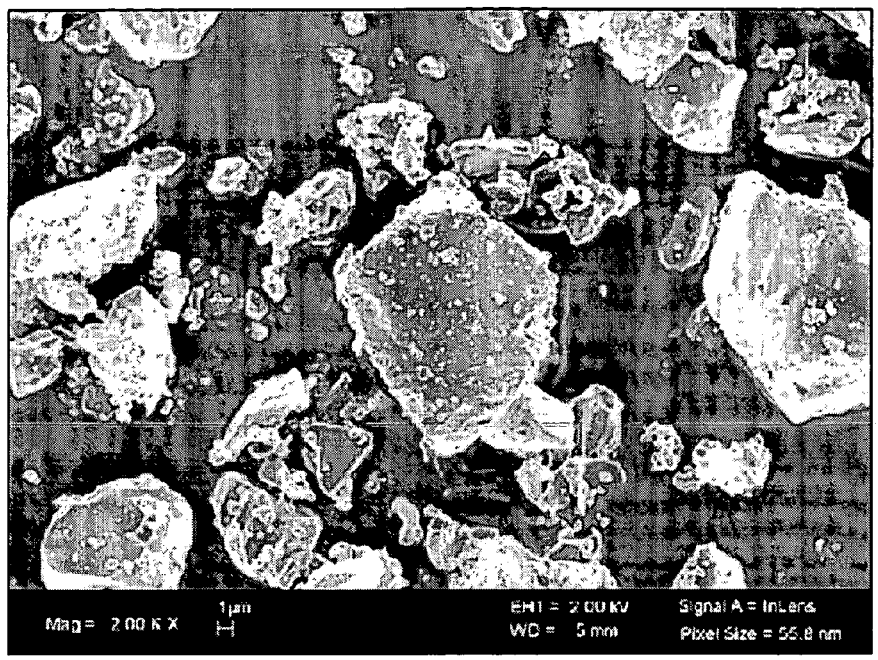
FIGS. 14C and 14D are scanning electron micrographs of uncoated material in accordance with one embodiment of the present invention.
Figure 14D:
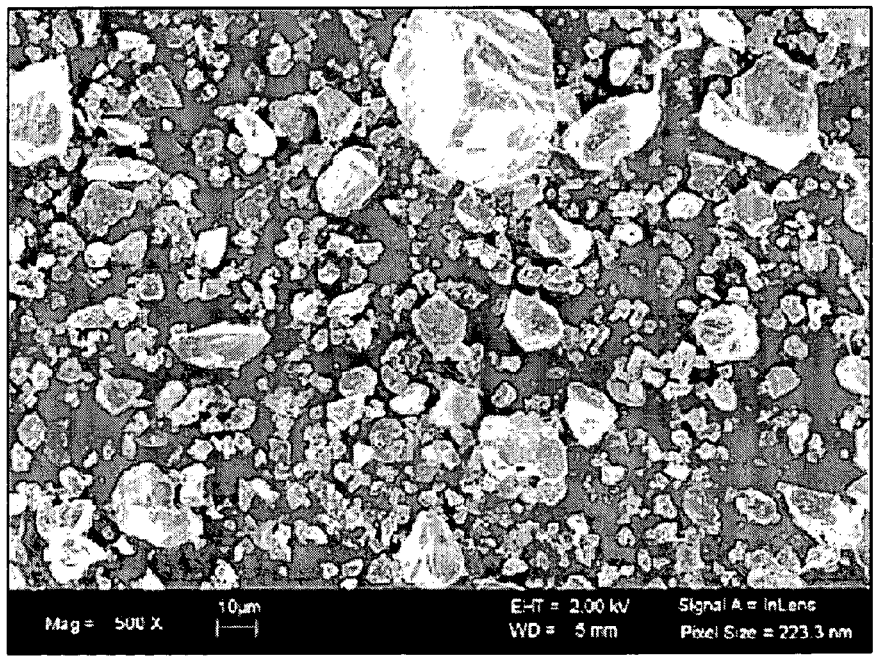
Figure 14E:
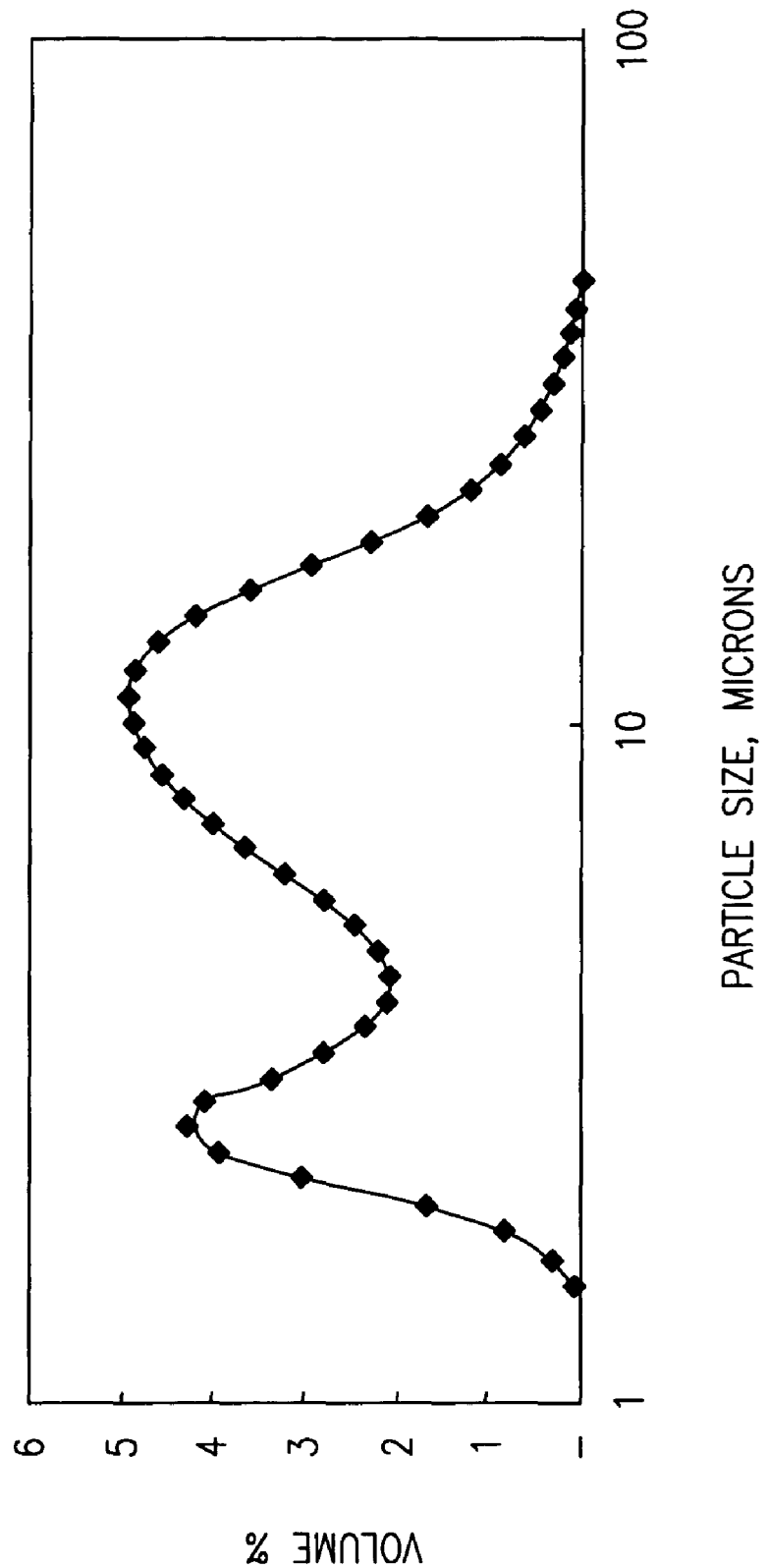
FIGS. 14E and 14F are graphical representations of particle size distribution of the materials according to FIGS. 14A-14B and 14C-14D, respectively.
Figure 14F:
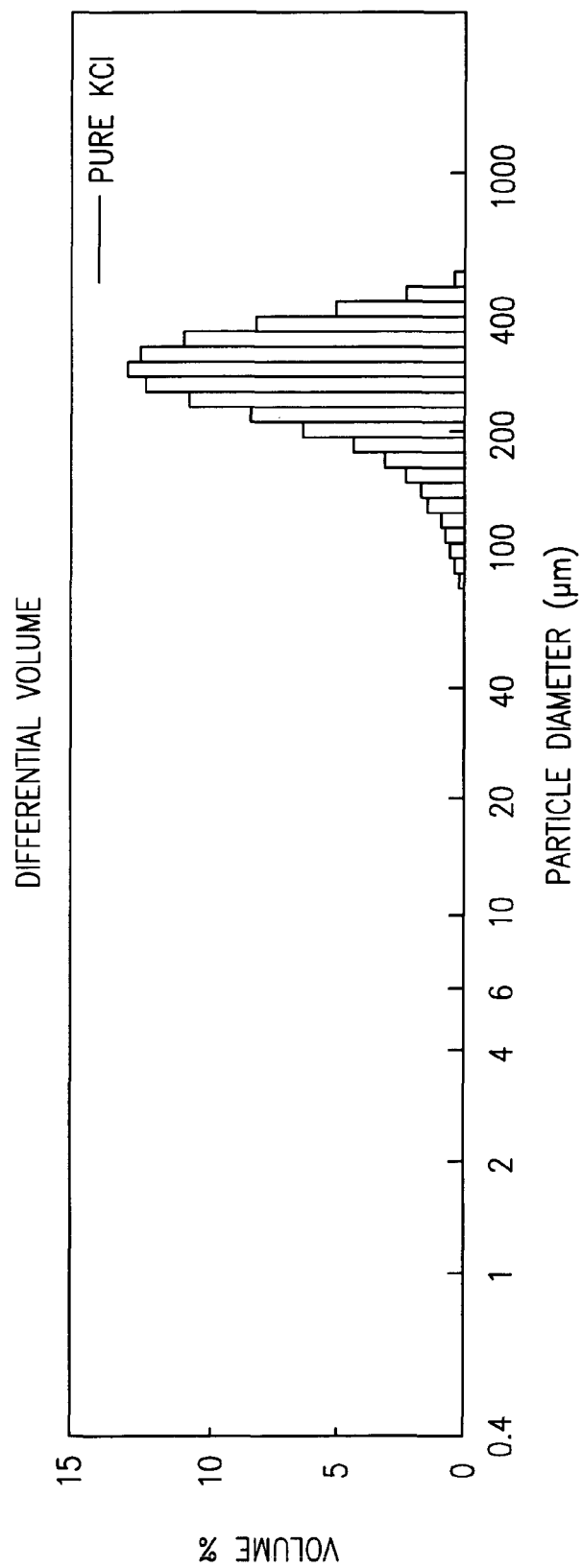

Now referring to FIGS. 14A and 14B SEMs of uncoated KCl (about 200 μm) show cubic crystals with surface defects. Now referring to FIGS. 14C and 14D SEM photographs of uncoated dechlorane (about 10 μm) show particles of irregular shape and size. Now referring to FIGS. 14E and 14F, particle size distributions for dechlorane and pure KCl are shown. The pure KCl has a mean of 284 μm.

Figure 14G:
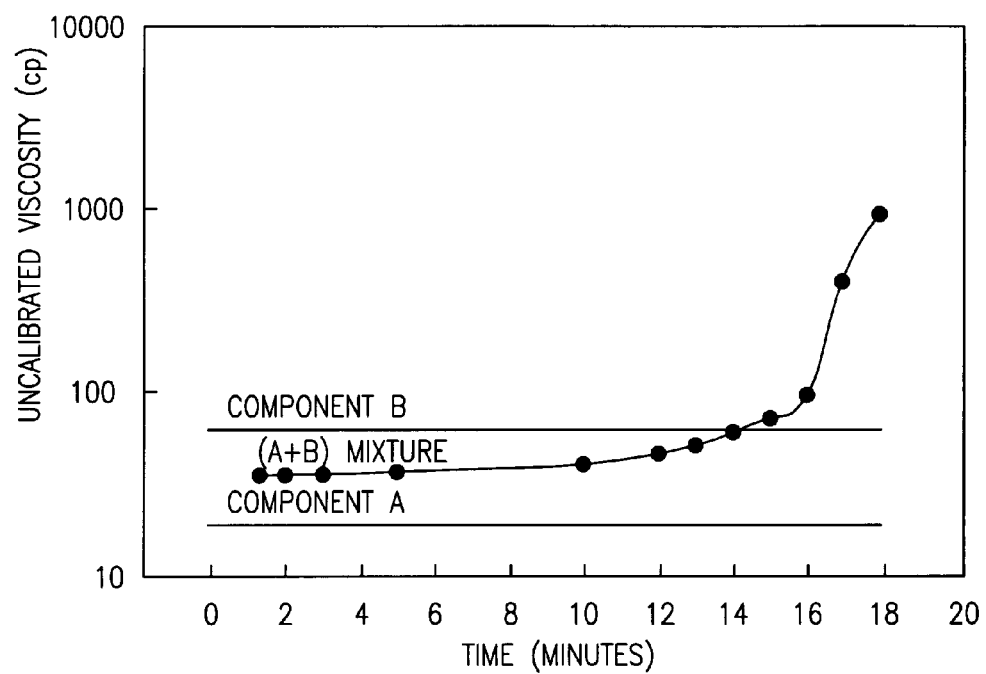
FIG. 14G is a graphical representation of viscosity change over time for a preferred coating material according to the present invention.

The binder employed in these experiments was Smooth-Cast 327™, a two component system with an A:B mixed ratio of 1:1 pbv. The shrinkage of Smooth-Cast 327™ is 0.35% with a specific gravity of equal volume mixture A:B of 1.60 g/cc. The viscosity of the Smooth-Cast327™ mixture increases with time. Now referring to FIG. 14G a graphical representation of the changes of viscosity with time for Smooth-Cast 327™ is disclosed.

Employing the sequential particle addition (SPA) method of the present invention, a particle mixture of KCl and Dechlorane Plus was coated. 240 g of KCl was preblended with 3 ml of equal volume of A and B Smooth-Cast 327™ in a Ziploc™ bag for a few minutes. After a uniform binder coat was formed on the KCl particle surface, 60 g of Dechlorane Plus was added and tumbling in the bag was continued for another few minutes. The preblended particle mixture with binder was charged into the drum coater. The coater was rotated at 40 rpm for about 1 hour.

Figure 15A:
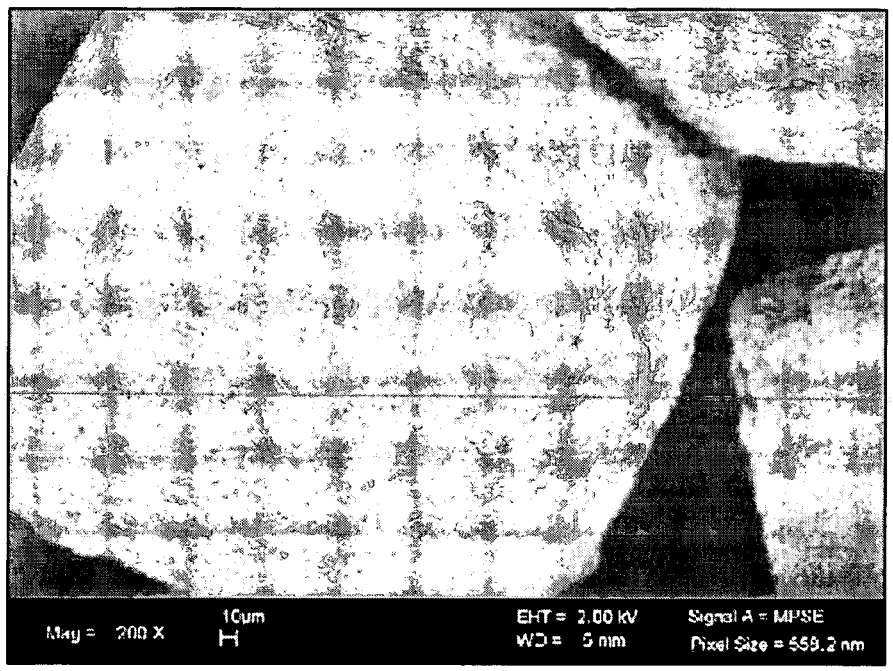
FIGS. 15A and 15B are scanning electron micrograph of particles coated according to one embodiment of the present invention.
Figure 15B:
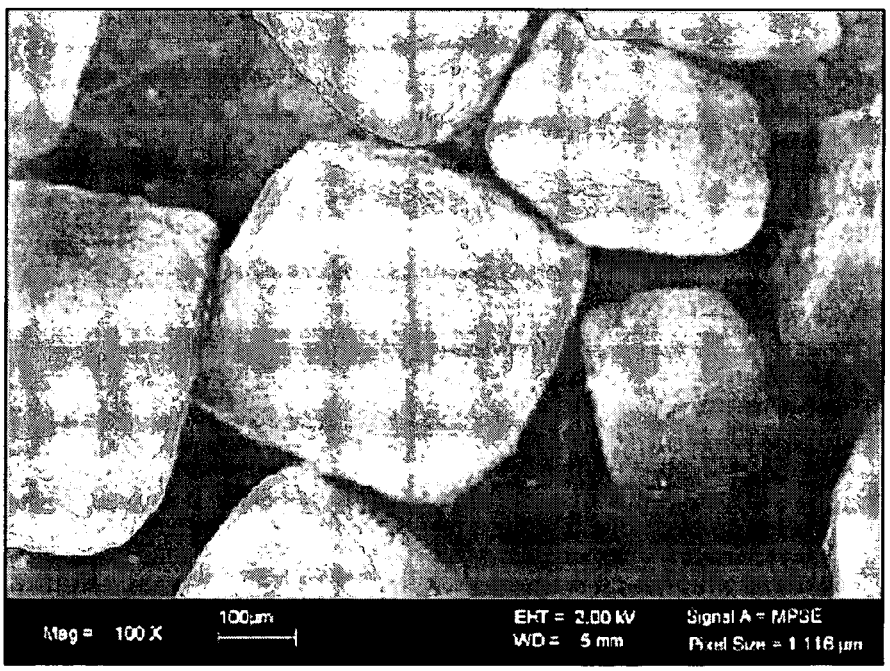
Figure 15C:
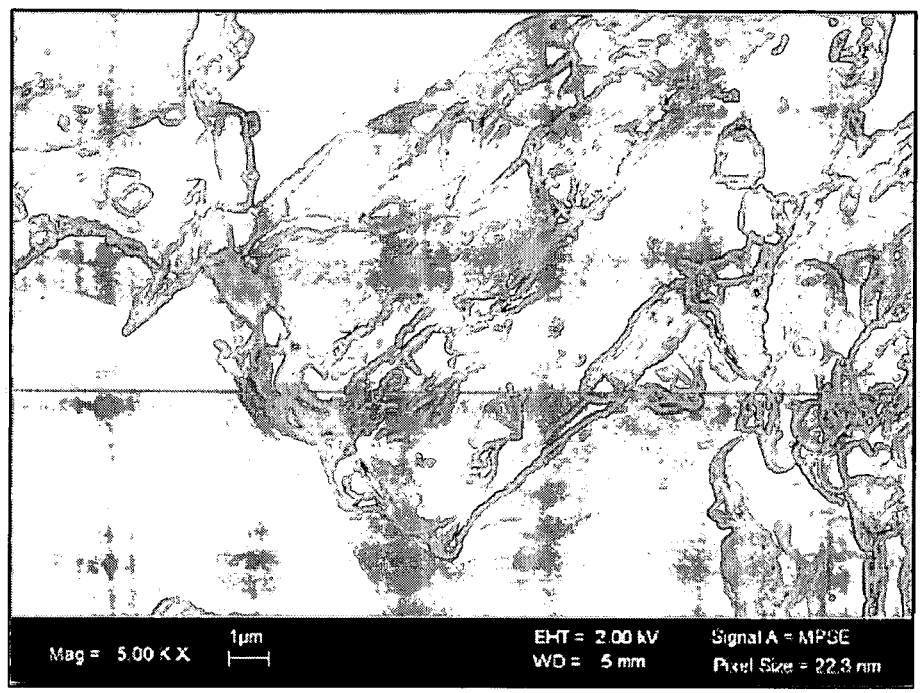
FIGS. 15C and 15D are scanning electron micrographs of materials subjected to coating according to one embodiment of the present invention.
Figure 15D:
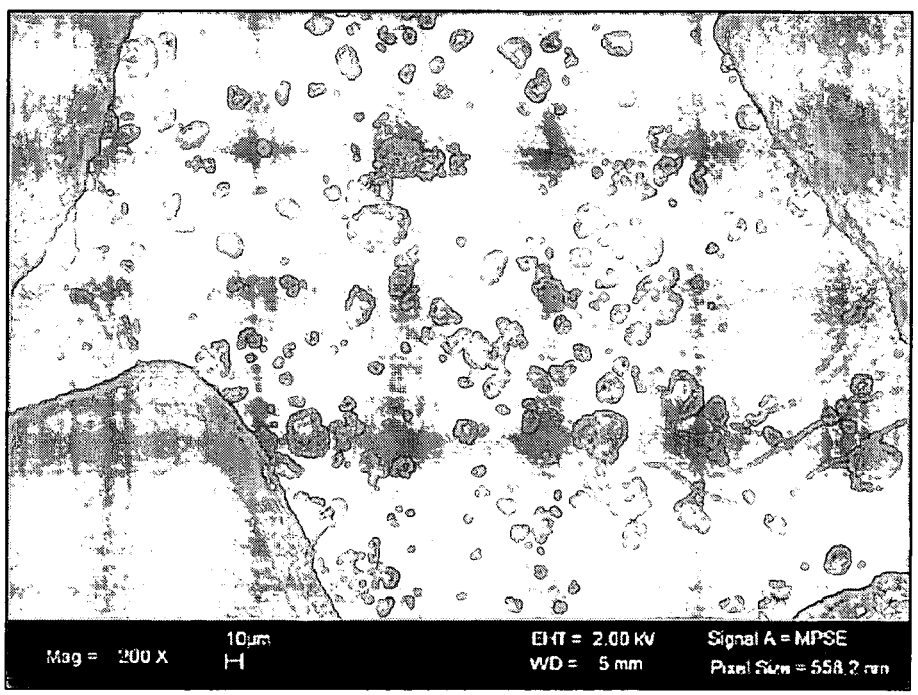

The SPA technique resulted in good coating with only a few weak agglomerates which were easily deagglomerated. Now referring to FIGS. 15A and 15B SEMs show the big KCl particles having a continuous film coating. The particle mixture exhibited enhanced flow properties because the big KCl particles enhanced the flow and small dechlorane particles absorbed the extra binder as a result of greater surface area. Now referring to FIGS. 15C and 15D, SEMs show the small dechlorane particles resulting from the foregoing coating procedure. The small dechlorane particles were also coated.

This technique provides a method of simultaneous coating of big and small particles thus eliminating the difficulties encountered in coating small particles alone, such as about 10 μm Dechlorane Plus particles.

Experiment 2

240 g of KCl was preblended with 6 ml of equal volume of A and B of Smooth-Cast 327™ in a Ziploc™ bag for a few minutes. After a uniform binder coat was formed on the KCl particle surface, 60 g of Dechlorane Plus was added and tumbling was continued in the bag for another few minutes. The preblended particle mixture with the binder was charged into the drum coater. The coater was rotated at 40 rpm for 50 minutes.

Figure 16A:
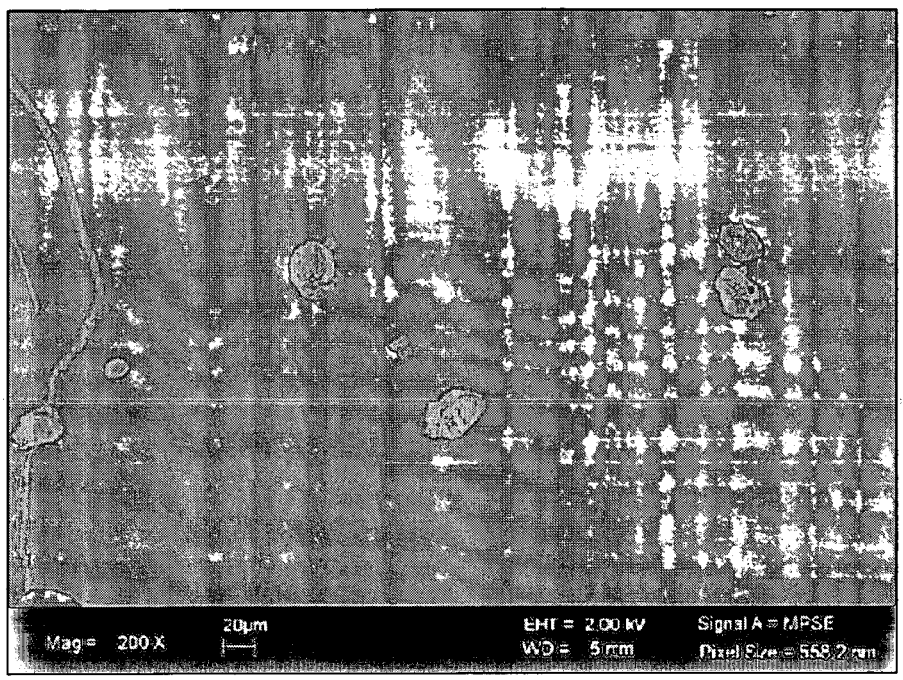
FIGS. 16A-16D are scanning electron micrographs of materials prepared according to one embodiment of the present invention.
Figure 16B:
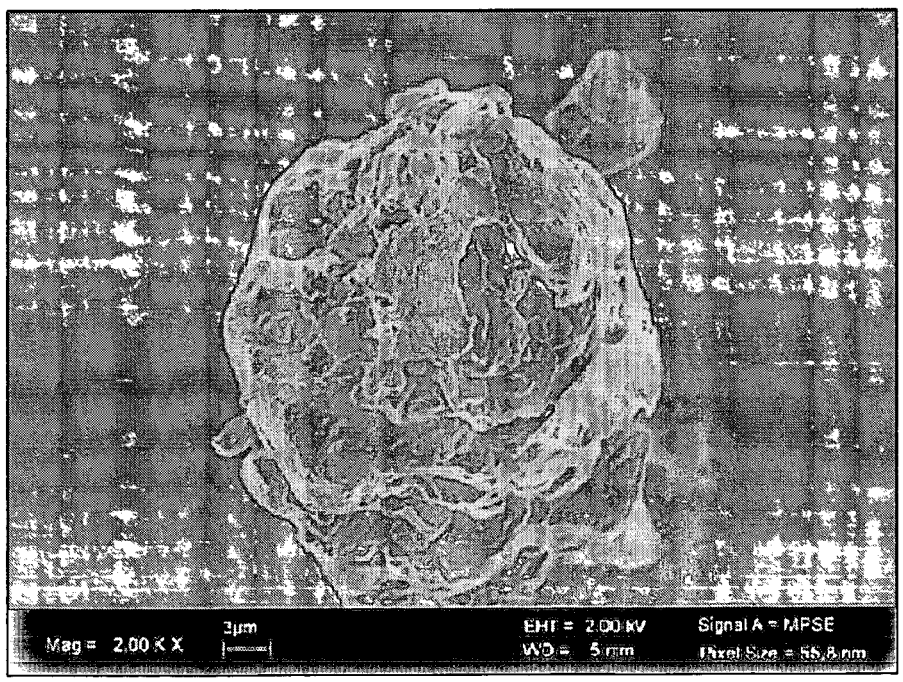
Figure 16C:
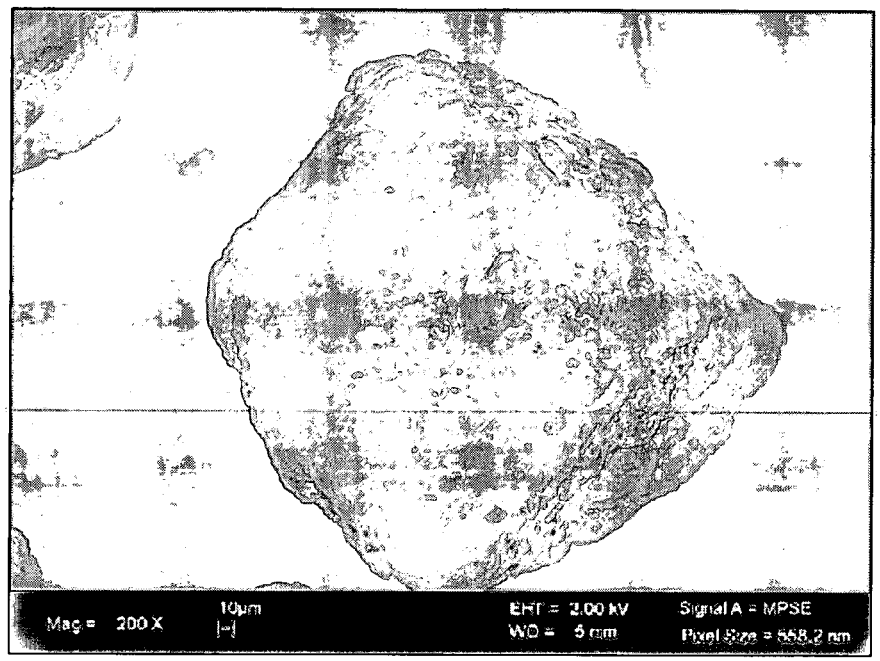
Figure 16D:
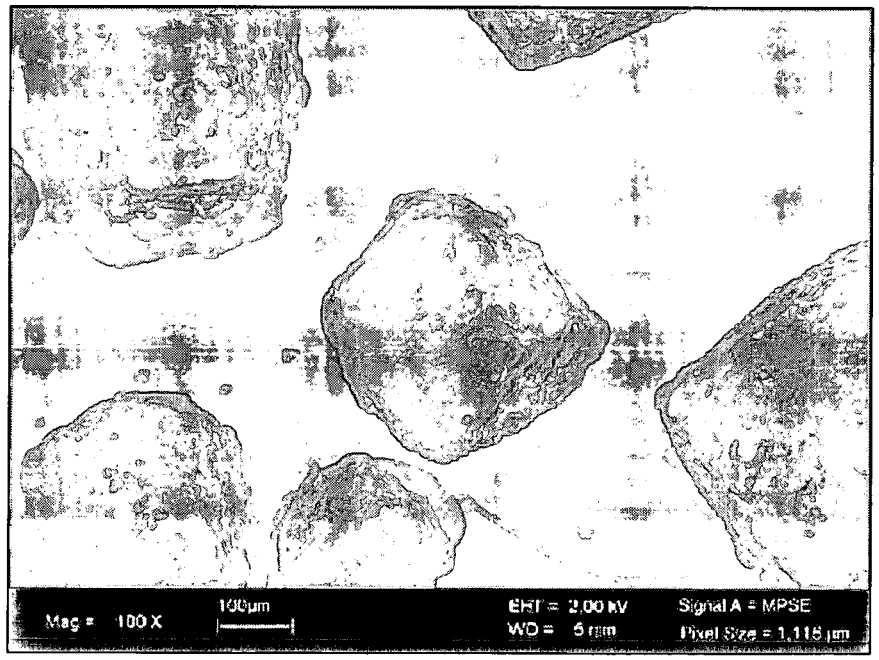

No free flowing curtain of particles formed inside the drum coater and occasional beating of the drum coater was required to energize or loosen the caked bed. Now referring to FIGS. 16A and 16B, SEMs for small dechlorane particles are shown. Fewer unbound small dechlorane particles were observed due to increased binder level (FIG. 16A), and the small dechlorane particles were coated as well (FIG. 16B). Now referring to FIGS. 16C and 16D, SEMs for big KCl particles prepared according to this experiment are shown. The FIGS. indicate a continuous film coating of big KCl particles was achieved (FIG. 16C) but bound small dechlorane particles on a KCl surface were not clearly identifiable in FIG. 16D.

Experiment 3

240 g of KCl was preblended with 12 ml of equal volume of A and B of Smooth Cast 327™ in a Ziploc™ bag for a few minutes. After a uniform binder coat was formed on the KCl particle surface, 60 g of Dechlorane Plus was added and tumbling was continued in the bag for another few minutes. The preblended particle mixture was charged into the drum coater and the drum coater was rotated at 35 rpm for 50 minutes.

Figure 17A:
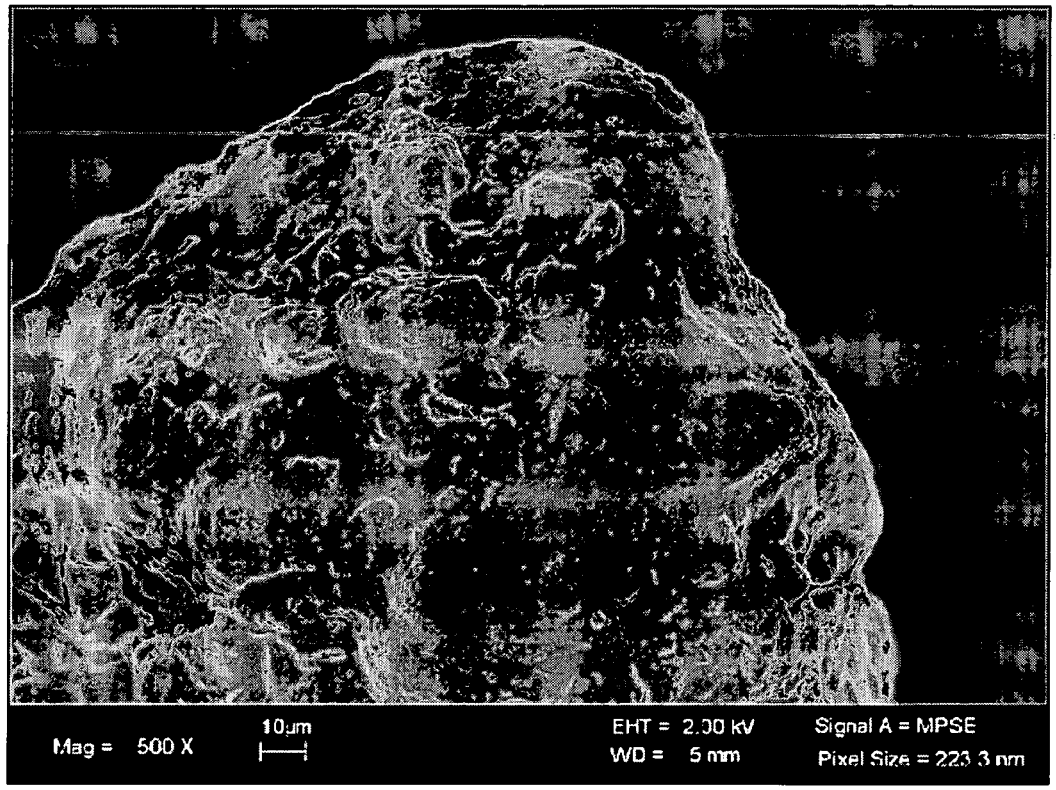
FIG. 17A is a scanning electron micrograph of a material prepared according to one embodiment of the present invention.

Wet particles tended to take up and rest on the sidewall of the drum coater, requiring constant beating of the drum coater to energize or loosen the caked bed. Now referring to FIG. 17A, a SEM of a coated particle prepared according to the foregoing experiment, very few or no unbound small dechlorane particles were observed. The small dechlorane particles were bound to big KCl particles forming clusters. Deagglomeration was required for a smooth operation according to this experiment.

Figure 17B:
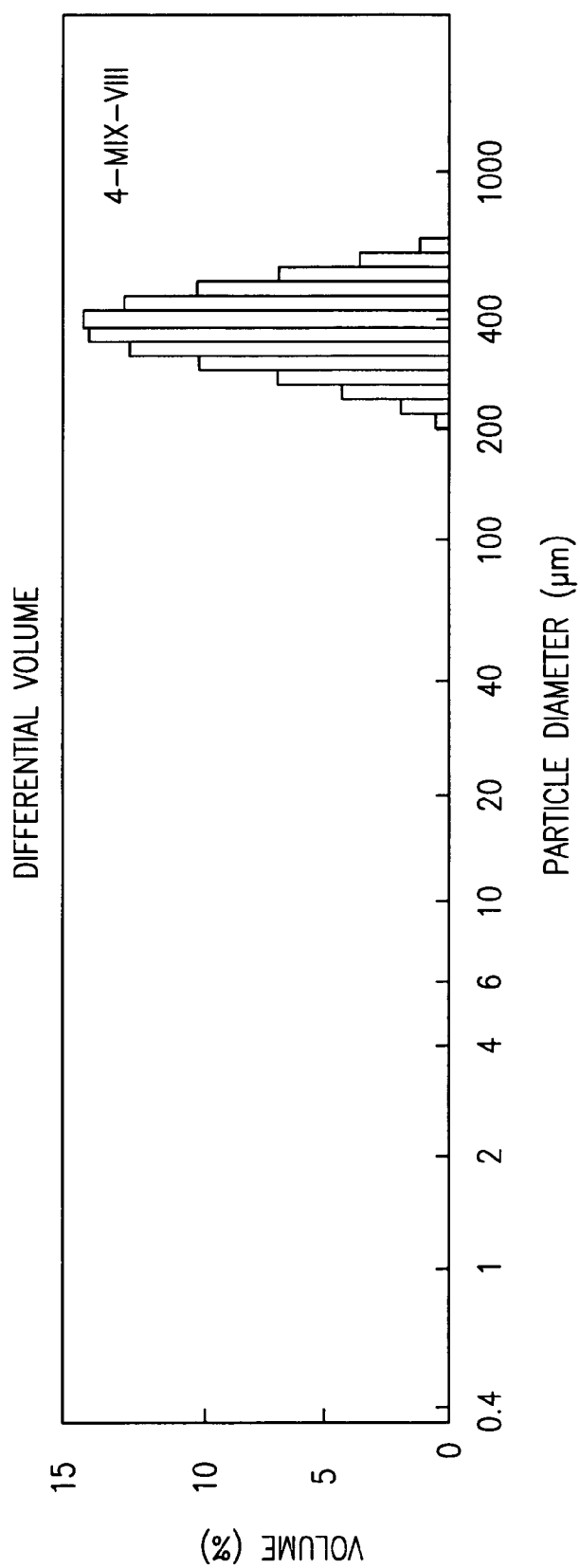
FIG. 17B is a graphical representation of mean particle size increase for materials prepared according to one embodiment of the present invention.

Now referring to FIG. 17B, the mean particle size of the uncoated KCl increased from 284μ to 380μ as a result of this experiment.

The foregoing experiments show clustering is possible via coating small particles together with big particles, eliminating difficulties encountered in coating small particles alone. In addition, the big particles act as a flow enhancer for the small particles.

Employing the SPA technique, clusters of big host particles and small guest particles are formed with particles in both size ranges coated, depending on the binder levels. In a preferred embodiment, the process includes steps to loosen the particle bed in a drum coater to make the particles flowable when wetted with liquid binder. Such methods, include, but are not limited to, large amplitude, low frequency vibrations and the use of deagglomeration media such as but not limited to glass or metal spheres in the coating apparatus.

Experiment 4—Drum Coating With Mechanical Deagglomeration Using Glass Spheres 300 g of approximately 200 μm KCl was preblended with 3 ml of well-mixed Smooth Cast 327™ (equal volume of components A and B) in a Ziploc™ bag. The binder coated particles together with 1 lb of 3 mm glass spheres were charged into the drum coater. The coater was rotated at 40 rpm for 50 minutes. The coated products were separated from the glass beads by passing through a 1 mm opening sieve.

Figure 18A:
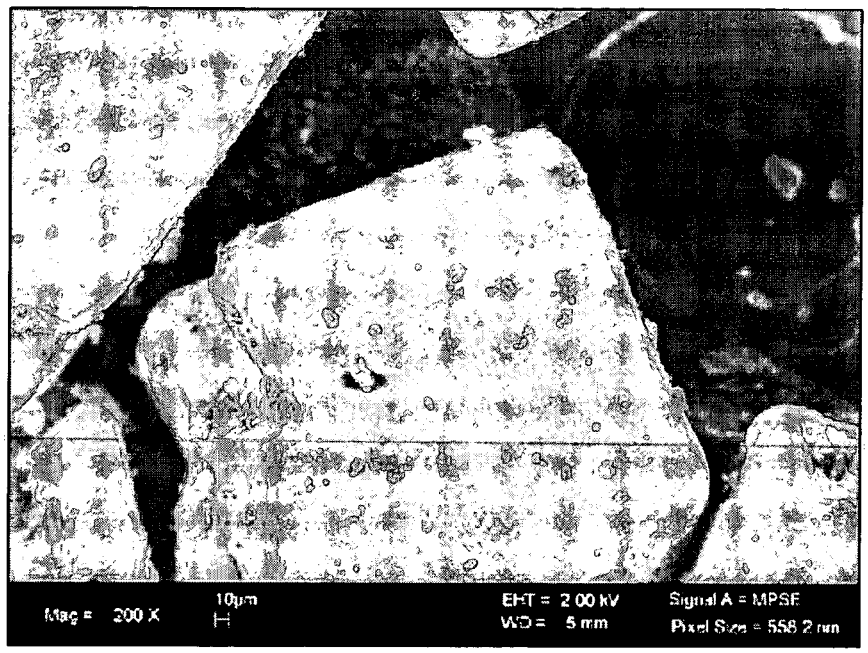
FIGS. 18A and 18B are scanning electron micrographs of materials prepared according to one embodiment of the present invention.
Figure 18B:
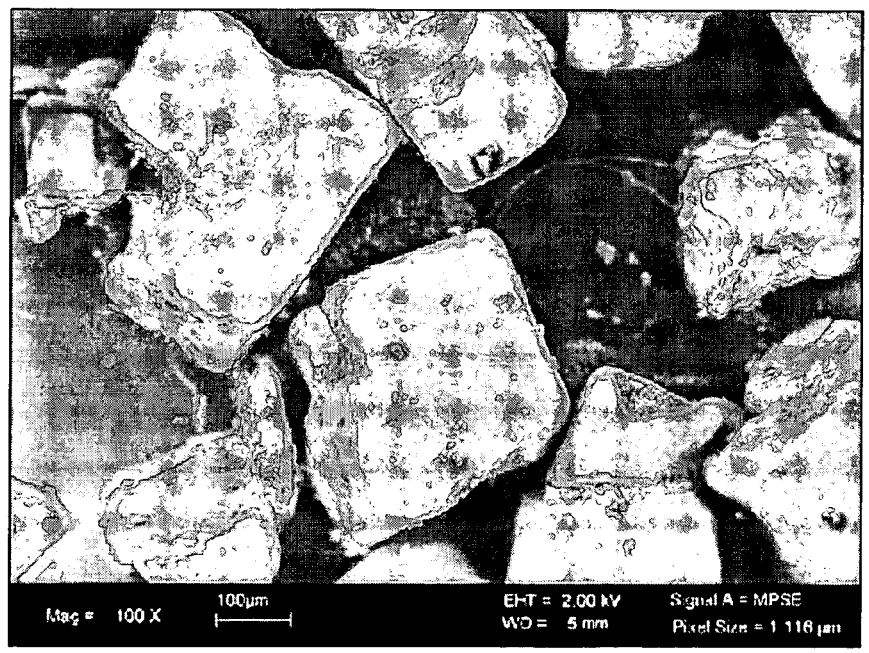

The addition of 3 mm glass spheres improved fluidity of the 1% binder coated KCl particles. No beating of the drum coater was required. Now referring to FIGS. 18A and 18B, SEMs show no agglomeration of the coated particles.

Experiment 5

300 g of about 200 μm KCl was preblended with 6 ml of well-mixed Smooth Cast 327™ (equal volume of components A and B) in a Ziploc™ bag. The binder-coated particles together with 1 lb of 3 mm glass spheres were charged into the drum coater. The drum coater was rotated at 40 rpm for 1 hour. The coated products were separated from the glass beads by passing the mixture through a 1 mm opening sieve.

Figure 19A:
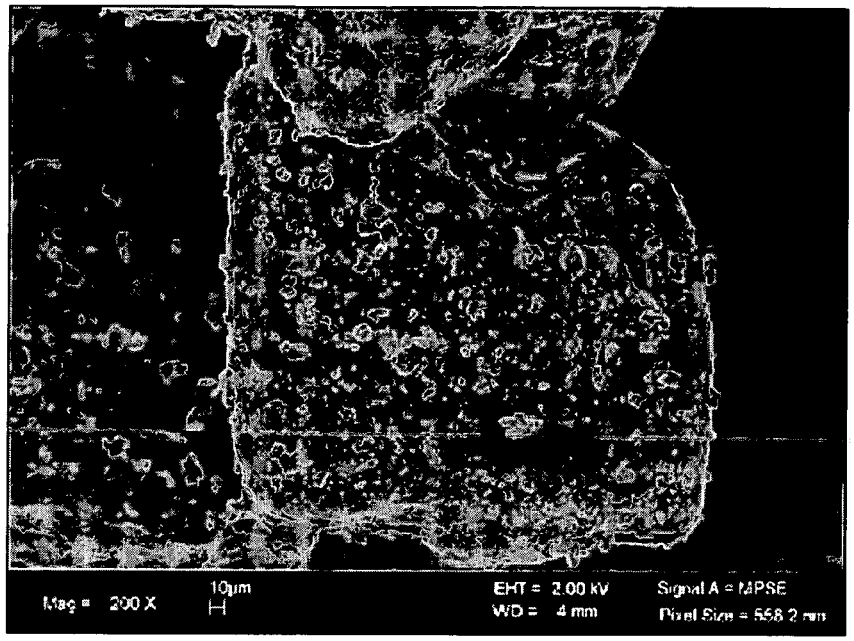
FIGS. 19 and 19B are scanning electron micrographs of materials prepared according to one embodiment of the present invention.
FIG. 19C is a graphical representation of mean particle size increase of materials prepared according to one embodiment of the present invention.
Figure 19B:

The addition of 3 mm glass spheres improved fluidity of the 2% binder coated/wetted KCl particles. No beating of the drum coater was required to reduce caking. Now referring to FIGS. 19A and 19B, SEMs show a free-flowing product was achieved.

Figure 19C:
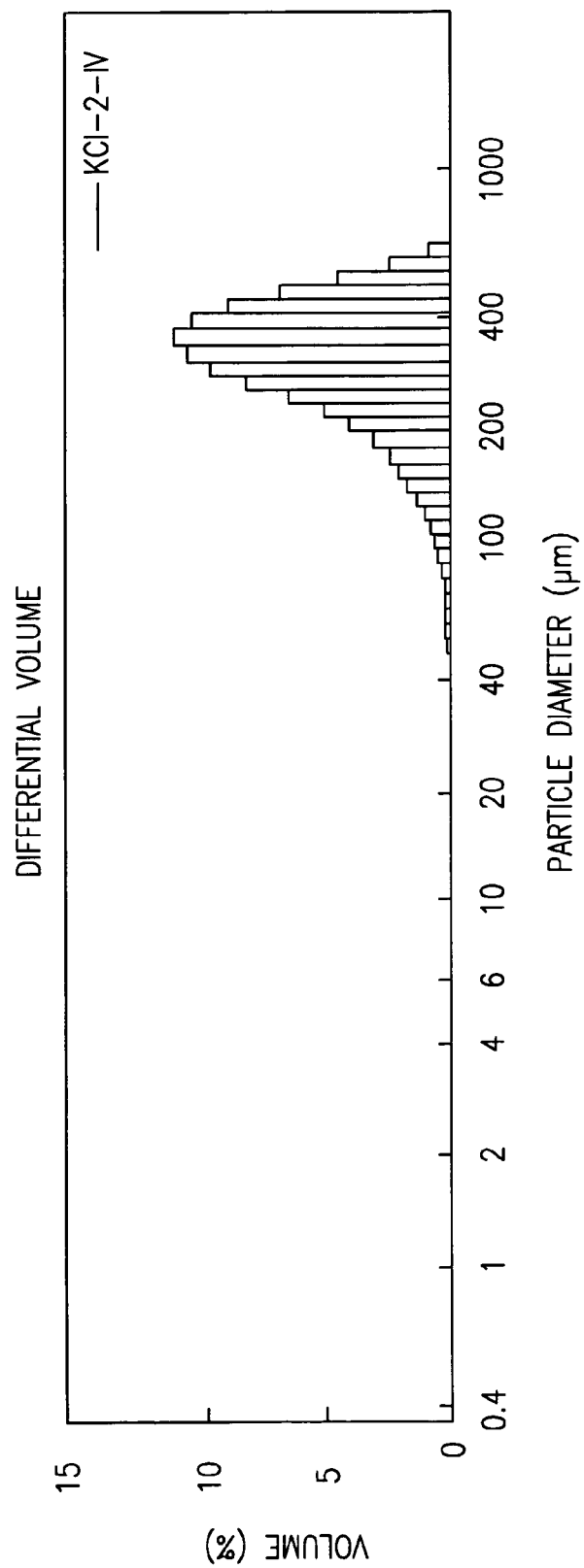

This experiment was repeated to determine the effect of the process on mean particle size. Now referring to FIG. 19C, the mean particle size of the KCl increased from 280 μm for the uncoated KCl to 323 μm, a 14% increase.

Experiment 6

240 g of KCl with 6 ml of equal volume of A and B of Smooth Cast 327™ were preblended in a Ziploc™ bag for a few minutes. After a uniform binder coat was formed on the KCl particle surface, 60 g of Dechlorane Plus was added and tumbling was continued in the bag for another few minutes. The preblended particle mixture with the binder was charged into the drum coater with 1 lb of 3 mm glass beads. The drum coater was rotated at 40 rpm for 50 minutes. The coated products were then separated from the glass beads by passing the mixture through a 1 mm opening sieve.

Figure 20A:
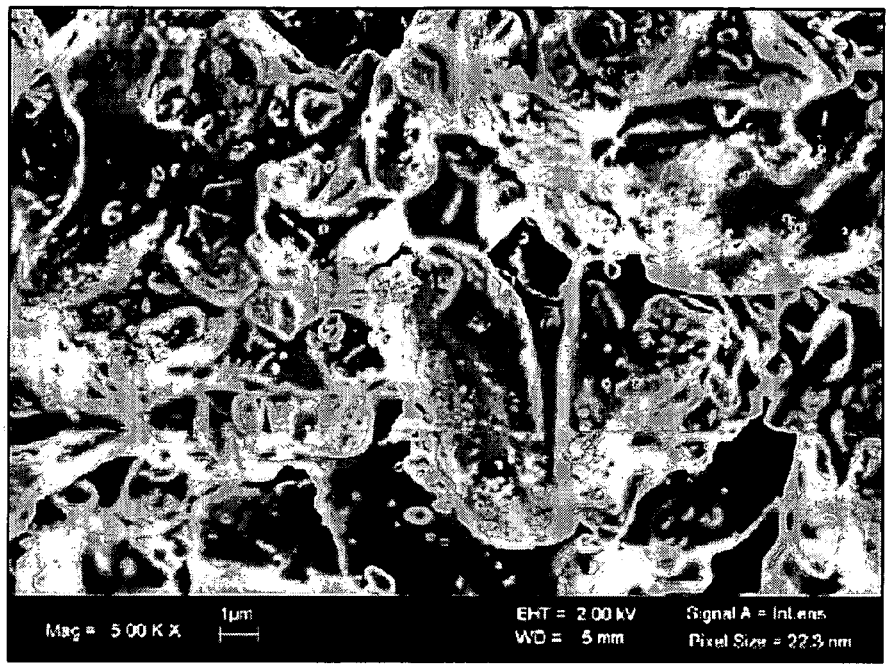
FIGS. 20A-20D are scanning electron micrographs of materials prepared according to one embodiment of the present invention.
Figure 20B:
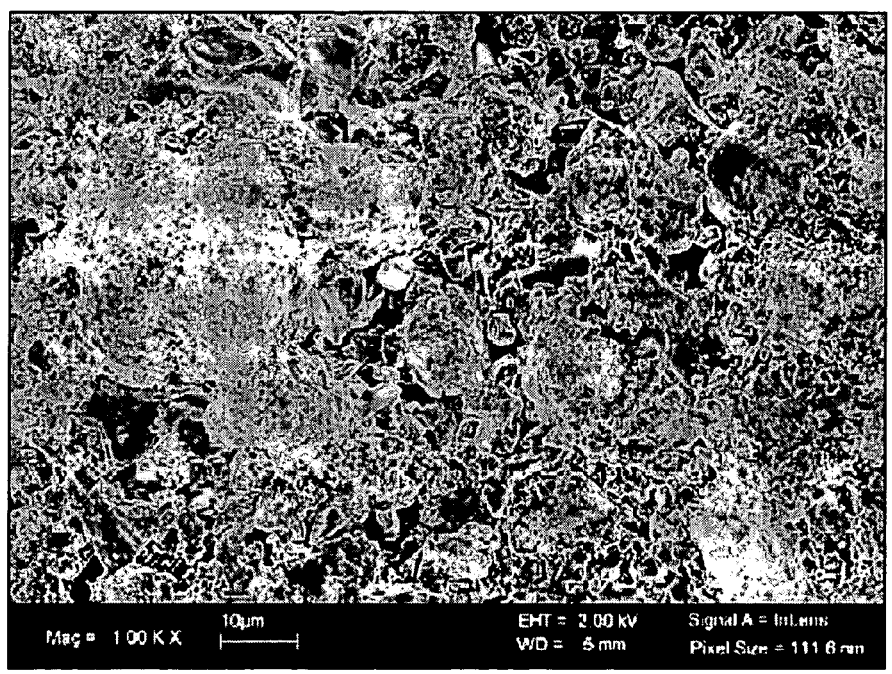
Figure 20C:
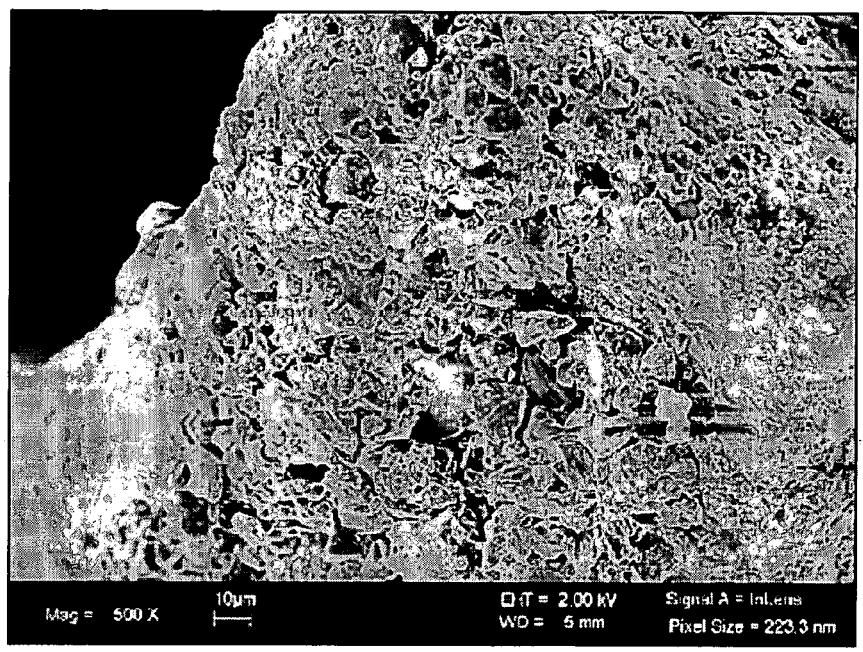
Figure 20D:
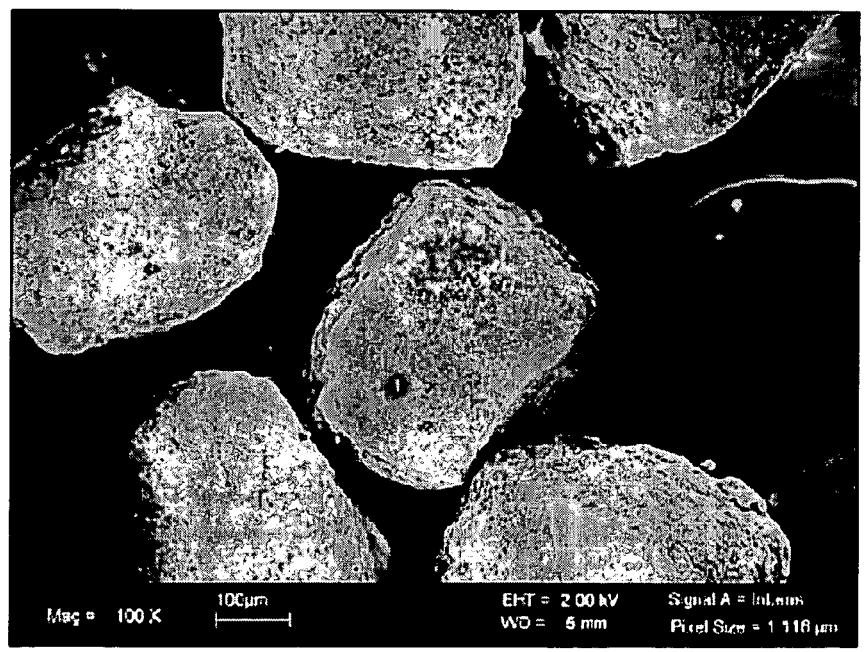
Figure 20E:
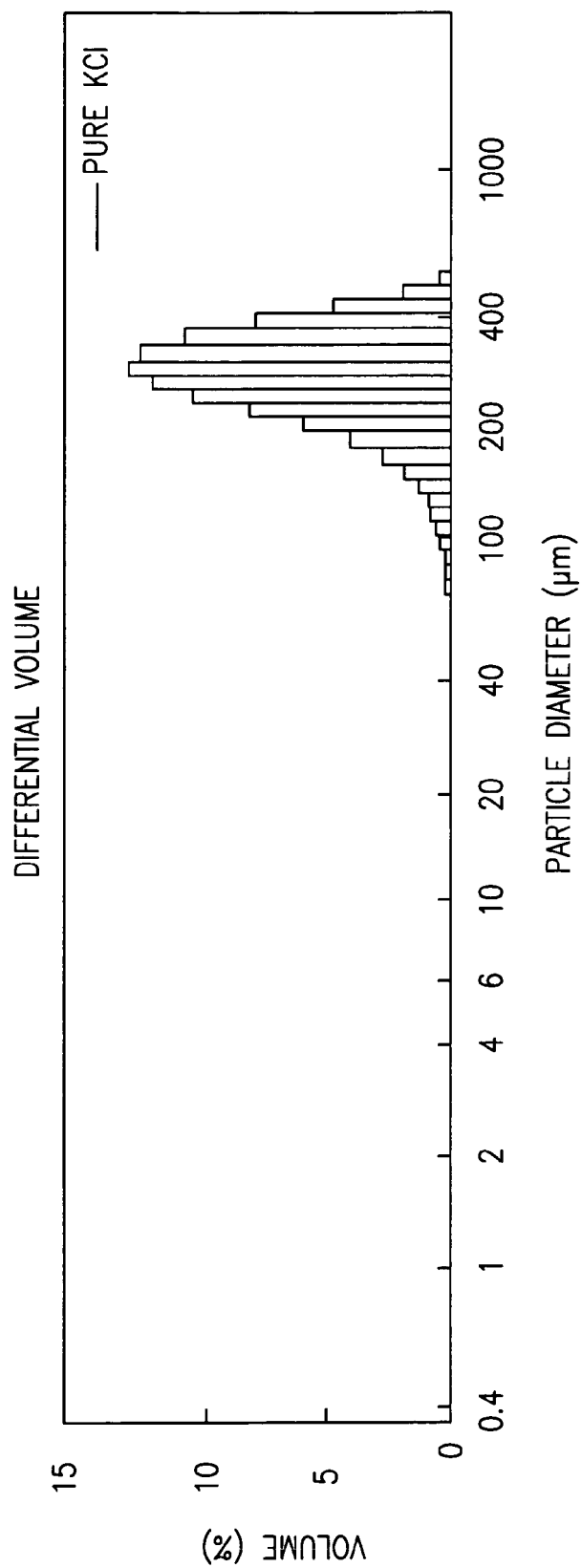
FIG. 20E is a graphical representation of a particle before being processed according to one embodiment of the present invention.
Figure 20F:
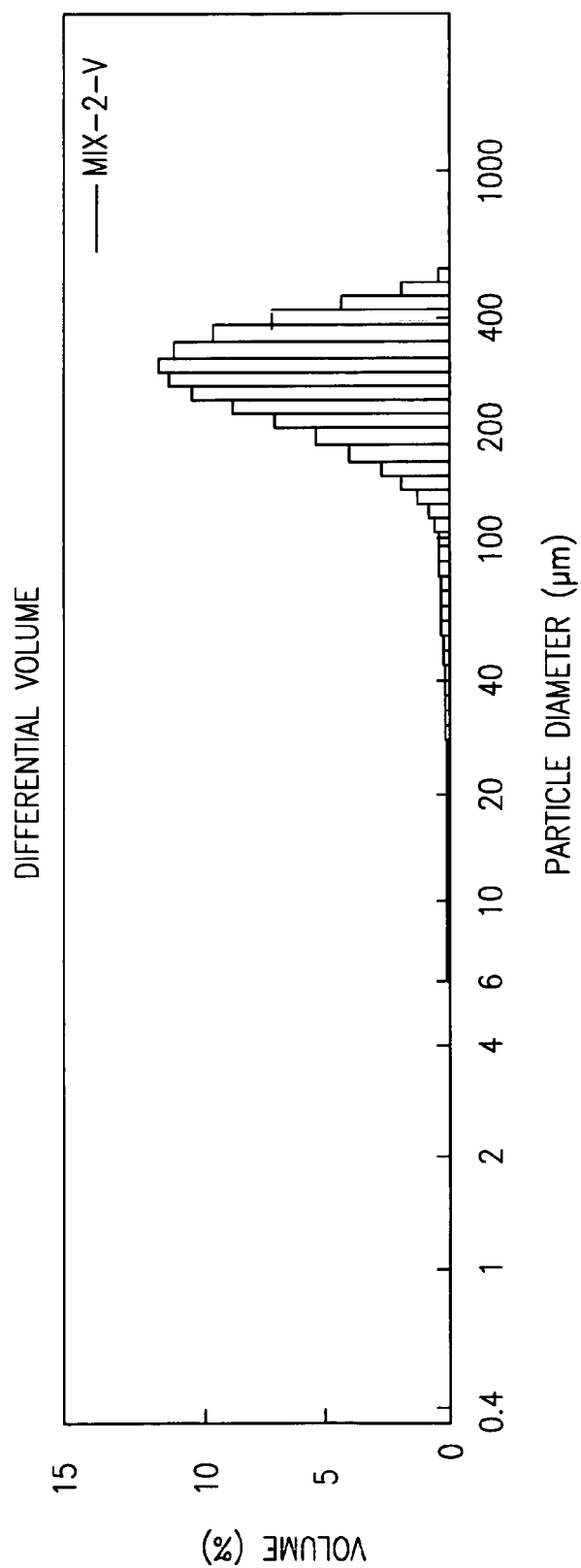
FIG. 20F is a graphical representation of the mean particle size of clusters prepared according to one embodiment of the present invention.

Free-flowing particle mixture was obtained even after incorporation of 2% (6 ml) of liquid binder. Now referring to FIGS. 20A and 20B, SEMs of the product resulting from the foregoing experiment show that small particles were coated simultaneously with big particles. These FIGs. show small particles bound on individual KCl particles forming clusters with stoichiometric balance down to the individual particle/cluster level. Now referring to FIGS. 20C and 20D, SEMs of the big host particles obtained according to this experiment show that clusters of individual KCl host particles and guest Dechlorane Plus particles were formed. No obvious agglomeration between the host KCl particles or clusters was observed and very few unbound small particles were observed. Now referring to FIG. 20E, the mean particle size of pure KCl before mixing was recorded as 284 μm. Now referring to FIG. 20F, the mean particle size of the clusters of KCl and Dechlorane Plus after mixing was shown to be 296 μm.

Experiment 7

240 g of KCl was preblended with 12 ml of equal volume of A and B of Smooth Cast 327™ in a Ziploc™ bag for a few minutes. After a uniform binder coat was formed on a KCl particle surface, 60 g of Dechlorane Plus was added and tumbling was continued in the bag for another few minutes. The preblended particle mixture with the binder was charged into the drum coater with 1 lb of 3 mm glass beads. The drum coater was rotated at 40 rpm for 50 minutes. The coated products were separated from the glass beads using a sieve with diameter openings of 1 mm.

The particle mixture was caked upon the drum sidewall. However the weak cake crumbled manually. Mechanical deagglomeration using 3 mm glass beads improved the fluidity of binder/wetted particles greatly, but excessive binder concentrations caused the formation of a weak cake of the particles.

Figure 21A:
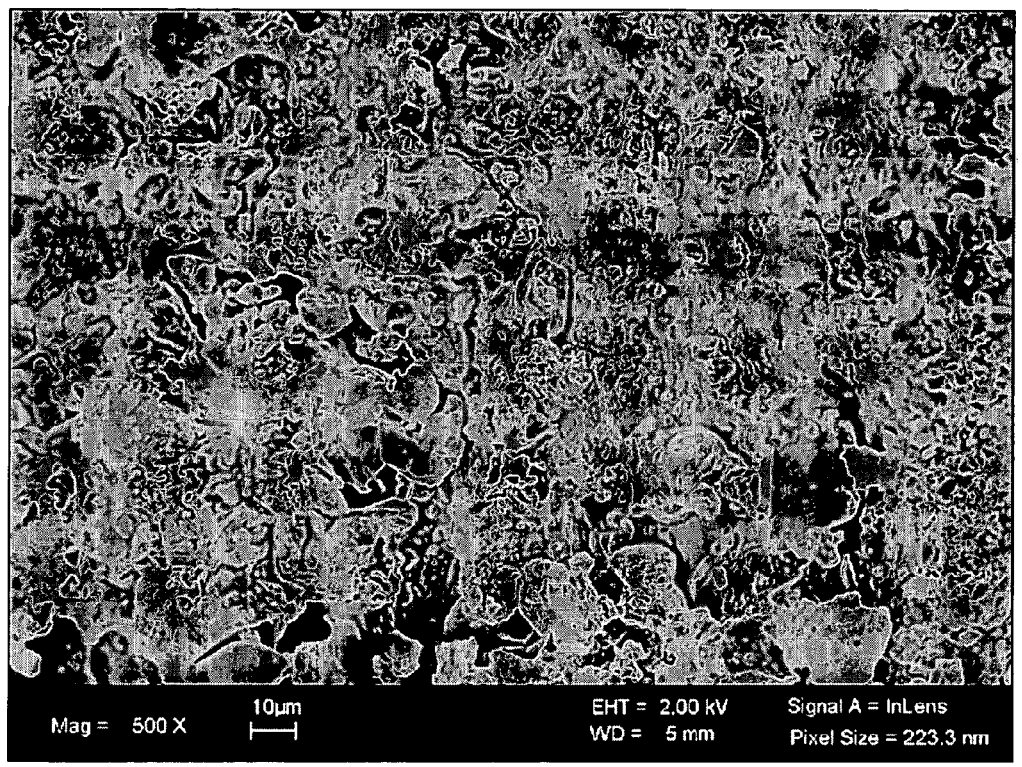
FIGS. 21A-21D are scanning electron micrographs of materials clustered according to one embodiment of the present invention.
Figure 21B:
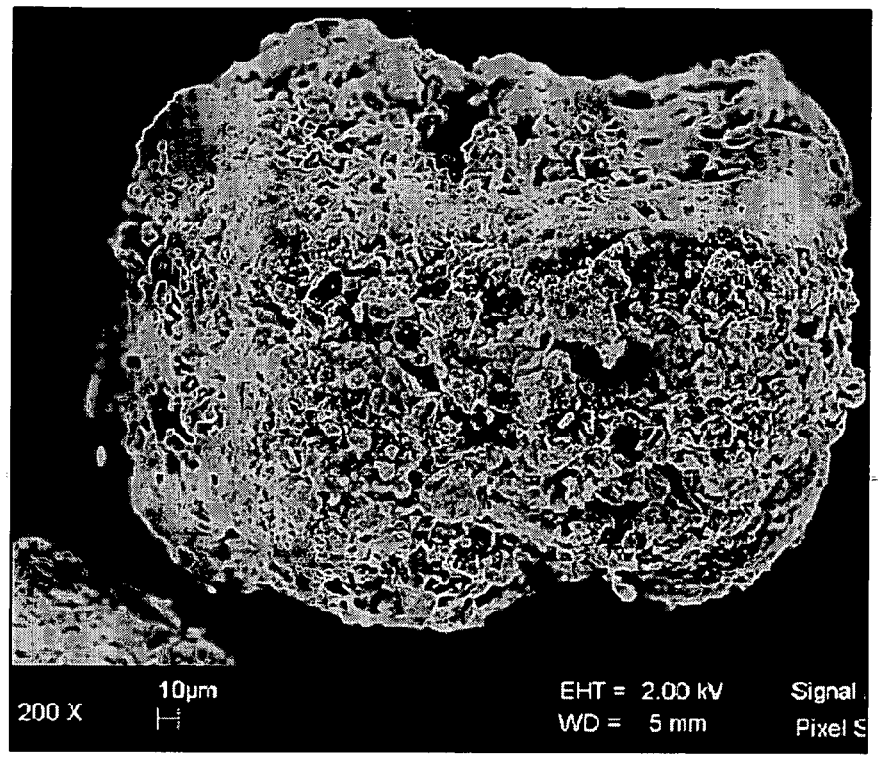
Figure 21C:
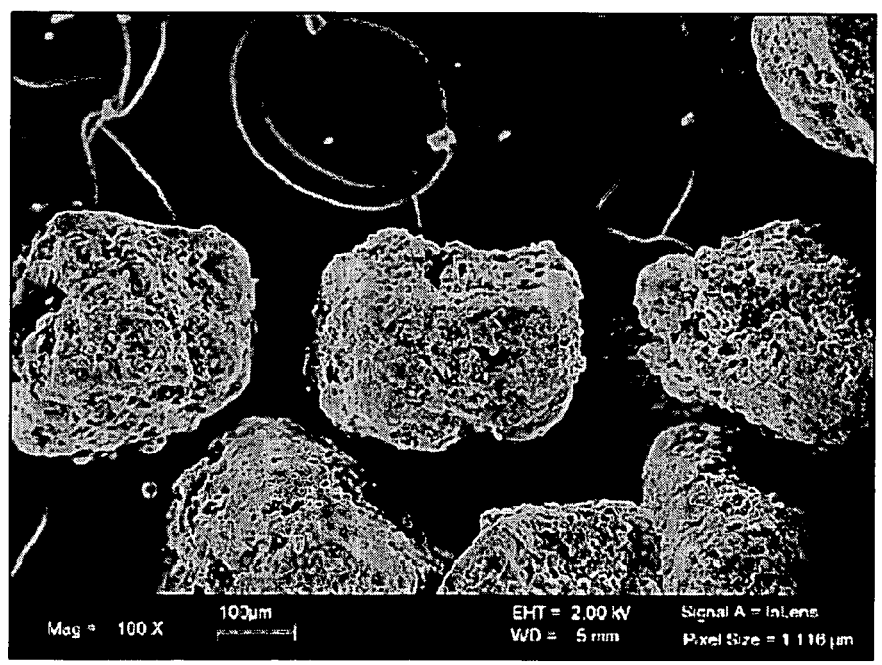
Figure 21D:
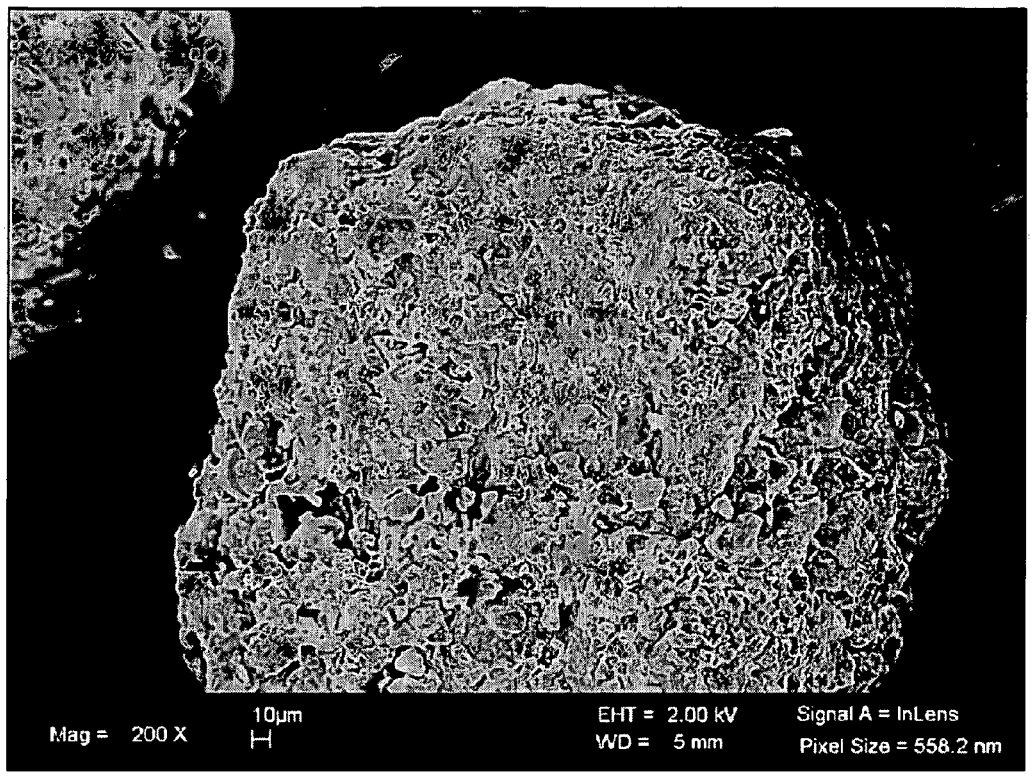

Now referring to FIG. 21A, a SEM shows the bound small particles achieved according to this experiment. Now referring to FIGS. 21B and 21C, SEMs of the big host particles show clusters formed by the individual KCl host particles and the guest Dechlorane Plus particles. No obvious agglomeration was observed between the host KCl particles or clusters and very few unbound small particles were found. FIG. 21D is a SEM of a cluster of KCl and bound dechlorane showing good coverage of the dechlorane on the host KCl and very few if any unbound small dechlorane particles.

Mechanical deagglomeration, such as by using 3 mm glass spheres, improves the fluidity of binder wetted particles greatly within certain binder levels. The SPA technique of the present invention formed clusters with enhanced levels of control in terms of both composition and stoichiometry. The small guest particles were found to bind strongly to the individual host particles, enabling composition homogeneity down to the individual particle/cluster level, about 200 μm in the foregoing experiments.

Other coating devices such as, but not limited to, the UV coating method described herein, can be employed in the SPA technique of cluster formation.

Infusion

Infusion in the net-shape manufacture of products such as munitions involves the introduction of a polymerizable binder system to completely infuse selected demonstration items that are packed with coated energetic particles, preferably in a reasonable amount of time.

Two modes of infusion through a packed bed are spontaneous immersion (SI) and forced intrusion (FI). Spontaneous immersion is defined as the penetration of liquid through a packed bed without any external forces and occurs due to capillary effect only. In forced intrusion, liquid is forced through packed media under pressure and/or centrifugal effect. Generally, if infusion time is to be kept to less than ten minutes, particles size must be larger than 100 microns and fluid viscosity should be about 1 cp, i.e., like water. Thus, spontaneous immersion is not an adequate approach where small particles such as the smallest RDX particles (about 10 to about 20 microns) employed in net shape manufacturing according to the present invention. Accordingly, forced intrusion is the preferred method of infusion in the present invention where particles smaller than about 100 microns are employed.

In order to improve infusion time in accordance with the present invention it is preferred that the monomer viscosity be maintained as low as practically possible; deployment of controlled coating and granulation strategy for <20 micron RDX, so that all smaller particles are agglomerated to a larger granule size.

Effect of Coating on Infusion Time

The coating of particles such as RDX particles can decrease the infusion time by making the particle surface more compatible with the monomer, and hence improve the flow. More significantly, coating can reduce the amount of fines and hence significantly improve the infusion rate. Without coating, during the infusion process, smaller particles form agglomerates at the flow front, and as the front moves forward, a situation occurs when the fines completely fill-up the pores between the larger particles, and significantly increase the flow resistance.

In coating, some of the fines get attached to the larger particles, and some of the fines get granulated, hence the quantity of loose fines is reduced.

Coating And Infusion Time For The Mixture of RDX-1 and RDX-5

Due to the granulation of RDX-5 (~20 microns, while the simulant dechlorane plus is ~10 microns) the pores between a granule and large particles of RDX-1 (~200 microns, stimulant KCl is about that size) are much larger than the case when un-coated/non-agglomerate RDX-5 is used. Fluid can more easily flow around a granule than through a collection of loose RDX-5 particles.

Hence coating/granulation will generally improve the infusion rate (but may adversely affect the solid loading of total RDX). Selective granulation/coating of the RDX-5 along with coating of RDX-1 will also result in decreased infusion time.

As the size of the granule increases, the porosity also increases. The increase in porosity favors the infusion process, but reduces the overall solid packing of the RDX.

RDX Packing Density

Granulation can be safely employed to improve infusion time without significant loss of solid packing. As a result, for example, granulation can eliminate the necessity of decreasing viscosity. Granulation is also advantageous in terms of powder handling and segregation issues.

The amount of polymer coating onto RDX-1 and RDX-5 can also significantly affect the final RDX packing density and therefore varying coating thickness can be employed to allow manipulation of RDX packing from a theoretical maximum down to smaller values, depending on the final objective of a given formulation. The overall solidity (the ratio of RDX powder volume to tube volume) decreases due to the coating, because coating occupies a portion of the volume.

In granulation, an additional solidity loss (SL) occurs due to the intra-granule (within the granule) porosity and due to increase of the inter-granule porosity. In accordance with the present invention, for optimum infusion, it is preferred that the intra-granule porosity be smaller than 0.4.

The film thickness on the surface of RDX-1 (KCl) is preferably not greater than 2-3 microns, and the film thickness for RDX-5 (dechlorane) preferably should not exceed 1 micron.

Infusion Experiments

It has been found that for a tube of 50 cm length as described herein, an infusion time (IT) of about 10 min may be achieved at pressure of about 20 bars either by means of viscosity decrease to 1 cp (or its decrease to 4 cp for infusion from both sides) or due to RDX-5 granulation.

Experiments were conducted using clusters prepared according to the foregoing experiments in the infusion of burster tubes. The tubes employed in these experiments were plastic tubes ⅜ inch in diameter and about 14 inches long. Coated KCl or clusters from samples obtained from the previous experiments were used to examine various parameters, such as void ratio, bulk density and infusion rates. The infusion binder used in these experiments was Smooth Cast 327™, the same as the binder used for particle coating and clustering in the previous experiments. An infusion tester was employed having both vacuum and additional pressurizing capability. The infusion tester was designed to generate data for infusion of liquid binder into particulate-packed bed under different levels of additional pressure. Additional pressure was provided via a nitrogen cylinder and controlled by a regulator. The infusion rate for a given particulate-packed bed (in the form of cylindrical column for burster tubes) was determined experimentally under different additional pressure levels using liquid binder of various viscosities.

Figure 22:
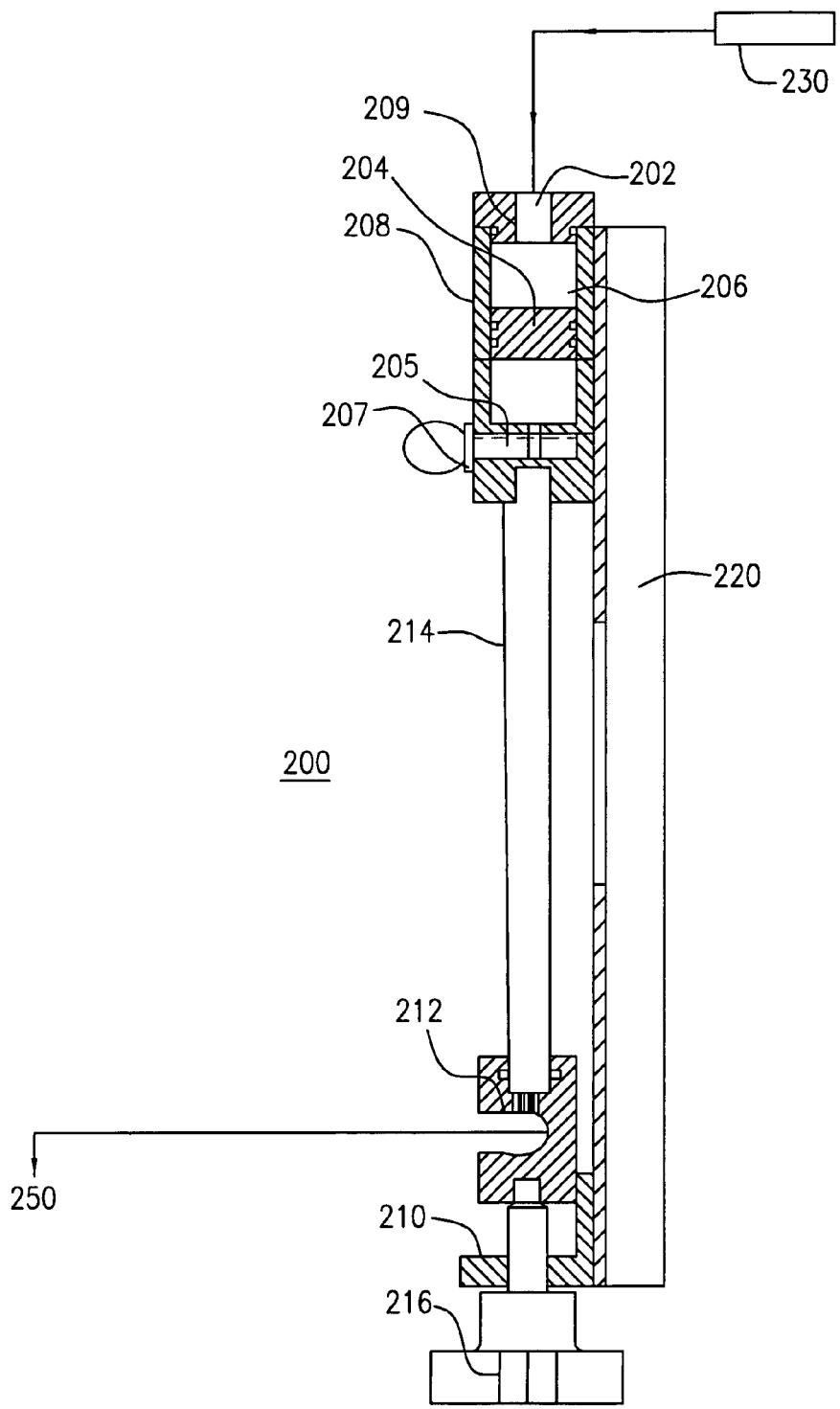
FIG. 22 is a front cross-sectional view of a device employed in connection with the present invention.

An infusion tester 200 is shown in FIG. 22. A gas inlet 202 for connection to a variable pressure source 230 such as but not limited to compressed nitrogen is preferably provided near the top of the infusion tester 200. A floating piston 204 separates a gas chamber 206 and a binder reservoir 208 in order to avoid possible gas diffusion into the liquid binder. Flow stopper 205 and seal 207 are provided. The body of the binder reservoir 208 and a bottom support 210 are preferably connected to a base 220 such as but not limited to a 1 by 2 inch aluminum channel to provide rigidity. A bottom connector 212 supporting a tube 214 can be raised or lowered such as but not limited to as by a rotating thumb screw 216, so that the tube 214 containing the particulate packed column can be easily engaged for infusion and disengaged after the infusion is complete. The bottom connector 212 preferably also provides a connection to a vacuum line 250 so the infusion of the particulate-packed bed can be carried out under vacuum.

In practice, the selected infusion binder is filled into the binder reservoir 208 from either the top by removing the cover square 209 and floating piston 204, or bottom of the body of the binder reservoir 208, or both.

Now referring to FIG. 23A, a tabulation of 12 density measurements for coated particles in burster tubes was prepared. FIGS. 23B and 23C show the void ratio calculation for coated particles in the burster tubes and infusion results using reactive binder and additional pressure, respectively, for the materials prepared according to the previous experiments.

Figure 24:
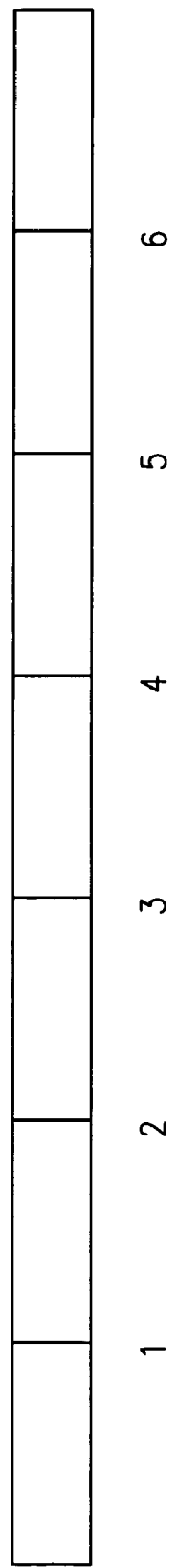
FIG. 24 is a representation of an experimental item prepared according to one embodiment of the present invention.
Figure 25A:
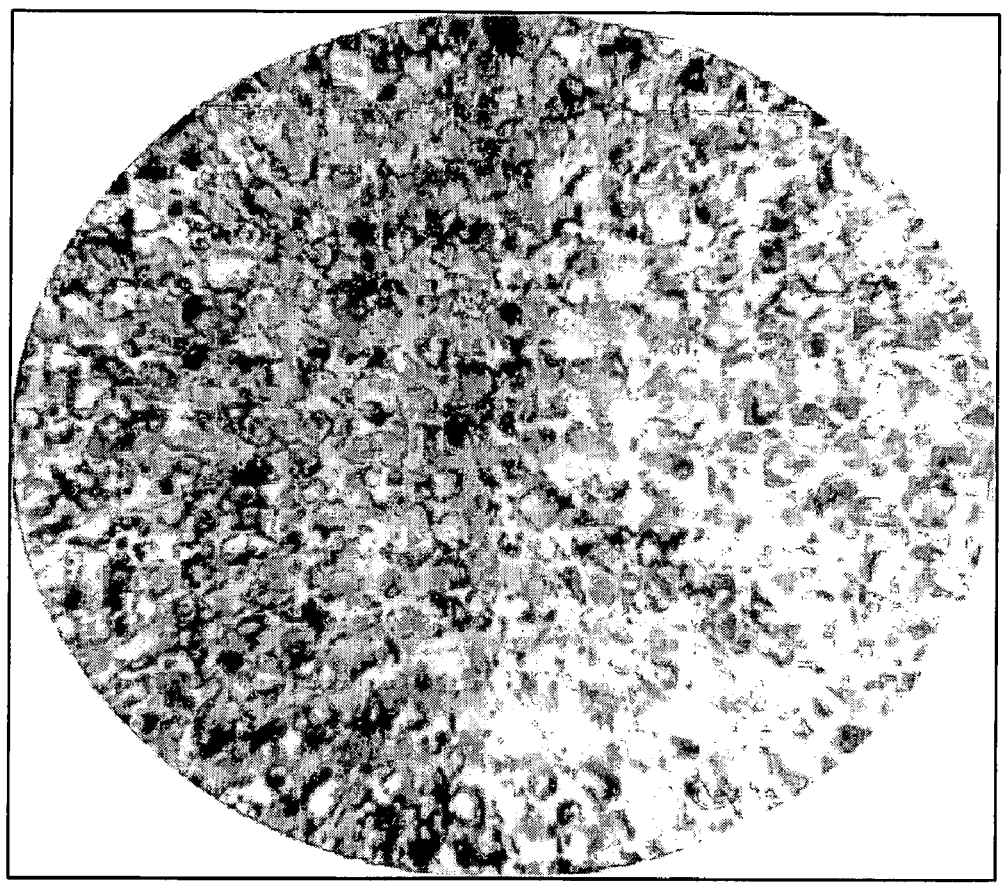
FIGS. 25A-25F are scanning electron micrographs of cross-sections of the device presented by FIG. 24.
Figure 25B:
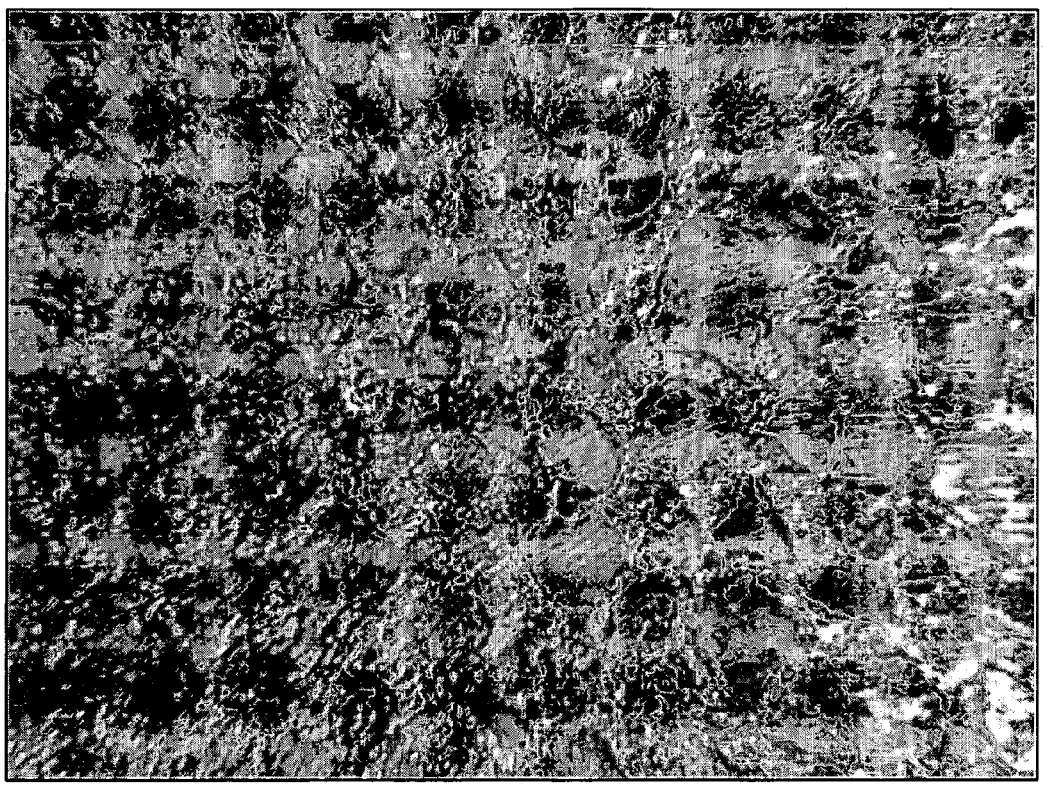
Figure 25C:
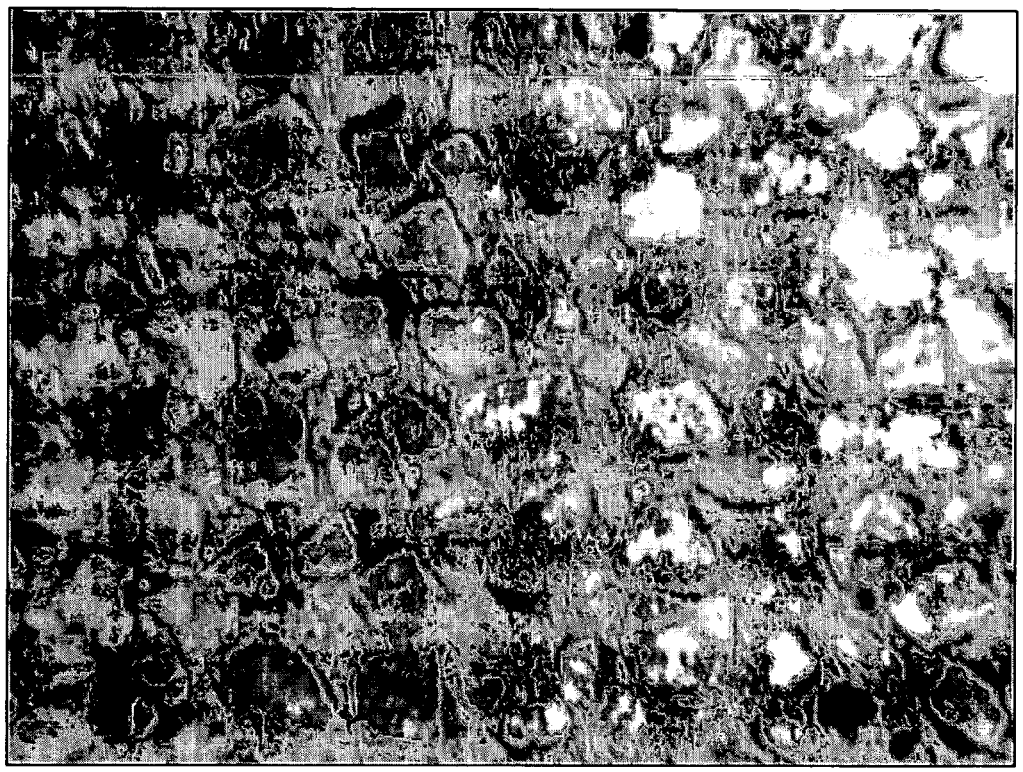
Figure 25D:
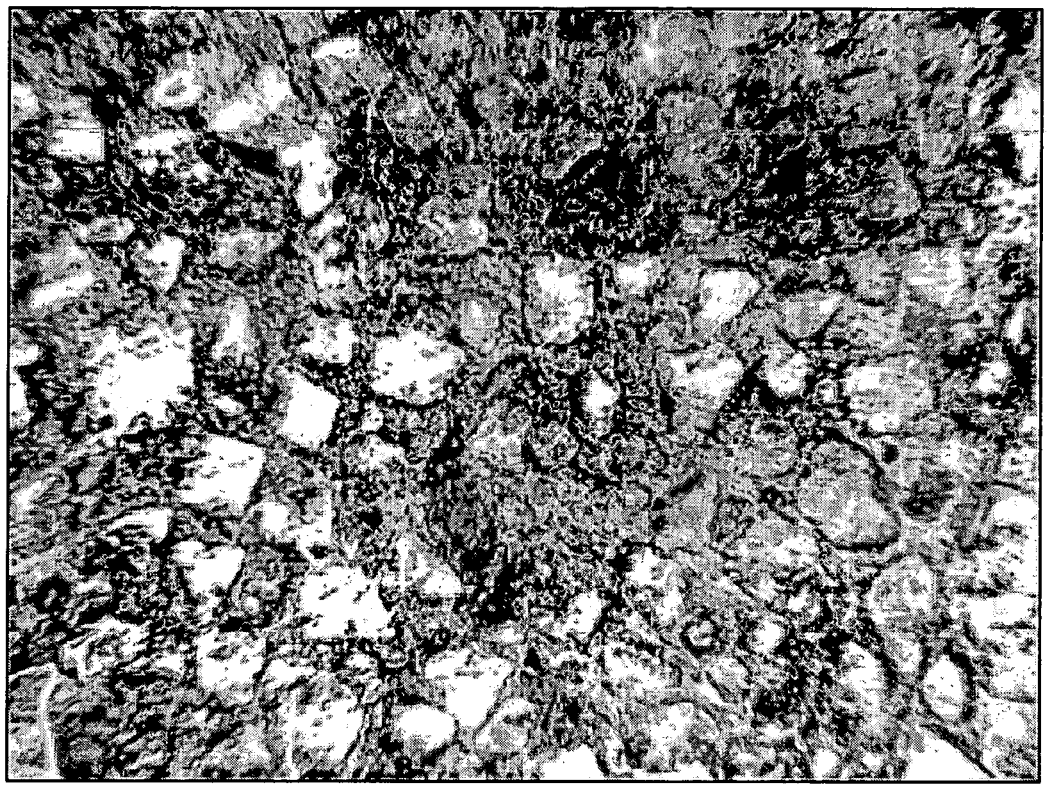
Figure 25E:
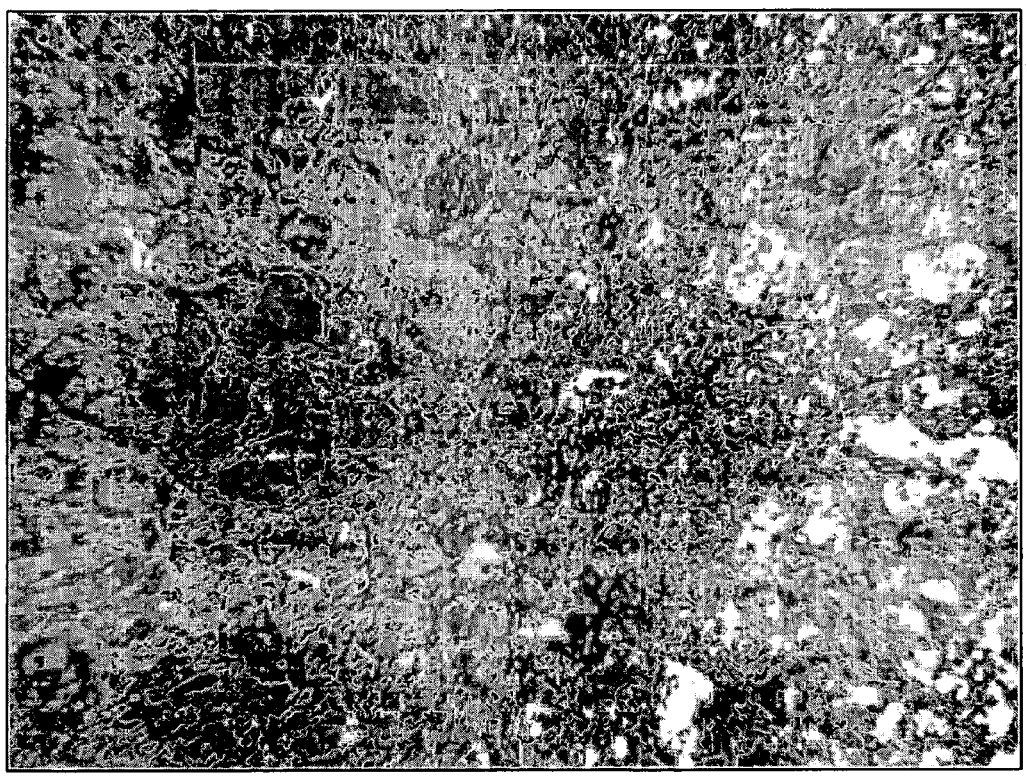
Figure 25F:
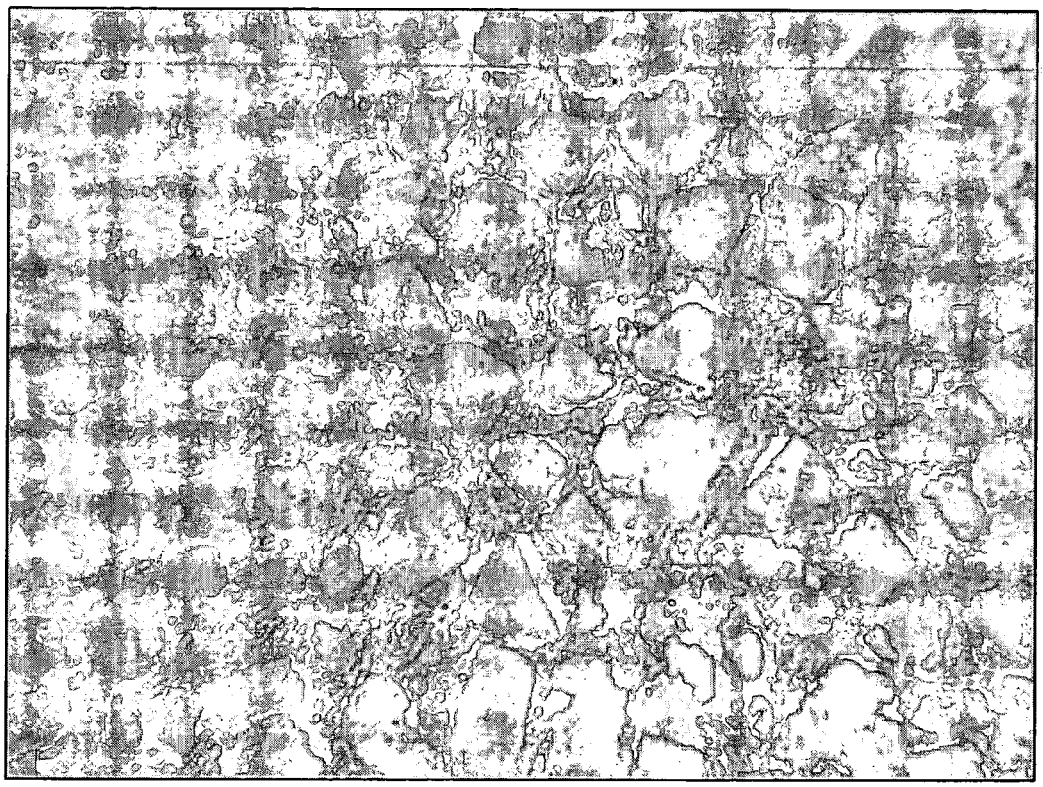

Now referring to FIG. 24, a content uniformity examination was conducted for infusion burster tube 11 filled with clustered particles. The infused tube 11, after full cross-linking of the reactive binder, was cut to take disk samples of about 2 mm thick every 40 mm as shown in the representation in FIG. 24 at 6 locations. The 2 mm thick disks were then examined under a microscope after being colored with ink. Now referring to FIGS. 25A-25F, a series of microscopic images of cluster distribution at locations 1 through 6 of infused tube 11 are shown. The images shown in the figures show that both coated particles and 80/20 weight ratio of big and small particles in the form of clusters can be easily infused in burster tubes for 120 mm white phosphorus mortar rounds. The clusters formed by small particles found on individual big particles eliminate the size and density induced particle segregation in the filling of particle mixtures, resulting in composition homogeneity down to the individual particle/cluster level (around 200 microns). The cluster form also reduces the risk in handling small fine particle, enhances the fluidity of coated particles, and increases the infusion rate greatly over prior art methods. Uniform content was achieved throughout the tube via net shape manufacturing, eliminating the settling induced segregation in a melt-pour process.

Comparison of Inventive Method with Traditional Mixing Methods

The clusters achieved in FIGS. 25A-25F were compared to materials prepared according to traditional mixing methods. Namely, solid particles were mixed with wax in a Brabender mixer. The solid particles used were 80/20 ratio by weight of KCl and Dechlorane Plus 515, with average particle size of about 200 μm and 10 μm, respectively. Wax was used as the binder/matrix material. The solid particles and wax binder were prepared in a 60/40 ratio by volume. With densities of 2.0, 1.8, and 0.91 g/cc for KCl, Dechlorane Plus, and solid wax, respectively, the 60/40 ratio by volume of solid mixture (KCl/Dechlorane in 80/20 ratio by weight) and wax translates into 80/20/30 by weight of KCl/Dechlorane/Wax.

The Brabender mixer chamber (60 cc) was filled to 70% capacity, and the amount of KCl, Dechlorane, and wax added in each batch was determined as 40, 10, and 15 grams, respectively.

In Mixing I and II, KCl and Wax were added first with Dechlorane particles being added later on. The total mixing time was 20 minutes. Two rotor speeds were selected at 30 and 60 rpm. The mixing details are summarized in Table 3.

TABLE 3

Materials Charged Each Batch:
KCl/Dechlorane Plus/Wax: 40/10/15 grams
Temperature Setup: 60° C.

| Protocol of Particle Addition | | Mixing Speed (rpm) | Total Mixing Time (min) |
|---|---|---|---|
| Mixing I | Add KCl and Wax first and mix for 10 minutes before adding Dechlorane Plus | 30 | 20 |
| Mixing II | | 60 | |

Figure 26A:
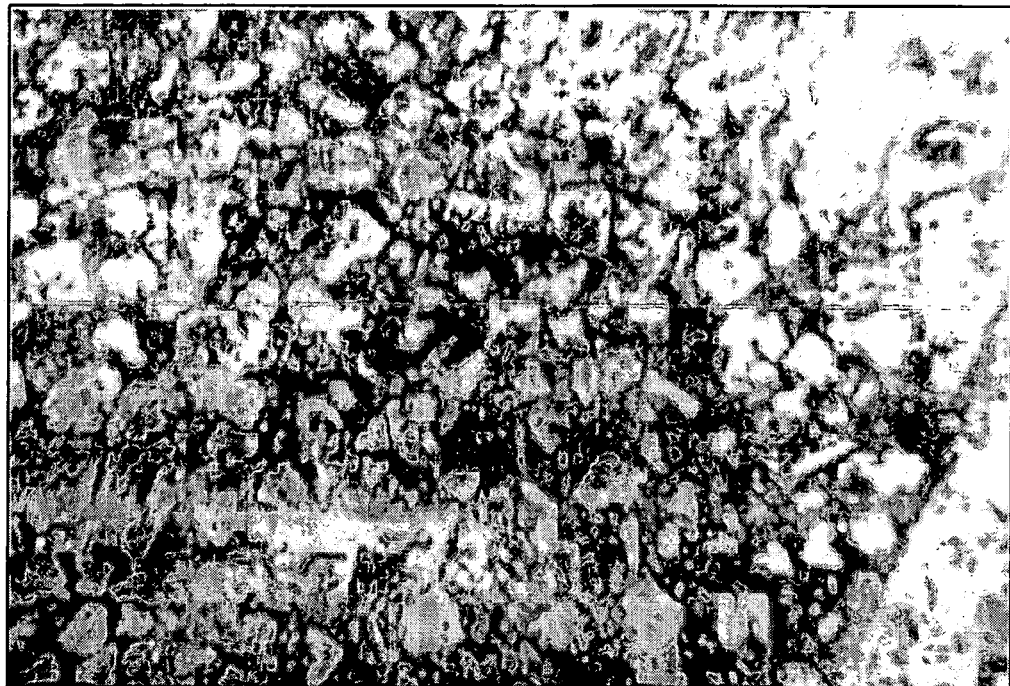
FIGS. 26A-26B are scanning electron micrographs of materials prepared according to the conditions of Table 3.
Figure 26B:
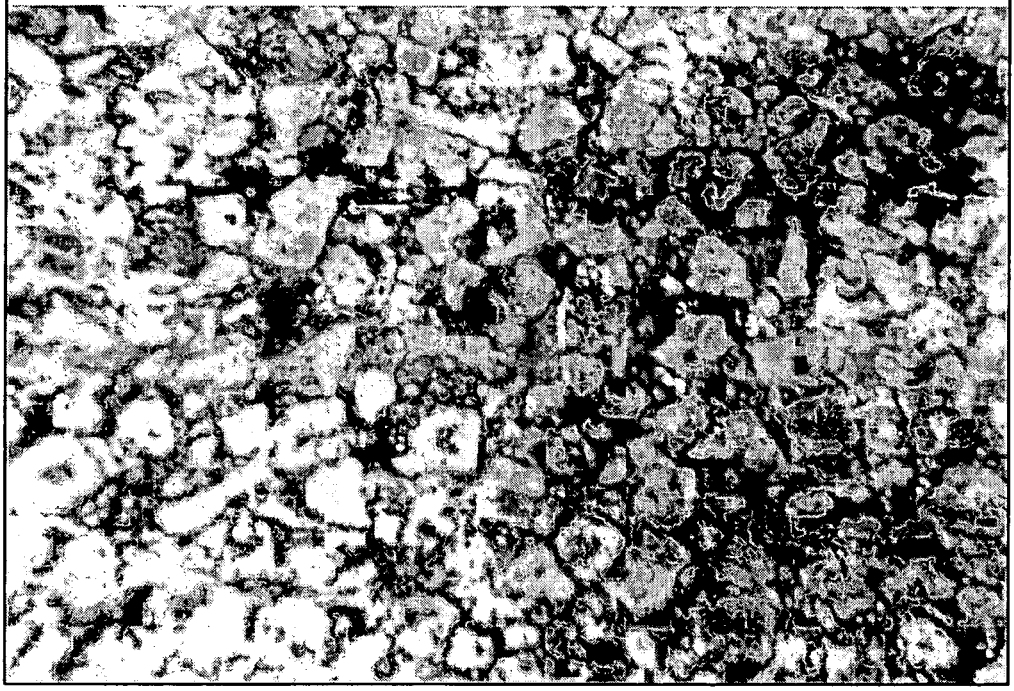

Now referring to FIGS. 26A-26B, SEMs of materials mixed according to the conditions of Table 3 were prepared. The FIGS. 26A-26B show poor content uniformity as compared to FIGS. 25A-25D prepared according to one embodiment of the present invention.

While the preferred embodiments have been described and illustrated it will be understood that changes in details and obvious undisclosed variations might be made without departing from the spirit and principle of the invention and therefore the scope of the invention is not to be construed as limited to the preferred embodiment.

What is claimed is:

1. A method for preparing a clustered particulate composition consisting essentially of coated solid particulates comprising the steps of:
   a) providing at least a first and second solid particulate material each comprising at least one ingredient capable of reacting with the other;
   b) providing at least a first coating for the first solid particulate material and at least a second coating for the second solid particulate material;
   c) coating all of the first and second fractions of solid particulate material with the respective coatings wherein the respective coatings comprise at least one polymer formulation to achieve coated solid particulates; and
   d) blending said coated first solid particulates with the coated second solid particulates such that said coated solid particulates form clustered compositions present in a stoichiometric ratio consisting essentially of coated first solid particulates and coated second solid particulates.

2. The method according to claim 1 said first coating containing at least a first functional group and said second coating containing at least a second functional group, in which at least one of said functional groups in said first coating is reactive with at least one of said functional groups of said second coating, such that the respective coatings are chemically bonded.

3. The method according to claim 2, wherein concentrations of the reactive functional groups are present in a stoichiometric ratio.

4. The method according to claim 1, said first coating having a composition which places it sufficiently apart in the triboelectric series scale from the second coating to provide for electrostatic attraction between the two coated particulates when blended.

5. The method according to claim 4, said compositions present in a stoichiometric ratio.

6. The method according to claim 1, said first coating containing magnetic particles and said second coating containing nano-sized superparamagnetic particles which become magnets in the presence of the particles coated with the first polymeric coatings.

7. The method according to claim 6, said magnetic and superparamagnetic particles in the first and second coatings present in a stoichiometric ratio.

8. The method according to claim 1 comprising the further step of stabilizing said clusters by increasing the temperature of the clusters to a level above the first or second order transition of at least one of the coatings.

9. The method according to claim 1 comprising the further step of stabilizing said clusters by applying to said clusters, and subsequently evaporating, a dilute polymer solution.

10. The method according to claim 1 comprising clustering particulates comprising coating small "guest" particulates and large "host" particulates with at least one polymerizable liquid.

11. The method according to claim 1 comprising
  a. providing at least a first large particulate and at least a second particulate smaller than said first particulate;
  b. coating said large particulate with a polymerizable fluid;
  c. combining said smaller particulate with the coated large particulate such that said smaller particulate is coated and included on the coating of the large particulate; and
  d. polymerizing or crosslinking the coating to form coated clusters of coated large and coated small particulates.

12. The method according to claim 11 wherein said coating and combining steps are performed sequentially in a coating blender.

13. The method according to claim 11 comprising employing said large and smaller particulates in stoichiometric amounts.

14. The method according to claim 1 said coating step employing a magnetically assisted coating device.

15. The method according to claim 1 wherein said at least one particulate is a granulate.

16. The method according to claim 1 wherein the step of providing at least a first and second solid particulate consists essentially of providing a first large particulate and at least a second particulate smaller than said first particulate; and wherein the coating step consists essentially of coating said large particulate with a polymerizable fluid and combining said smaller particulate with the coated large particulate such that said smaller particulate is coated and included on the coating of the large particulate; wherein the method further consists essentially of polymerizing or crosslinking the coating to form coated clusters of coated large and coated small particulates.

17. The method according to claim 1 wherein at least one of the solid particulate materials comprises an energetic particle.

18. The method according to claim 1 wherein the at least first and second solid particulates comprise energetic particles.

* * * * *